(12) United States Patent
Abramoff et al.

(10) Patent No.: US 8,548,992 B2
(45) Date of Patent: Oct. 1, 2013

(54) USER INTERFACE FOR A DIGITAL CONTENT MANAGEMENT SYSTEM

(76) Inventors: Cary Scott Abramoff, Brooklyn, NY (US); Leonard Dean Blumenthal, Sunrise, FL (US)

( * ) Notice: Subject to any disclaimer, the term of this patent is extended or adjusted under 35 U.S.C. 154(b) by 587 days.

(21) Appl. No.: 12/914,152

(22) Filed: Oct. 28, 2010

(65) Prior Publication Data

US 2012/0110515 A1   May 3, 2012

(51) Int. Cl.
*G06F 7/00*   (2006.01)
(52) U.S. Cl.
USPC .......................................................... 707/726

(58) Field of Classification Search
USPC .......................................................... 707/726
See application file for complete search history.

(56) References Cited

U.S. PATENT DOCUMENTS

2004/0095387 A1* 5/2004 Demsey et al. ............... 345/762

* cited by examiner

*Primary Examiner* — Truong Vo

(57) ABSTRACT

A graphical user interface and digital content processor for the management of digital data. The graphical user interface is characterized by two treeview controls capable of transforming the screen display of items under management by acting as a filtering mechanism for the category value pairs inherent in every item under management. The treeview controls folders, or nodes, transform the screen display of data under management to filter by the category values represented by the treeview controls' folders when selected.

19 Claims, 52 Drawing Sheets

USER INTERFACE FOR A DIGITAL CONTENT MANAGEMENT SYSTEM

FIELD OF THE INVENTION

The present invention relates to computer software and, more particularly, to a shell, or explorer, graphical user interface, and system, for the management of digital content.

BACKGROUND OF THE INVENTION

The explorer or shell browser is the traditional paradigm for interfacing with information and content in most modern software, operating and network systems. In this paradigm the user interface primarily consists of a single treeview control, usually on the left hand side of the window, and a view pane on the right. The treeview is distinguished by hierarchical groupings of nodes, depicted usually as folders that can contain nested levels of subnodes. The contents of any given node are displayed in the pane either as icons representing their informational type or as grids of metadata; e.g. filename, creation date and size.

Additionally filters and search features are commonly provided to help the user find what they are seeking when they are unsure as to the location of information sought. The problem with this paradigm is one of both integration and scale. There exists an inverse relationship between the volume of data being managed and the efficacy of the system itself. Since the paradigm for grouping related information together is to create nested subfolders in the treeview, i.e. vertically integrated categorization, users often find themselves with deeply nested layers of subfolders that are simply unwieldy to interact with. This further prevents the integration of information categorized in different nodes; i.e. horizontal integration. For example, if two recipes for chocolate cake are stored in different folders it is up to the user's ingenuity to find those recipes. The vertical categorization inherent in the treeview control necessitates additional systems and processes to enable users to work with their data when it is not contained in the same, or at least, a nearby node. In other words, while two recipes for chocolate cake may be associated in a user's mind, the explorer offers no easy way to make those types of horizontal integrations. One must either search, or filter, to access horizontally integrated information.

The problems of integration are quickly exacerbated by scale. The more information maintained by the system; the more difficult and time consuming it becomes to access that information. Essentially one has to rely upon memory or conduct key word searches to get to the data sought. While the explorer shell has largely solved the problem of graphically representing system contents it has not solved the problem of accessing and integrating the information intuitively when faced with large underlying data repositories.

As the volume of system data increases users are stressed by the inability of the explorer paradigm to get them the information they want quickly and easily. In short the exploration becomes increasingly expensive in terms of time and effort.

Most solutions to date have focused on improving the existing paradigm by creating virtual folder systems along with improved search, display and filter features. However, these developments merely represent incremental or evolutionary changes to the paradigm itself. To date, the explorer or shell paradigm remains relatively unchanged since the advent of the graphical user interface driven explorer.

Prior art explorer or shell interfaces are inherently unwieldy due to vertical nesting of subfolders. Any attempts to increase system efficacy through metadata based virtual folder systems do not address the vertical nesting issue and merely represent incremental and symptomatic remedies of the issue. It would be advantageous to provide an explorer or shell interface featuring dynamically cross-referenced treeview controls characterized by the display of folders, or nodes, representing a dual categorization methodology for storing data within the system.

It would also be advantageous to allow each treeview's root-level folders to dynamically create and display subfolders illustrating existent category-pairs found within items in the system.

It would also be advantageous to allow each treeview's subfolders to provide a trigger for an auto-synchronization feature that enables users to horizontally integrate the data under management to explore "one-off" relationships amongst the data.

It would also be advantageous to embody these category-pairings found in the data as a finite, two-level hierarchy represented by the treeview controls to prevent unpredictable and unwieldy subfolder nesting as found in prior art shell or explorer interfaces.

SUMMARY OF THE INVENTION

In accordance with the present invention, there is provided a user interface and file and digital content processor for the management of digital data. The graphical user interface is characterized by two treeview controls capable of transforming the screen display of items under management by acting as a filtering mechanism for the category value pairs inherent in every item under management. The treeview controls folders or nodes transform the screen display of data under management to filter by the category values represented by the treeview controls' folders.

BRIEF DESCRIPTION OF THE DRAWINGS

A complete understanding of the present invention may be obtained by reference to the accompanying drawings, when considered in conjunction with the subsequent, detailed description, in which:

FIG. 42 is an illustrative diagram of the attachments tab for the item;

FIG. 43 is an illustrative diagram of the data entry form of the system cloning an item, viewed as a web page;

For purposes of clarity and brevity, like elements and components will bear the same designations and numbering throughout the figures.

DESCRIPTION OF THE EMBODIMENT

Figure 1:
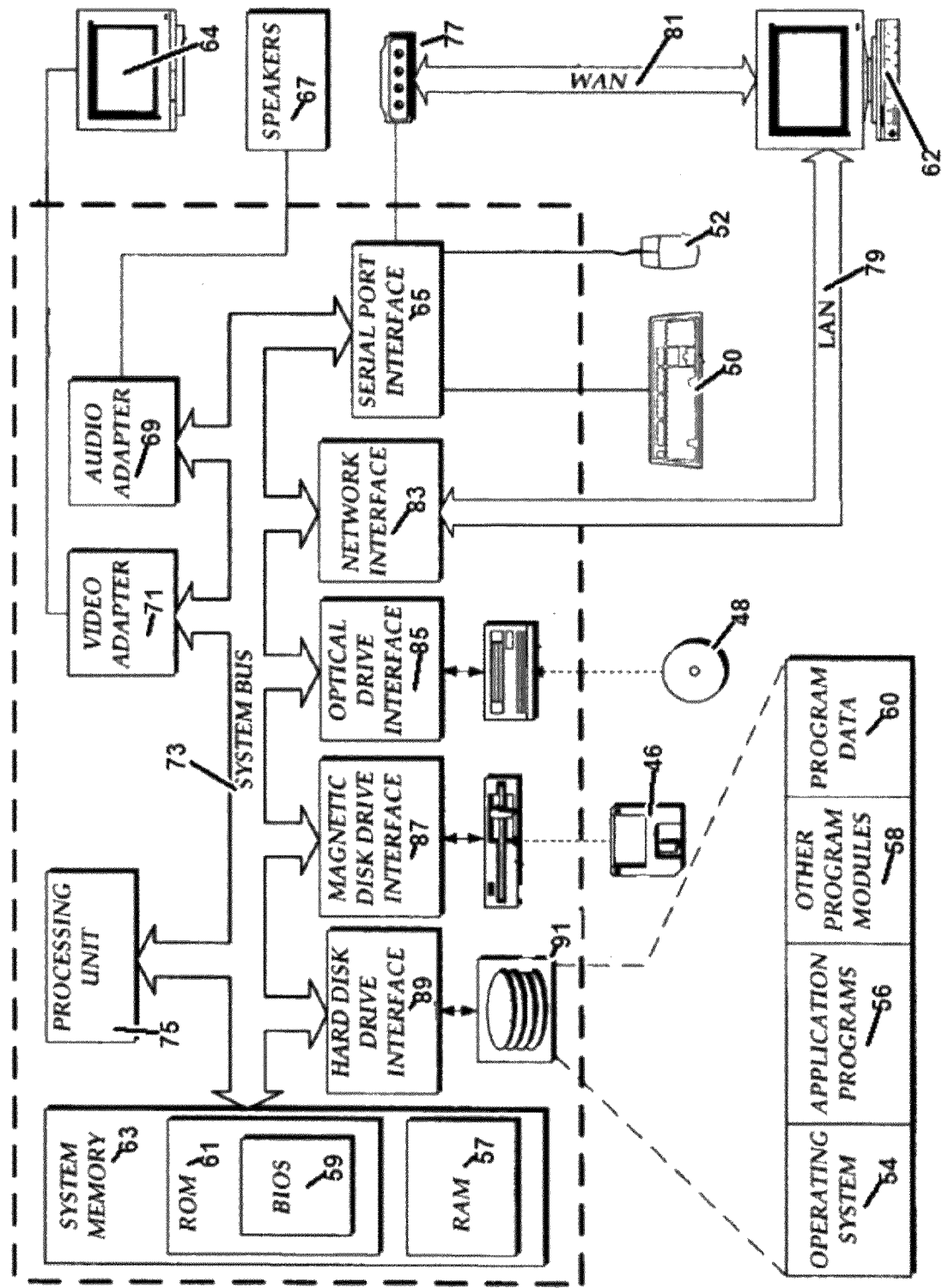
FIG. 1 is a block diagram of a general purpose computer system suitable for implementing this embodiment.

With reference to FIG. 1, an exemplary system for implementing this embodiment includes a general purpose computing device in the form of a conventional personal computer 62, including a processing unit 75, system memory 63, and a system bus 73 that couples various system components including the system memory 63 to the processing unit 75. The system bus 73 may be any of several types of bus structures including a memory bus or memory controller, a peripheral bus, or a local bus using any of a variety of bus architectures. The system memory 63 includes read-only memory 61 (ROM) and random access memory 57 (RAM).

A basic input/output system 59 (BIOS), containing the basic routines that help to transfer information between elements within the personal computer 62, such as during startup, is stored in ROM. The personal computer 62 further includes a hard disk drive 89 for reading from or writing to a hard disk 91, a magnetic disk 87 drive for reading from or writing to a removable magnetic disk 46, and an optical disk drive 85 for reading from or writing to a removable optical disk 48, such as a CD-ROM or other optical media.

The hard disk drive 89, magnetic disk drive 87, and optical disk drives 85 are connected to the system bus 73 by a hard disk drive 89 interface, a magnetic disk drive interface 87, and an optical drive interface 85, respectively. The drives and their associated computer-readable media provide non-volatile storage of computer-readable instructions, data structures, program modules, and other data for the personal computer 62.

Although the exemplary environment described herein employs a hard disk 91, a removable magnetic disk 46, and a removable optical disk 48, it should be appreciated by those skilled in the art that other types of computer-readable media which can store data accessible by a computer, such as dedicated file servers, magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 91, magnetic disk 46, optical disk 48, read-only memory 61 (ROM) or, random access memory 57 (RAM), including an operating system 54, one or more application programs 56, other program modules and program data 60. A user may enter commands and information into the personal computer 62 through input devices such as a keyboard 50 and mouse 52 or similar pointing device.

Other input devices (not shown) may include a microphone, joystick, game pad, satellite dish, scanner, or the like. These and other input devices are often connected to the processing unit 75 through a serial port interface 65 that is coupled to the system bus 73, but may also be connected by other interfaces, such as a parallel port, serial port or a universal serial bus (USB). A display in the form of a monitor 64 is also connected to the system bus 73 via an interface, such as a video adapter 71 or video card. One or more speakers 67 may also be connected to the system bus 73 via an interface, such as an audio adapter 69. In addition to the display and speakers 67, personal computers typically include other peripheral output devices (not shown), such as printers.

The personal computer 62 may operate in a networked environment using logical connections to one or more personal computers, such as a remote computer. The remote computer may be another personal computer 62, a server, a router, a network PC, a peer device or other common network node, and typically includes many or all of the elements described above relative to the personal computer 62. The logical connections depicted in FIG. 1 include a local area network 79 (LAN) and a wide area network 81 (WAN). Such networking environments are commonplace in homes or offices, enterprise-wide computer networks, intranets, and the Internet.

When used in a LAN networking environment, the personal computer 62 is connected to the local area network 79 through a network interface 83 or adapter. When used in a WAN networking environment, the personal computer 62 typically includes a modem 77 or other means for establishing communications over the wide area network 81 such as the Internet. The modem 77, which may be internal or external, is connected to the system bus 73 via the serial port interface 65. In a networked environment, program modules depicted relative to the personal computer 62 or, portions thereof, may be stored in the remote memory storage device. It will be appreciated that the network 546 connections shown are exemplary, and other means of establishing a communications link between the computers may be used.

As implemented on a system of the type illustrated in FIG. 1, this embodiment utilizes an integrated, dynamically cross-referenced and synchronized, dual treeview and dual view pane shell browser interface, integrated with a file and digital content processor 86 capable of synchronizing the shell browser and view component 84 with the embodiment's relational database 66 and file server 90.

The dynamically cross-referenced, and synchronized, dual treeview controls, and dual view panes provide a user interface experience which makes it substantially easier for users to perform common tasks around file and digital content management by manipulating system data in the context of user defined project-category-pairs.

The embodiment's dual classification system for all items under management, tightly integrated through all tiers of the system, directly addresses the issue of information overload constantly challenging modern computer users.

Two treeview controls allow two ways to classify information. The folders and subfolders become exemplary of the user's individual project and category classifications, thus further integrating data storage, representation and manipulation in a user-specific or customized idiomatic framework.

The dynamic linking of the two treeview controls to automatically synchronize via requests to the file and digital content processor 86 is based upon the organization of the two treeview controls as mirror image representations of the project-category-pairs populated by interrogating the project and category attribute values for all items in the system. The categories treeview control 198, conversely, lists all categories as root-level folders and dynamically populates associated projects as a single, nested level of subfolders.

This represents the category-project perspective for the same items. Thus the two treeview controls, working in tandem, allow users to visually comprehend how items are related to one another by a two dimensional grouping of the same data acting as classificatory categories; e.g. projects and categories in this embodiment.

Users can see which projects are associated with which categories and vice-versa by using any specific project-category-pair as a pivot point that reveals all project-category-pairs for any item's project and category attribute values.

Figure 1B:
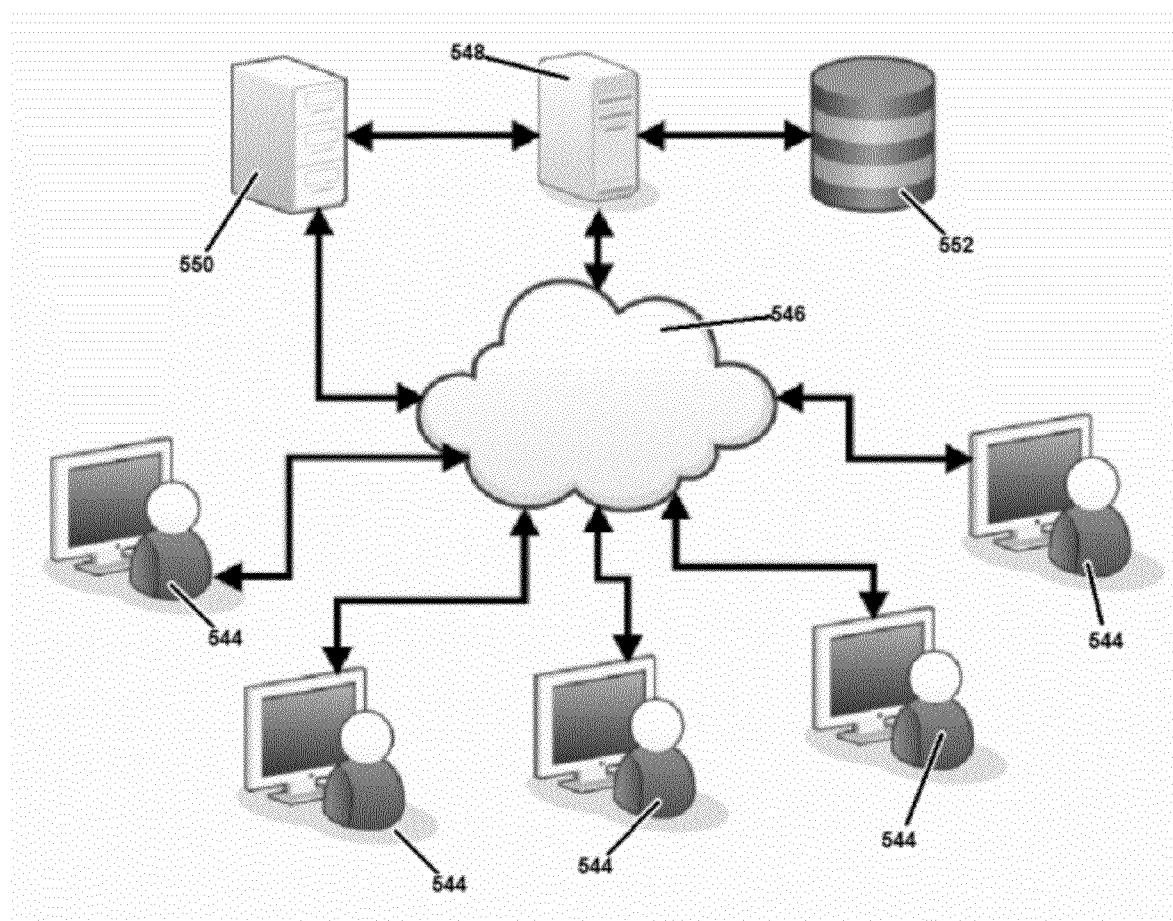
FIG. 1B is an illustration of a cloud style network or Internet based embodiment of the file and digital content management system.

FIG. 1B is a topological diagram of a network based embodiment of the file and digital content management system 94. This embodiment would apply to an Internet, or intranet network adhering to common network protocols like TCP/IP, Ethernet, and gigabit Ethernet, etc.

In this embodiment a plethora of client devices, e.g., desktop, laptop, netbook, and other mobile devices like blackberries, PDAs, iPads, iPhones, etc., can connect via a network connection.

The network 546 in this embodiment consists of an unlimited number of networked application servers 548, networked file servers 550, and networked relational database servers 552. As those skilled in the art will appreciate, this creates multiple benefits, not the least of which is a centralized means of accessing the network 546 from a variety of digital devices where each device is capable of connecting to the network 546, and initiating a user session.

Additional benefits include those typically associated with networked systems in general; namely, a scalable, central repository to house and serve information to multiple network clients 544 for further interaction upon.

Further, a networked embodiment for the file and digital content management system 94 can deliver information not only to connected users via a multitude of network enabled digital devices, but the file and digital content processor 86 component operates independently of the shell browser and view component as it simply reveals an API (application programming interface) lending itself to machine-initiated requests as easily as human use-case generated requests. This is the request-response methodology that the shell browser and view component 84 utilizes to transform screen data.

Thus, a network based embodiment lends itself equally to other network capable systems as clients, capable of further transforming the data under management. The file and digital content processor 86 in this embodiment can remain client agnostic, accepting requests from either computer systems or from human clients.

Thus, not only does such an embodiment enable scalability it also enables extensibility. Additional systems can be created as desired, and existing systems can be extended as desired, thereby creating additional functionalities for the items, and files, the file and digital content management system 94 controls and transforms.

Figure 2:
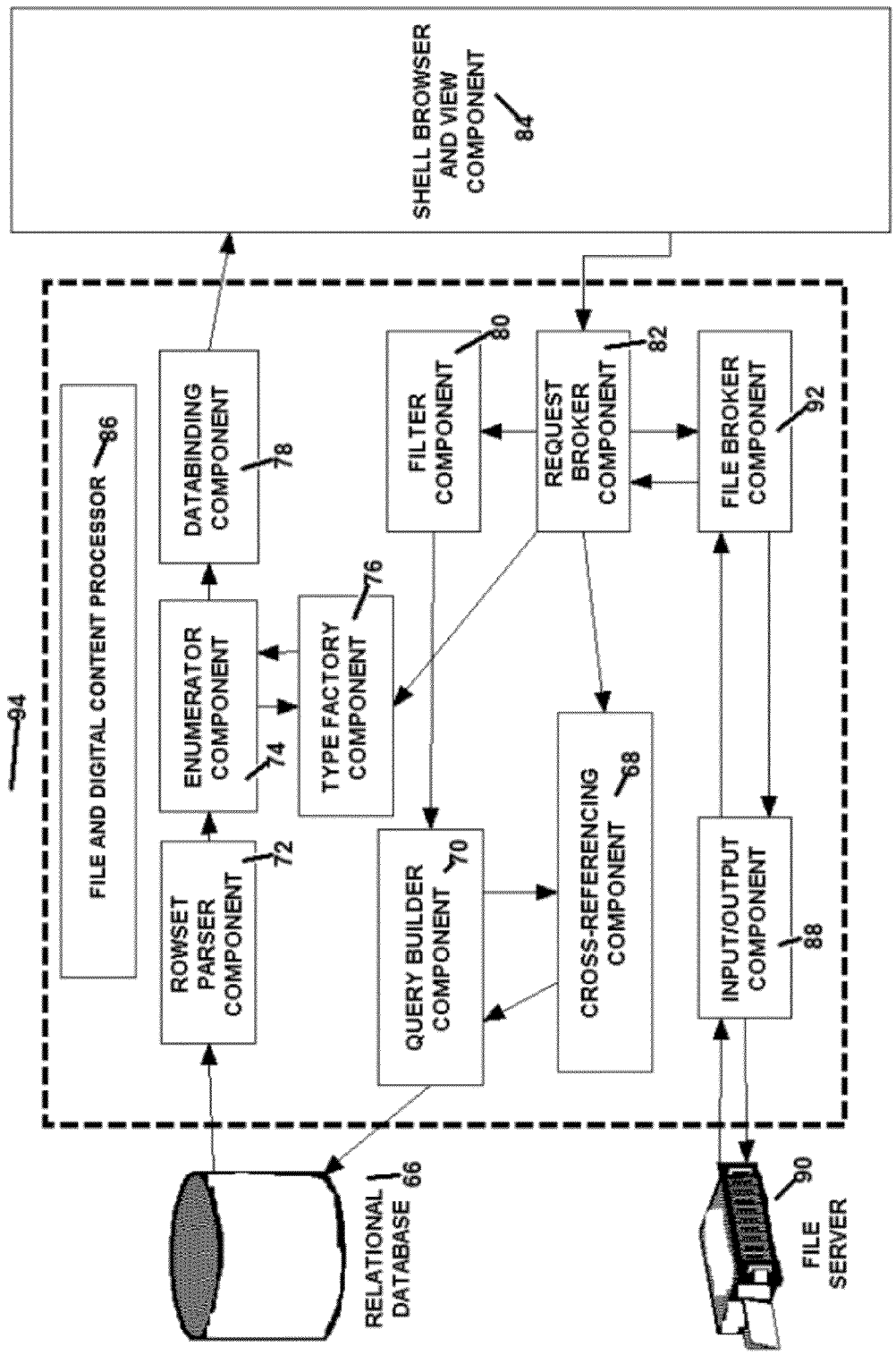
FIG. 2 is a virtual folder system for dynamic synchronization and cross-referencing.

FIG. 2 is a block diagram of a file and digital content management system 94 in accordance with the embodiment in FIG. 1.

As will be described in more detail below, the project-category-pair type organization of treeview controls in the shell browser and view component 84 allows the user to orient the digital content and files viewed on screen within the context of simultaneous horizontal and vertical integration.

This integrated vertical and horizontal capability is provided by the treeview controls modeling of project-category relationships as classificatory categories for the digital data items under management.

As previously mentioned, there are two distinct types of virtual folders in this embodiment; folders and subfolders. A folder is a direct representation of one of the two requisite attributes required to save an item in the system; namely project and category.

A subfolder however, exists as a representation of a relationship modeled by items; i.e., a requisite project-category-pair assignment. Therefore treeview root-level folders can be empty which simply means the project or category they represent has yet to be associated with an item. However, if even only one item uses the project, or category, a subfolder will be dynamically created beneath it. This serves to model said item's project-category-pair within the treeview controls as a root-level folder containing a single, nested level of subfolders.

Further, a folder is capable of containing exactly one nested level of subfolders, representing a distinct list of complementary project-category-pair attributes, discovered by the file and digital content processor's query builder component's generated SQL output.

For example, an expanded root-level project folder will list any categories found in a query of items filtered by the selected project's attribute value; stored in the relational database's items table 278; and added to the project folder's attributes by the file and digital content processor's 86 databinding component 78.

The converse is true for a category folder. Every root-level category folder acts in a classificatory manner in relation to the digital items managed, and will accordingly contain a nested list of subfolders acting not merely as another classificatory list of categories but as a category-pairing shorthand, thus representing matching projects returned by an item query filtering on the selected category attribute passed to the request broker component 82. The file and digital content management system 94 is capable of managing folder to subfolder relationships by cross-referencing project and category attributes via the system's dynamic query capability.

The files, which are linked or associated in the relational database 66 to items, via a requisite item identifier 256, can be filtered too, as if they were items, obtaining both project and category attribute values by proxy or inheritance. The query builder component 70 is capable of running additional queries against the relational database's files table 280 thereby matching files by the associated item's 244 project-category-pair. As a result, the file and digital content management system 94 offers users a dual mode explorer shell that can be toggled between an item-centric, or file-centric viewpoint, by leveraging the shared item identifier 256 resident in both items and attached files.

An item-centric approach, in this embodiment, displays files in the shell browser and view component 84 files pane 182, as they relate to individual items through the shared item identifier 256 required to add files to the system. This particular viewpoint can be likened to how emails can contain attachments in a generic email system. It is similar to how one email can contain many attachments.

As previously described, the item-centric, or item explorer view, will filter items by project and category, displaying files in the system on a strict item by item basis. Thus, selecting an item in the items pane 180 will dynamically display any file(s) that have been attached to said item.

A file-centric, or file explorer view, links files to items by proxy, through the file and digital content processor 86 such that the user can view files in the shell browser and view component 84 as if they were no different from items; i.e. directly filtered by the project and category folders, and subfolders, selected by a user. This feature extends the power of vertical and horizontal integration not just to items, but to files as well, providing a single paradigm for manipulating all digital content.

The integrated and dynamic nature of the embodiment opens up new possibilities for organizing, discovering, and sharing, both information and files for users on a system. The file and digital content processor 86 file broker component 92, working in conjunction with the request broker component 82, allows both files and digital content to be copied, moved, viewed, downloaded, renamed, searched, and cloned, not just for solitary users but also between users on the system.

Such a simple, yet powerful, paradigm possesses ramifications for a fundamental shift in the way users, and networks of users, can leverage data. The embodiment provides leverage that covers a productivity spectrum ranging from a user's own stored items and files, all the way to an exponentially expanding, globally available, loosely connected, and fully compatible, data management solution.

The shell browser and view component's 84 item explorer/file explorer toggle feature; the explorer mode toggle checkbox 192 allows users to quickly determine not just the project and category to which files belong, but also view the context within which the file was saved; namely the item's identifier attribute stored with each file attachment in the relational database 66. This adds, by default, an entire user-generated layer of metadata, i.e. using items as proxies for screen transformations, in addition to the files own metadata, e.g. date, size, etc., stored in the relational database 66.

The horizontal and vertical integration of the shell browser and view component's dual linked treeview controls, act in concert as both a, "relationship or project-category-pair directory" and as a filter engine, for a dual mode explorer allowing the system's features to be leveraged in tandem to suit individual users own style of working with data. This enables users to integrate all manner of information within one cohesive shell supporting both vertical and horizontal integration, to more efficiently leverage the system's capabilities for manipulating data within a system; e.g. add, edit, delete, print, share, etc.

Thus, the file and digital content management system 94 enables items, or files, to be automatically filtered by the selection of folders, and subfolders, displayed within the treeview controls. Selecting a top level folder will apply a single filter based upon the project, or category, that the selected folder represents. Category-pair filters are additive in nature, and may be removed at any time, such that a user can tailor the view of items and files to add, or remove, both project and category filters at will, as well as change the filter focus to be either item-centric, or file-centric. This powerful capability of the system is achieved by simply passing in a token to request broker component 82 by simple selection of the explorer mode toggle checkbox 192 in the shell browser and view component 84.

Subfolders present a special filtering case, in that the selection of a subfolder applies two filters to the data; that of the project, or category, represented by the subfolder itself, as well as the automatic inclusion of a second filter, derived from the project, or category, represented by the parent or root-level folder. The project-category-pair subfolder behavior visually, and functionally, relates information within the system on two dimensions of integration; vertical and horizontal.

Vertical integration of information is achieved by the direct filtering functions of the folders, and subfolders. Horizontal integration is achieved by the subfolders representation of other existing project-category-pairs found for any given project, or category, root-level folder.

Further, selecting a subfolder will automatically synchronize the opposite treeview control in the shell browser and view component 84 such that it displays the same root folder as the opposite treeview's selected subfolder. Subfolder synchronization creates a dynamic mechanism for discovering, and manipulating, large amounts of information, and files, by leveraging the file and digital content management system's support of a dual classification methodology; i.e. project-category-pairs. Each subfolder selected triggers a synchronization of the opposite treeview and opens the doorway to discovering and integrating large amounts of related information that would not otherwise be obvious in single treeview shell browser or explorer interface paradigm.

As an example, a user could select a project folder named "patents" from the projects treeview control 196. The user would then be presented with the filtered results for a query of all files, or items, depending upon the explorer mode toggle checkbox 192 setting, in the system with possessing a specific project attribute of "patents".

By selecting the folder, the file and digital content processor 86 will render beneath the project folder, a nested level of subfolders representing existing category matches; e.g. "lawyers", "links", "backups", "phone calls", "appointments", etc.

By selecting subfolders, both the subfolder's attribute value, i.e. project or category, and the containing parent folder's value, will be passed to the file and digital content processor 86 to transform the visible items and files. The opposite treeview control will automatically synchronize such that the system selected folder in the opposite treeview represents the same attribute as the user selected subfolder.

Thus a new level of subfolders for the newly synchronized tree will be made available to the user representing both the current project-category filter, and any related pairings displayed by the freshly synchronized treeview control.

Using the above example, the user might then click on the "lawyers" subfolder of the "patents" project. Doing so would automatically synchronize the categories treeview folder such that the "lawyers" folder would be selected, and all associated projects would be displayed, thus revealing other projects joined to the "lawyers" category. A subfolder of the "lawyers" category might be the "copyright" project subfolder. Clicking on the "copyright" subfolder would then automatically change the projects treeview control's 196 selected project from "patents" to "copyright" thus applying a new filter to the data based upon the project-category-pair, "copyright" and "lawyers", respectively.

This allows the user to not only tailor the screen view based upon the selection of projects and categories, but to intuitively browse similar and related information by leveraging the subfolders visual representation of other items sharing one attribute of the requisite project-category-pair.

As illustrated in FIG. 2, the file and digital content management system 94 includes a file and digital content processor 86, a file server 90 which could be a hard disk 91, or any other media capable of storing digital files, a relational database 66, and a shell browser and view component 84.

The file and digital content processor 86 contains a request broker component 82, a file broker component 92, an input/output component 88, a filter component 80, a cross-referencing component 68, a query builder component 70, a rowset parser component 72, an enumerator component 74, a type factory component 76, and a databinding component 78.

The shell and browser component handlers allow common user actions, including use of keyboard 50, mouse 52, stylus, or touchpad, clicking and right-clicking of project, and category, folders, and subfolders, as well as the dragging and dropping of shell browser and view component 84 objects; e.g. files to be uploaded, moved or copied amongst items, clicking column headers of the items pane 180 and files pane 182, for sorting by respective column(s), and other shell browser and view component 84 controls commonly used in graphical shell browser interfaces, thus enabling a fully interactive, or dynamic transformation, of the system's data along user defined contexts.

It further provides, as previously mentioned, a checkbox control for setting the dual-explorer mode to determine which shell browser and view component 84 object; items pane 180 or files pane 182; the file and digital content processor 86 should apply the results of the treeview initiated filtering process against.

The shell browser and view component 84 further provides a tabular data entry form for adding, editing, deleting, sharing, cloning, and otherwise manipulating files and digital content within the system. Additional features of the embodiment include a publication feature generating text and graphical based links to items and files within the system.

The shell and browser component further includes a visual interface component that enables any computer user with a network or internet connection and an HTML browser to view any user's items, including rich digital content such as audio, video, embedded objects including web pages, as well as files displayed in a files pane 182 featuring links for downloading, previewing, etc., and a cloning mechanism whereby any items viewed can be duplicated completely by the user as a new item possessing the same attributes and files as the originally viewed item; i.e. the system items become templates for new items through the data entry and item viewer capabilities of the system.

The shell browser and view component 84, through the file and digital content processor's 86 API, is equipped with the capability of transforming user actions such as clicking on folders and subfolders, into parameterized item and file requests. The generated requests include an identifier for the originating treeview control, an identifier for the type of folder selected, folder or subfolder, the project identifier 254 and/or category identifier 252 involved in the user selection, the explorer mode requested, i.e. item or file, and other useful filters for sorting information set by the user and supplied to the request broker component 82.

The request broker component 82 is tasked with notifying the various components of the file and digital content processor 86 of received parameters to enable efficient query building and rowset processing to satisfy user requests for information.

The query builder component 70 is responsible for building and executing SQL queries to be applied against the relational database 66. The query builder component 70 is capable of creating SQL queries for creating, reading, updating, and deleting projects, categories, items and files, stored in the relational database 66. Depending upon the information obtained from the filter component 80 and the cross-referencing component 68, queries can be created and executed against the relational database 66 that return requisite data allowing the enumerator component 74, the type factory component 76, and the databinding component 78, to transform the information represented by the browser and shell component. The cross-referencing component 68 possesses the capability of determining if the request was initiated by a subfolder, in which case, the filter component 80 supplies the identity of the originating treeview that the user selected a subfolder from. This is the mechanism by which synchronization of the opposite treeview, i.e. the treeview the user did not select a subfolder from, can be synchronized against.

Generally, the query builder component 70 yields a set of rows (in other words a table). The rowset parser component 72 then takes each row, and using column names and information supplied by the type factory component 76, transforms the row received into a well known system or object type sharing attributes that map directly to the columns of the tables in the relational database 66. The types, e.g. an item, file, project, category, etc., can then be bound to the objects of the shell browser and view component 84, e.g. files pane 182, items pane 180, projects treeview, categories treeview, etc.

It is the system types that bridge the gap between the information stored in the relational database 66 with the shell browser and view component's 84 user control or screen display objects; namely the treeview and view pane controls.

The relational database 66 stores properties about all projects, categories and system users, as well as properties about all files stored physically; e.g. on a hard disk 91, file server 90, or other similar storage mechanism, including metadata such as file location, file type, file size, and date modified last on the system. It also stores records, or rows, of general information referred to as "items", that form the basic building blocks of the system.

Items in this embodiment include a field for the inclusion of rich digital content such as multimedia files, hypertext markup language (HTML) and active scripts, embedded web pages via iframe technology, and properties for descriptive information such as item subject, item type, deadline, urgent status, completed status, date modified last, etc., that can be leveraged for task and project management oriented features and functions within the system.

The relational database 66 receives SQL queries from the query builder component 70. The relational database 66 also sends SQL rowsets to the rowset parser component 72, which in turn passes each parsed row to the enumerator component 74, which obtains the item type being parsed from the type factory component 76, assembles the parsed rowset into a format, e.g. projects type 262, or categories type 262, that can then be bound to the shell browser and view component's 84 treeview controls by the data binding component, along with dynamically parsed instructions containing instantiated type information forming the basis for parameterizing subsequent user requests. Examples of instantiated type information might be the folder attribute values allowing the system to map a visually rendered folder on the screen display to a specific project, or category, in the relational database 66.

The file broker component 92 receives file oriented requests from the request broker component 82. File oriented requests span a plethora of common tasks; e.g. attaching, adding, or uploading files to a local hard disk 91, a network connected file server 90, or any other type of media capable of directory creation and file storage. Additional requests received by the file broker component 92 consist of operations that rename, delete, copy, or move files throughout the file server 90 or hard disk 91. Additionally the file broker component 92 can take the physical address of a file under system management and generate a web enabled address, i.e., URL type links, for stored files on the hard disk 91 or file server 90 of the embodiment.

The file broker component 92 is responsible for passing requests to the input/output component 88. Requests are then passed along to the input/output component 88, responsible for reading from and writing to the hard disk 91 or file server 90. These requests directly manipulate both physical directories, and the physical files, as required to satisfy the file broker component's 92 received request.

In the embodiment, each user's unique system identifier, i.e. their userid, becomes the name for the file server 90 directory where their files are stored. Further, each item's unique identifier value becomes the name for subdirectories where files are stored. This subdirectory or folder naming process occurs on a one to one basis where each item represents one discrete subfolder/directory on the file server 90 and will physically house all files associated with said item in the system.

The input/output component 88 ensures proper directories currently exist, or are created on-demand, prior to reading from, or writing to, the file server 90 or hard disk 91. The outcome of the operation; namely success or failure, is then sent back to the file broker component 92, which will then parse the results into a new request submitted to the request broker component 82 to update both the system's database and shell browser and view component 84 through the file and digital content processor 86. Thus, rather than taking an unwieldy physical storage methodology for the system's file tier, the system opts to abstract the physical details, or characteristics of file storage, through simultaneous integration, and synchronization, with the relational database's files table 280.

Each record in the files table 280 maps directly to a file on the file server 90. Further, as previously mentioned, the files table 280 maintains location information which is used to create links to enable the downloading, previewing, copying, moving, deleting, and sharing of the files on the file server 90 or hard disk 91.

Figure 3:
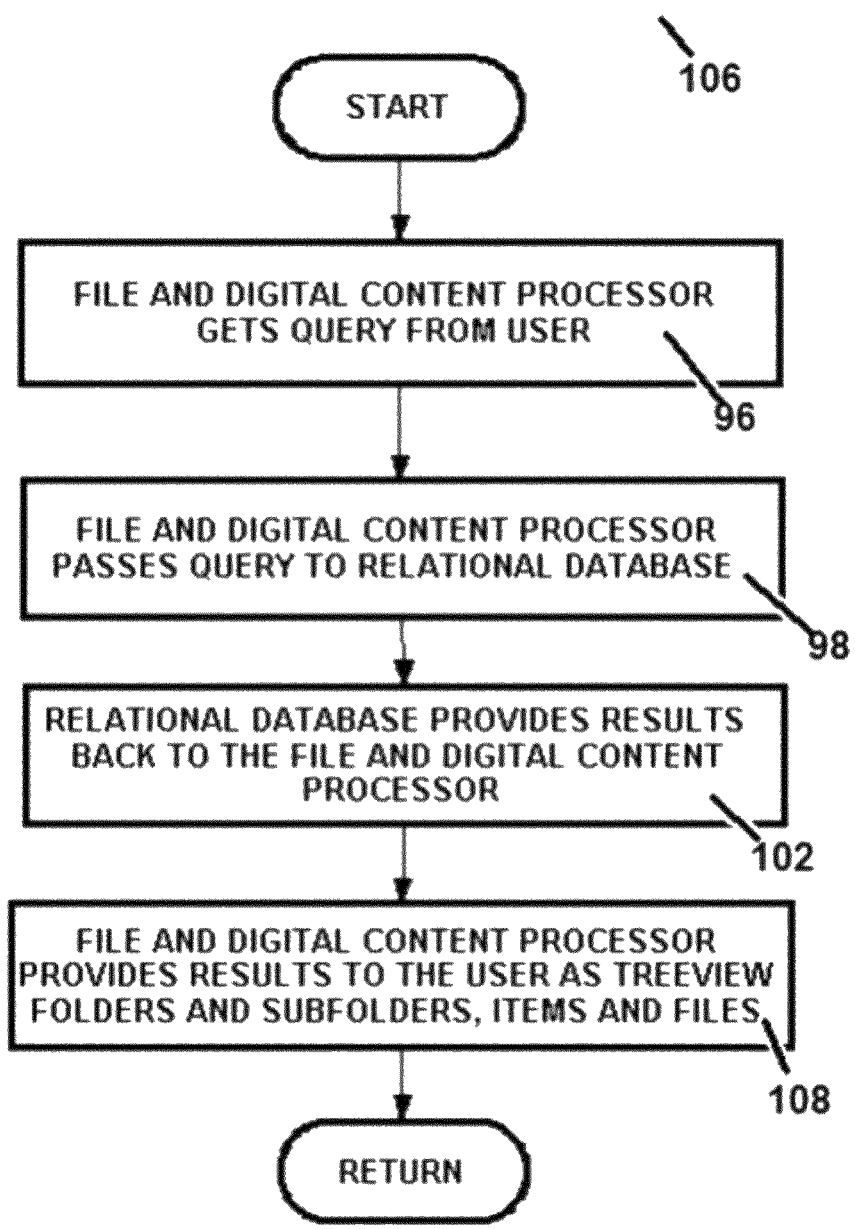
FIG. 3 is a flow diagram illustrative of a routine by which a user provides a query that draws back selected items.

FIG. 3 is a flow diagram illustrative of a routine by which a user provides a query that draws back selected items 106. At a block, the file and digital content processor 86 gets a query from the user 96. In a block, the file and digital content processor passes the query to the relational database 98. At a block, the relational database provides results back to the file and digital content processor 102. At a block, the file and digital content processor provides results to the user as treeview folders and subfolders, items, and files 108.

Figure 4:
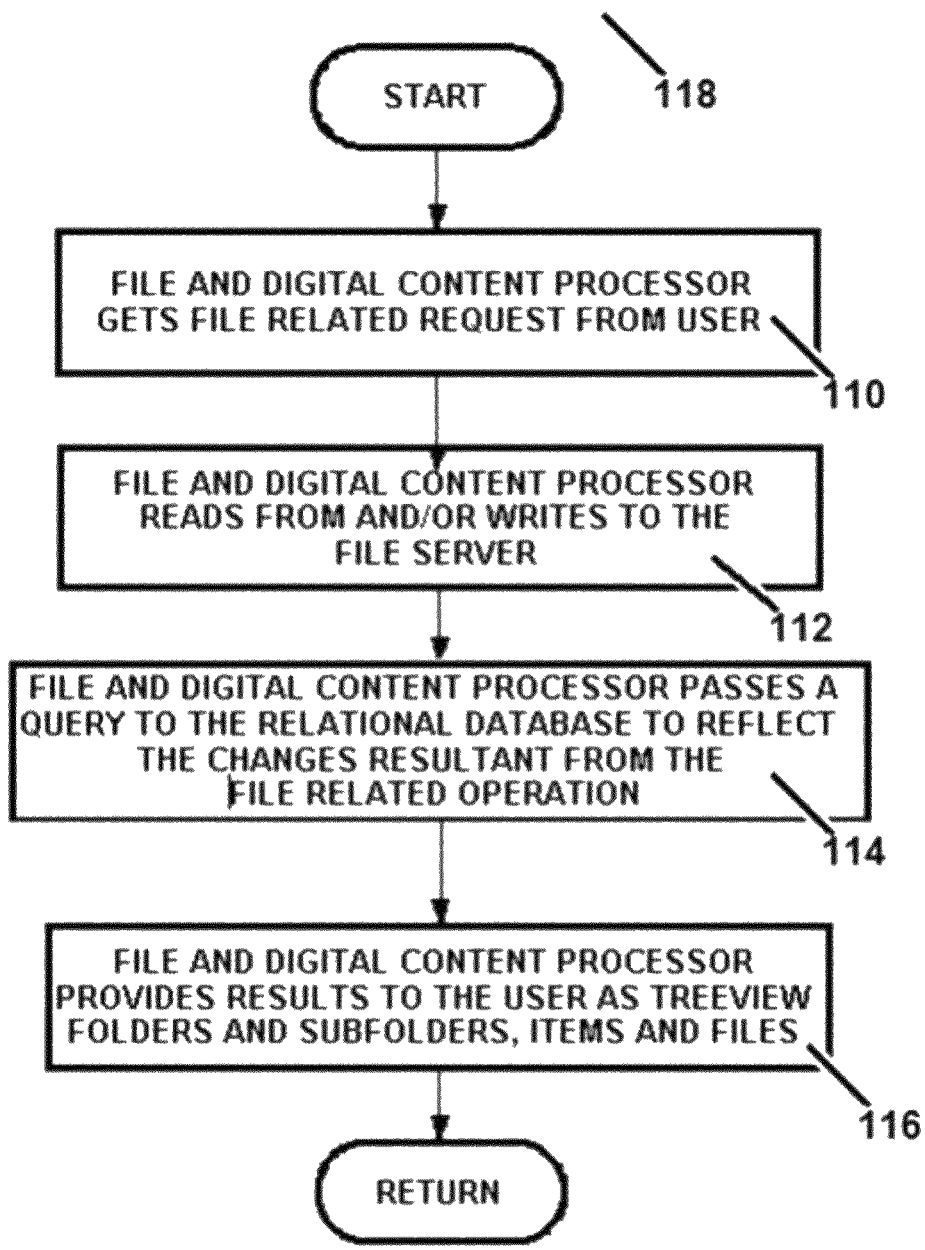
FIG. 4 is a flow diagram illustrative of a routine by which a user provides a file related request that updates the file server, the relational database and then returns the transformed results to the user as treeview folders and subfolders, items, and files.

FIG. 4 is a flow diagram illustrative of a routine by which a user provides a file related request that updates the file server 90 and the relational database 66, and then returns the transformed results to the user as treeview folders and subfolders, items and files 118.

At a block, the file and digital content processor gets a file related request from user 110. At a block, the file and digital content processor 86 reads from and/or writes to the file server 112. In a block, the file and digital content processor 86 passes a query to the relational database 66 to reflect the changes resultant from the file related operation 114. At a block, the file and digital content processor 86 provides results to the user as treeview folders and subfolders, items and files 116.

Figure 5:
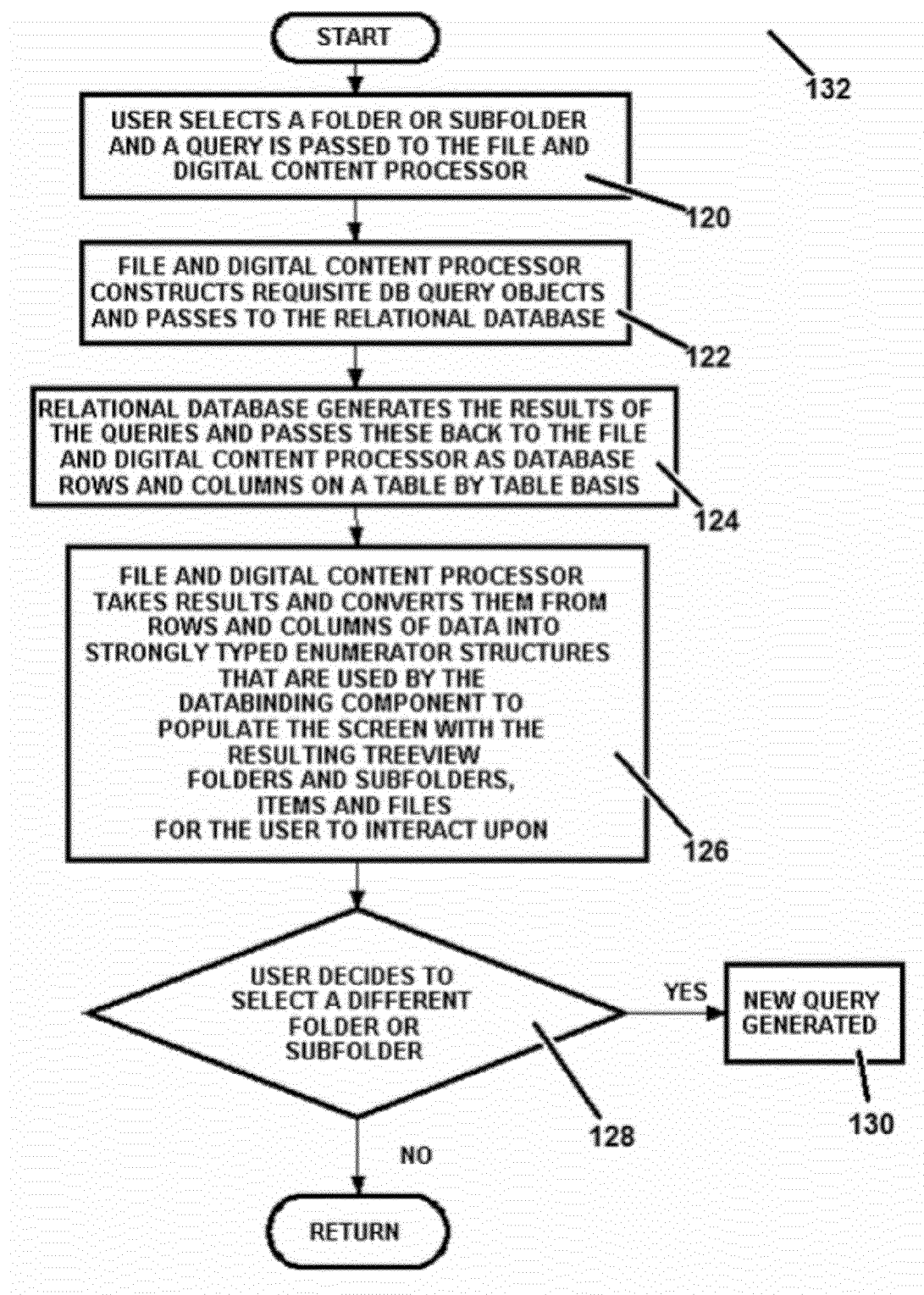
FIG. 5 is a flow diagram illustrative of a routine by which treeview folders and subfolders are constructed and displayed along with items, and files, and displayed on the screen in accordance with the user selection of a folder or subfolder from one of the treeview controls.

FIG. 5 is a flow diagram illustrative of a routine by which treeview folders and subfolders are constructed and displayed along with items and files, and displayed on the screen in accordance with the user selection of a folder or subfolder from one of the treeview controls 132. In a block, the user selects a folder or subfolder and a query is passed to the file and digital content processor 120. At a block, the file and digital content processor 86 constructs requisite db query objects and passes to the relational database 122. At a block, the relational database generates the results of the queries and passes these back to the file and digital content processor 86 as database rows and columns on a table by table basis 124. At a block, the file and digital content processor 86 takes results and converts them from rows and columns of data into strongly typed enumerator structures that are used by the databinding component to populate the screen with the resulting treeview folders and subfolders, items and files for the user to interact upon 126.

In a decision block, the user decides to select a different folder or subfolder 128. A new query generated 130 by the file and digital content processor 86 begins the process all over again as described above.

This routine may be considered the heart of the system by which users can explore their items and files both horizontally, and vertically. By selecting folders users gain immediate views of all items and files pertaining to said folder. By selecting subfolders, users gain immediate views of all items pertaining to not just that subfolder, but its parent folder as well.

This is the form and function of the project-category-pairs. Each folder selected reveals subfolders that can be selected to browse other project-category-pairs related to the subfolder's represented project, or category attribute value. The process is not unlike an abbreviated family tree structure where the project can be thought of as the father of an item and the category can be thought of as the mother of the item.

Each item can have full sibling relationships through identical project-category-pairs. As in real life, items, like children, can have half-siblings that share a single parent. In this case items can be related through a shared project, or category, but not both.

Thus, the folder/subfolder structure of the treeviews may be thought of as representations of an extended family structure where all candidates capable of bringing children, i.e. items, into the world, are represented in each treeview control as root-level folders capable of displaying nested subfolders. The subfolder is the indicator that items or children exist and represent all pairings that resulted in the creation of items, and associated files.

The subfolders can be thought of as representing all the partners used to sire offspring from the perspective of the folder. To give a concrete example: a project named "music" may have items in the system with category attribute values such as "blues", "classical", "rock and roll", "country", "swing", "salsa", etc. Thus, clicking on the "music" project folder can show all items in the system pertaining to "music".

The same is true for files when in file explorer mode. Clicking on the "music" folder would render to the screen all files currently attached to items having a project attribute value of "music". In the above, abbreviated, extended family-tree analogy, selecting the "music" folder not only reveals all information stored in the system filtered by the "music" project (father), but the simultaneous dynamic population of associated categories as subfolders of the "music" project allows the user to then reverse the view by selecting a subfolder which will automatically synchronize the opposite treeview. The opposite treeview will now allow users to examine the other relationships any category related to "music" might share with any other project.

For example, selecting the "music" project's "blues" subfolder would have the following effect: items displayed on the screen would all have the project "music" and the category "blues". In addition, the categories treeview control 198 would automatically display and select the "blues" category; i.e. automatic synchronization.

Expanding the "blues" category in the categories treeview control 198 would then display all projects that the "blues" category has paired with in the relational database's items table 278. For example, the category "blues" may list other projects as subfolders besides "music", such as "guitar", "songwriting", "vacations", "nightclubs", etc.

From this point the user can select the "nightclubs" project subfolder and then the screen will automatically select all items with a project attribute value of "nightclubs" and a category attribute value of "blues".

For example, one item matching this project-category filter of "blue/nightclubs" might be an item with a subject of, "BB King's Blues & Supper Club". This item may contains links, videos, driving instructions, an embedded webpage of the nightclub's website, etc.; all pertaining to the user's favorite New York City blues music related nightspot. The last selection would then re-synchronize the projects treeview control 196 to display all categories as subfolders under the "nightclubs" project folder in the projects treeview control 196.

This in turn, would show the "blues" category as a subfolder, and could contain other related categories such as "dancing", "supper", "techno", "over 25", etc. Thus, users now can structure digital content and files according to a project-category-pair paradigm and manipulate the information under management by fast relationship discovery of related information simply by clicking on subfolders.

Users can, of course, browse data vertically, by selecting folders and subfolders to reveal matching items and files. However, a new and powerful dimension of folder and item/file browsing is revealed via the system's dual treeview controls; horizontal browsing. The process is as simple as jumping from one treeview control to another to investigate items and file via a project-centric or category-centric perspective.

The projects treeview control 196 provides the project-centric view of data and the categories treeview control 198 provides the category-centric view of data. At any time, users can easily change the pivot, or viewpoint, by simply selecting a different folder, or by toggling the interface between file explorer and item explorer mode via the explorer mode toggle checkbox 192.

Finally, both items and files can be filtered not only on project-category-pair basis, but also by the column values of the files and items panes themselves. For example, the items pane [180] provides a filter function by subject, allowing users to filter by partial text matches, similar to the way Google searches web pages. The same is true for the files pane 182. For example, the user can filter the files pane 182 by a partial text match on file name.

The file and digital content management system 94 addresses a major issue that modern computer users face; not being able to find files, or other important information, e.g. appointments, contacts, emails, etc. within the systems they rely upon to manage their data.

Whether the user does not know the exact location of files on a hard disk 91 or file server 90, or simply because they don't know or remember, the exact name of the file, email, appointment, etc. Either way undue effort must be applied in prior art to manage information efficiently.

The file and digital content management system 94 however, renders it virtually impossible to lose any item or file stored in the system. The dynamically linked treeview controls simultaneous vertical and horizontal integration via the project-category-pair methodology, combined with the powerful dual explorer mode methodology (item explorer mode or file explorer mode), not to mention partial text matching filters on items and files themselves, as well as multi-column sorts in the items pane 180 and files pane 182, all work in conjunction to suss out any information a user might seek in the system.

The ramifications of file and digital content management system 94 impact all manner of embodiments that might benefit digital users. For example, a social networking website that enables users to publish items to a public version of the system, where the items and files contributed by users would automatically be classified through the project-category-pairs. Users can then discover endless amounts of files and information; be it music, video, books, scientific articles, etc. Users could then "walk the treeviews" discovering similar information that might be of interest simply by following the subfolder synchronization feature described above.

Figure 5B:
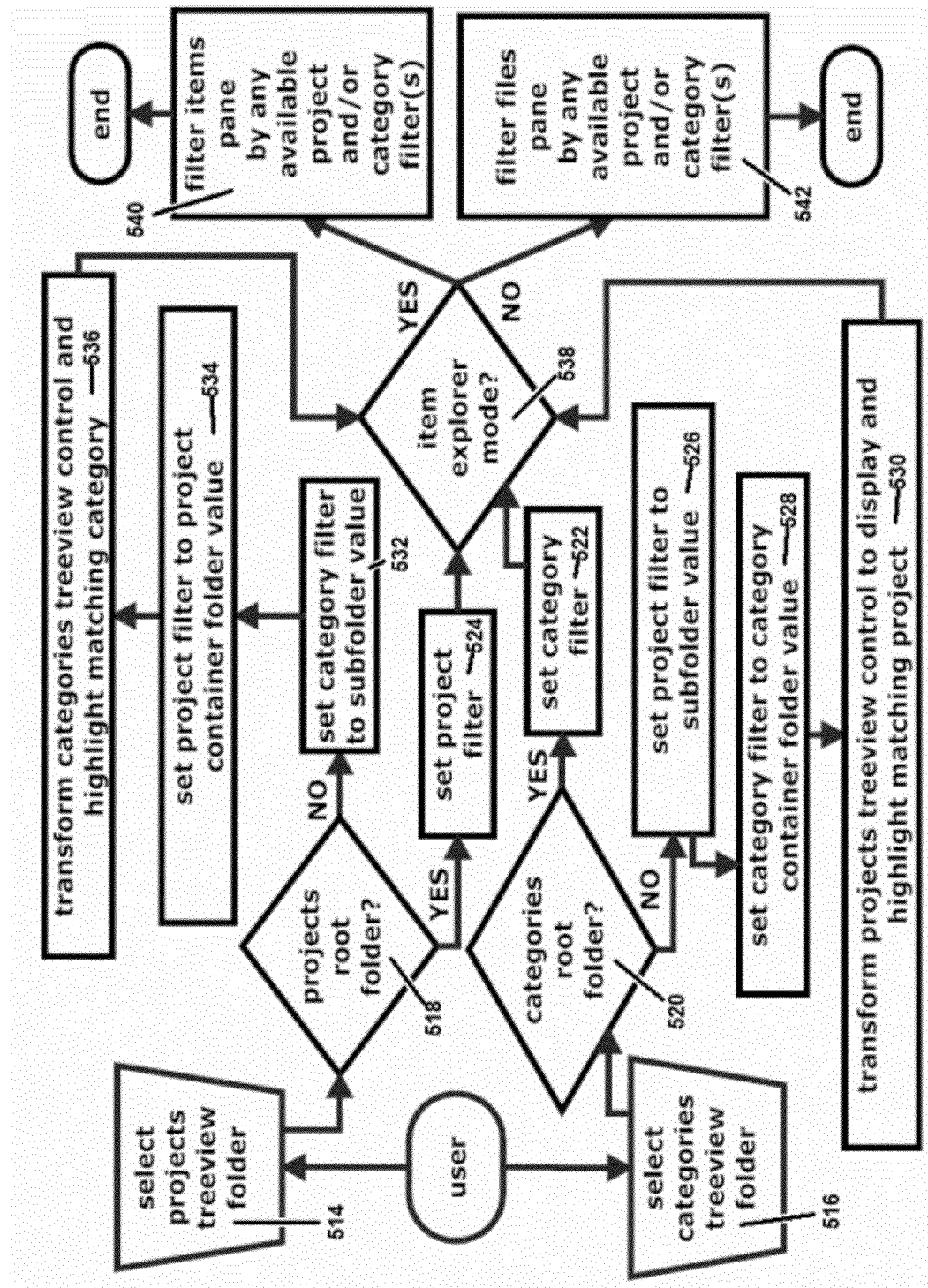
FIG. 5B is a flow diagram illustrating the specific logic applied for the routine depicted by FIG. 5, as it relates to the specific treeview and folder types, and explorer mode of the system.

FIG. 5B is a flow diagram illustrating the bifurcated logic applied for the routine depicted in FIG. 5 as it relates to the specific treeview control catalyzing the process, and, as it relates to how the type of data to transform, items or files, is determined. The embodiment's dual treeview, project-category oriented approach to data management necessitates the file and digital content processor 86 is capable of executing two distinct procedural flows as delineated by block 514 and block 516. The procedural flows therein depicted can be thought of as a "fork in the road" for the processes involved in folder browsing on the system. Further, the treeview controls of the shell browser and view component 84 must be able to provide folder identifier values that become part of the request broker component's 82 filter parameters, used to transform data on the screen by the file and digital content processor's 86 various components.

Following the system logic from the dual perspectives of both the projects treeview control 196 and the categories treeview control 198, illustrates the interconnectedness of the treeview controls to one another, as well the items and files pane 182. This dynamic interrelatedness forms the foundation for the graphical user interface that represents the "user experience". It will be appreciated by those skilled in the art of designing user interfaces that anticipation of use-cases as a mechanism for integrating user interface components, yields systems that users are more inclined to perceive as both friendly and intuitive.

Thus, from a projects treeview use-case, at a block the user selects a folder from the projects treeview control 514. In a decision block the system determines whether the selected folder is a root-level project folder or a category subfolder 518. If the user has selected a root-level project folder, no cross-referencing or auto-synchronizing of the opposite treeview control is required, and execution flows to the block set project filter 524.

However, if the user has selected a subfolder in the projects treeview control 196, a three-step process must be executed by the file and digital content processor 86 to transform the shell browser and view component 84. Thus, at a block the system will obtain the category identifier 252 value of the subfolder, which represents the category filter to be applied to all screen transformations 532.

As previously mentioned, the category subfolder exists by virtue of its relationship to a containing project, which represents a specific project-category-pair used by the system for filtering both the files pane 182 and the items pane 180, as dictated by the explorer mode toggle checkbox 192 setting.

Selecting a subfolder always has the effect of climbing the treeview to obtain the value of the containing folder. Thus, at a block the system will set the project filter to the project identifier 534 value represented by the category subfolder's direct, root-level parent, in the treeview control structure; i.e., a project.

The dual treeview controls enforce an auto-synchronization process that is triggered by the subfolder selection use-case. Each subfolder's identifier value can be mapped to a root-level folder in the opposite treeview control. The subfolders are, after all, merely a marker indicating a value from the opposite treeview, which indicates the existence of a project-category-pair in the relational database's items table 278.

Thus, to enforce the embodiment's auto-synchronization mandate, at a block the system transforms the categories treeview control 198 such that it displays and highlights the same category 536 as that of the selected subfolder.

At this point the bifurcated segment of the projects treeview selection use-case concludes. The projects treeview selection flow has covered any project and category specific requirements for generating requests to the file and digital content processor 86. Thus, before completing the flow began in block 514, it may be appreciated by those skilled in the art the benefits of comparing and contrasting the corollary process from the perspective of the remaining treeview control; namely the categories treeview.

Therefore, at a block the user selects a folder from the categories treeview control 516. In a decision block the system next determines whether the selected folder is a root-level category folder or a project subfolder 520. If the user has selected a root-level category folder, no cross-referencing or auto-synchronization of the projects treeview control 196 is required and execution flows to the block set category filter 522.

However, if the user has selected a subfolder in the categories treeview control 198, another three-step process must be executed by the file and digital content processor 86 to transform the shell browser and view component 84.

Thus, it becomes apparent that treeview controls have a great deal in common when in it comes to generating system requests. The root-level folder always represents a single filter to be applied. The subfolder always represents a pair of filters.

Thus, in a block the system will obtain the project identifier 254 value of the categories treeview subfolder representative of the project filter to be applied 526 to all screen transformations. Like the category subfolder, the project subfolder exists only by virtue of its relationship to a containing folder, in this case, a category, as resolved through the project and category attributes of any given item in the system, and by association, any file.

Thus, user selection of a subfolder from the categories treeview always represents a product; items possessing the project identifier 254 value of the subfolder, and the category identifier 252 value of the containing folder. Again, these can be thought of as the parents of an item. Subfolder selection always applies a specific project-category-pair used by the system for filtering the files pane 182 and items pane 180. As mentioned above, selecting a subfolder always has the effect of climbing the treeview structure to obtain the value of the containing folder. In this case, at a block the system will set the category filter to the category identifier 252 value represented by the project subfolder's direct root-level parent in the treeview control structure 528.

As abundantly mentioned, the dual treeview controls enforce an auto-synchronization process that is triggered by subfolder selection. Each subfolder's identifier value can be mapped to a root-level folder in the opposite treeview control; and this is precisely what makes the treeviews dynamic. This is the heart of exposing data constructs capable of browsing horizontal relationships.

By revealing "one-offs" of specific project category-pairs as ancillary, unselected subfolders of selected folders, users can easily and quickly change the pivot, or viewpoint used, to examine items and files representing the products of other couplings of root-level folders.

It cannot be emphasized enough the earth-shaking ramifications represented by such a dramatic departure from traditional folder browsing. Users now possess the means, and methodology, to visually explore the relationships inherent, yet hitherto lost, in traditional systems; namely simultaneous horizontal and vertical integration along two dimensions; project-centric and category-centric browsing.

The capacity for horizontal and vertical integration thus quadruples the basic views available to users of the system. All that is required to realize this informational cornucopia is an understanding of two relatively uncomplicated concepts; namely project-category-pairs, and item/file explorer modalities.

Further, the proximate visualization of other pairings for a containing folder, modeled as subfolders, empowers users to discover files and items that may possess an interconnected relationship that is simply incapable of visual representation in single treeview style shell explorer paradigm.

Prior art is severely challenged by the single treeview control methodology. There can be no simultaneous alternate visual representation of a dual cross-referenced relationship because the concept of basic data building-blocks, or units, i.e., items and files, requiring two parents for creation, is counter-intuitive to current explorer, or information management systems, which adopt physical, or pseudo-physical, i.e., virtual folder system, methodologies.

The absence of a second treeview in prior art embodiments, let alone one that is dynamically connected via a cross-referencing methodology of dual categorization pairings, is, in a nutshell, uncharted territory in the wilderness that is information management. The requirement is not merely to examine dual representations of the same thing, but also to view offshoots that are partially correlated to any given project-category-pair from both sides of the pairing; namely project to category, or, category to project. The dual treeviews taken together create the simultaneous viewpoint with no toggling required by the user.

In short, the embodiment eliminates a tremendous amount of unnecessary folder browsing. To even achieve a pale imitation of this capability a user would be forced to open two separate instances of an explorer and view them side by side. Any and all associations would require human thought, and manual folder browsing in separate disconnected, static instances of a prior art shell browser.

Thus, in the embodiment, to automatically synchronize the projects treeview control 196 with the selected categories treeview control's selected project subfolder, in a block the system transforms the projects treeview control 196 such that it displays and highlights the same project as that of the selected subfolder 530.

At this point the categories treeview control 198 oriented portion of the logical bifurcation, supporting the dual, auto-synchronized treeview control shell browser and view component 84 is satisfied. Once again logical flow of both use-cases has converged after all procedural steps have been completed that are necessary to populate parameter values for requests to the file and digital content processor 86 request broker component 82.

Now that the use-case specific flow has converged, yet another critical requirement of the system must be satisfied; which explorer mode for the view panes to implement; item or file?

Thus, in a decision block the system determines whether its dual explorer mode is set to its default of item explorer mode 538, or, the user has toggled the explorer mode toggle checkbox 192 to put the system into file explorer mode. File explorer mode transforms the files pane 182 such that all associated files are displayed through the resolution of their associated item identifier 256 values as queried by the system, matching by current project, or category filters, as may exist due to the aforementioned use-case scenarios.

Should item explorer mode be controlling the screen transformation request, in a block the items pane is transformed to display all items corresponding to the various use-case scenarios 540 as they relate to treeview selection. This always results in the same general process executing in the various components of the file and digital content processor 86.

Requests are received by the request broker component 82 containing multiple parameters, including the explorer mode active; as well as identifier values representing various filters the embodiment offers the user for refining data displayed. The project and category filters, as depicted in this diagram, are of paramount importance to the system when constructing queries to the relational database 66. These become the values for the SQL "where" filters supplied to the SQL query, generated by the query builder component 70. These are stored in, and served by the filter component 80 in an on-demand basis to the query builder component 70.

Therefore, at the point where the request broker component 82 receives a request generated by the use-case of selecting a folder in a treeview control, the file and digital content processor 86 can parcel or subdivide the request into different components, to most efficiently transform the data sent back to the user. For example, the filter component 80 can store values for project, category, item subject, file name, etc., throughout the user's session. Thus, the filters possess a "stickiness" in that once a folder is selected it will affect the project filter, the category filter, or both in the case of subfolder selection, which always includes its containing folder, as a parameter, in requests issued to the file and digital content processor 86.

However, those skilled in the art will recognize that the absence of filters is as valuable as the filters themselves. Further, the system should remember previous filters until they are changed to reduce user effort unnecessarily. Therefore, to remove a project or category filter, the user must first take affirmative action, or the filter's most recent value, even if it is a default value of "no filter", will persist for the duration of the user's session. For example, the remove project filter button 222, and the remove category filter button 224, will remove the project and category filters respectively, and represents affirmative action on the user's part. It must be noted that in this embodiment, filter pairs are always optional, i.e. the user can see all items for a project, all items for a category, or all items for a project-category combination. Further, there is no requirement to have either project or category filters active, in which case data under management can be viewed for all projects and categories.

No skill in the art is required to appreciate that files are often associated with a primary data representation. In the case of this embodiment, the primary data unit that organizes and integrates files throughout the system is the item. This arrangement is on par with the typical email system, and can be appreciated by anyone familiar with how an email system functions. Emails are the primary unit of an email system. Emails possess individual attributes, e.g., a subject, a recipient, a sender, perhaps a "cc" (carbon copy list) thereby to include other recipients, a document body containing the email text, any images, etc. The email, like the item, has its own unique value or meaning, that is system, or, implementation specific.

Yet regardless of the context represented by basic units in a data management system they generically integrate as the fundamental building blocks of said system. Those skilled in the art will appreciate that no contemporary information management system can be considered complete without a way to manage files. Items, like emails, can have files associated with them as "attachments".

Using our email analogy we find that this email to attachments/files relationship creates a conundrum when it comes to dealing with files; how to simultaneously model two separate relationships; namely attachments to emails and attachments to other attachments connected with other emails, and finally all files in the system independent of emails.

Therefore most email systems choosing to simply model the email to attachments relationship do their users a disservice by preventing a broader perspective of all files on a system, not to mention different sub categorizations thereof; e.g. by related emails.

For example, in an email system, emails containing attachments usually have a paperclip icon next to the e-mail's subject. The user interprets this as meaning the email has one or more attachments. Thus, to view said attachments, the user must open the email, whereby a mechanism is presumed to display the attached files and allow further interaction with them.

While this methodology is relatively straight-forward it is, unfortunately, tremendously limited. It completely neglects the relationship of emails to one another, and how that might affect the relationships of attached files. For example, two separate emails could be part of an email thread concerning a job applicant sending their resume to a corporate recruiter to try and land the job of their dreams. There might be documents in both emails added as attachments, and presumably, they would relate to the same subject; getting a job. However, to access both sets of files in an integrated fashion, the user would have to view each email separately, perhaps by opening the email program twice if that is possible. Regardless of whatever hoops a user is willing to jump through to bridge the gap, the lack of specific integration features, or functions, for toggling the view mode to model or represent the files/attachments to items relationships, in addition to the file to file relationships, as resolved both through the emails, and amongst the files themselves, remain absent.

The file and digital content management system 94 takes a different approach than that of the typical information management system, be it an email system or a file shell browser style explorer system. The embodiment stresses the interconnectedness of not just items as they relate to both projects and categories, but also to files as they relate not just to items, but as they relate to projects, and categories, too.

As every file can be traced to an associated item 244, and every item can be traced to both a project and a category, the files pane 182 can either represent the direct file to item association to control file display, as is the case in item explorer mode, or it can use the associated items 244 by proxy, to treat files like items for the purpose of project and category-wide browsing of files, i.e.; file explorer mode.

Those skilled in the art will appreciate that data is a valuable commodity and further, that data is relativistic, in the sense that data exists in a context. Certainly, systems that do not support a methodology empowering system users to easily and intuitively discover the interconnected relationships existent in their data is one that is sorely lacking. The great advantage of digital systems is, in a word; automation, and it is an irony that users must still resort to tedious treeview folder browsing to remain productive, as is required by "prior art" embodiments of shell browser style explorer paradigms. Thus, in a block the system transforms the files pane 182 by any available project, and/or category, filter(s), that are either in the immediate request generated by a treeview control use-case, or resulting from a current request combined with previous filters stored in the filter component 542.

This covers all combinations of transforming items, and files, as they relate to both one another, and to projects and categories. From this point on additional granularity can only be achieved by further refining the filtered data, for example by applying a partial text match on an item name or file name, date range filters, shopping cart style selected item and file filters, etc.

Figure 6:
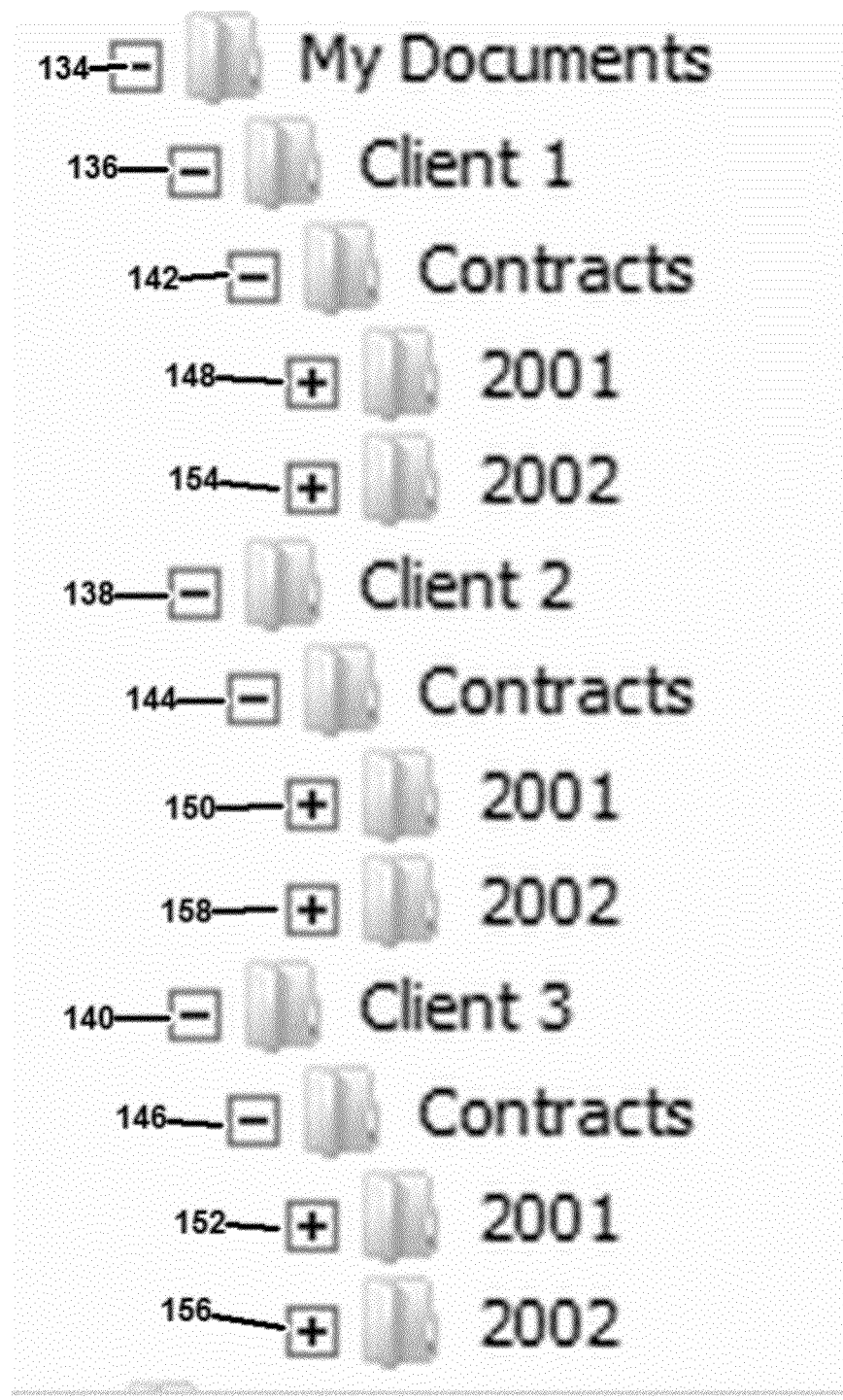
FIG. 6 is an illustration labeled as "prior art" of a traditional explorer treeview control.

As illustrated in FIG. 6, and labeled as "PRIOR ART", a folder is a "my documents" 134 folder. At a first level, the "My Documents" 134 folder includes a "Client 1" 136 folder, a "Client 2" 138 folder, and a "Client 3" 140 folder. Continued folder expansion or browsing reveals an additional level of folders, namely the "Client 1 Contracts" 142 folder, "Client 2 Contracts" 144 folder and the "Client 3 Contracts" 146 folder. Browsing ever deeper through the folder structure then reveals the existence of the "Client 1 2001 Contracts" 148 folder, the "Client 2 2001 Contracts" 150 folder, and the "Client 3 2001 Contracts" 152 folder, in addition to the "Client 1 2002 Contracts" 154 folder, the "Client 2 2002 Contracts" 158 folder and the "Client 3 2002 Contracts" 156 folder.

It will be appreciated that a number of obstacles are presented to the user who wishes to navigate a physical folder file structure contained within one treeview control, as illustrated in FIG. 6. For example, if the user wishes to work with all of the contracts that the user has produced, the user will first need to navigate to the folder to work with the contracts for "Client 1" 136, and then will have to re-navigate to the folder to reach the contracts for "Client 2" 138, and will again have to re-navigate to the folder for the contracts for "Client 3" 140.

This arrangement makes it difficult for the user to access all of the contracts, and in general, prevents simultaneous viewing and manipulation of all of the contracts. Similarly, if the user wishes to view all of the contracts produced in the year 2001, the user will have to navigate and re-navigate to the "Client 1 2001 Contracts" 148 folder, the "Client 2 2001 Contracts" 150 folder and the "Client 3 2001 Contracts" 152 folder.

The dual treeview controls of this embodiment provide a satisfying alternative to unlimited, unpredictable, and unwieldy hierarchies of folder structures characteristic of single treeview explorer shell interfaces mapping to physical directories on a hard disk 91, or other similar media. Few long time computer users could claim immunity from the "needle in a haystack" trap this paradigm ceaselessly threatens to spring upon any but the most vigilant, organized and conscientious users.

Currently, the alternative paradigm is the virtual folder system. While offering more possibilities than the traditional, physically structured treeview hierarchical representation, nonetheless, it too, suffers from many of the same deficiencies described in FIG. 6.

Figure 7:
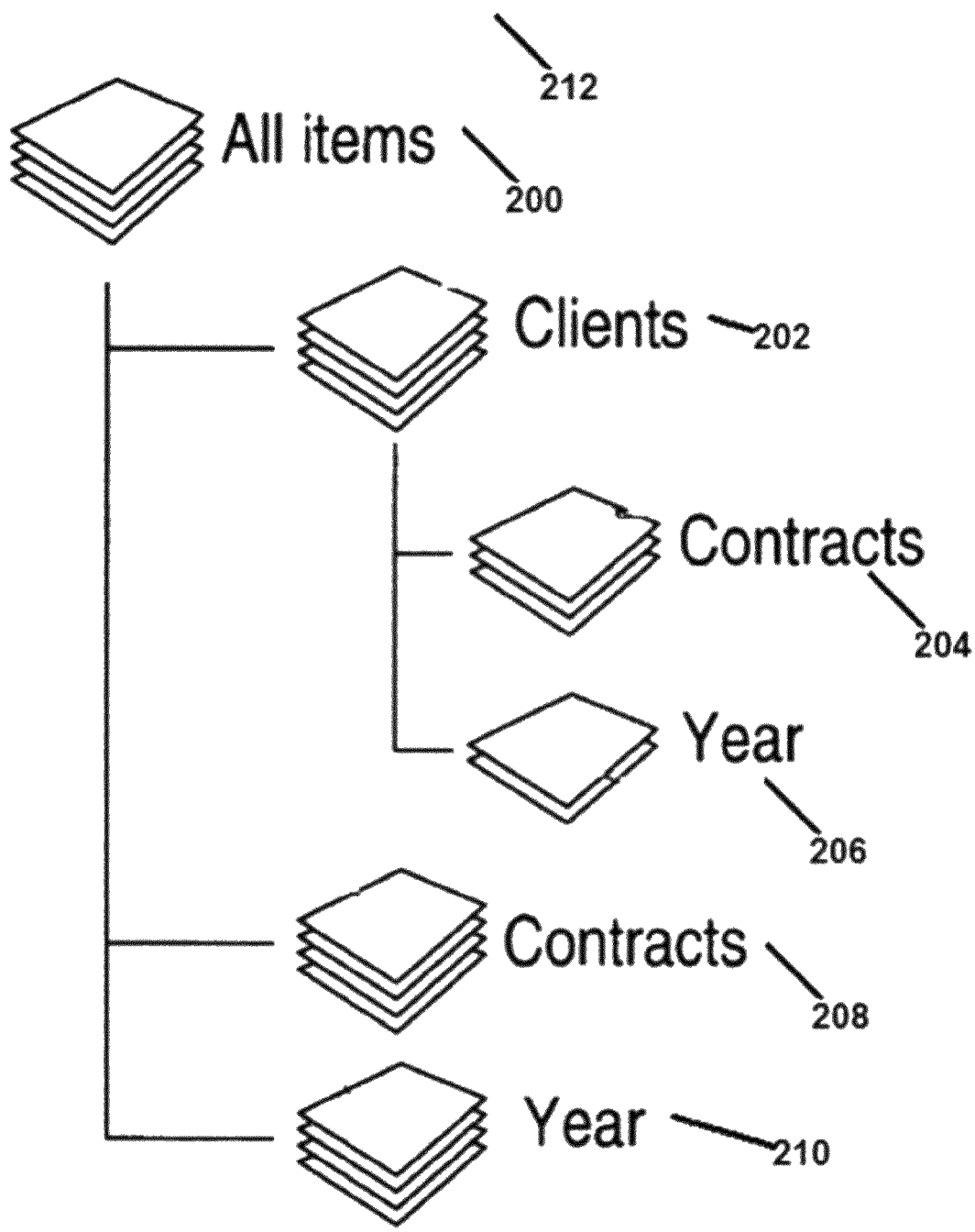
FIG. 7 is a tree diagram labeled as "prior art" of a virtual folder structure.

FIG. 7 is a diagram labeled as "PRIOR ART" of a treeview diagram of a virtual folder structure 212.

As will be described in more detail below, virtual folders etc. location-independent views that allow users to manipulate their files and folders in abstracted ways, attempting to bridge the gap between location and content, insofar as the information relates to organization, presentation, and manipulation. As shown in FIG. 7 virtual folders are represented as stacks. A virtual folder is an "All items" folder 200. At a first level, the "All items" folder 200 presents the same information as FIG. 6, in three root-level folders, namely the "Clients" folder 202, the "Contracts" folder 208, and the "Year" folder 210. At a second level the "Clients" folder 202 expands to reveal the "Contracts" subfolder 204, and the "Year" subfolder 206.

While this enables users to change the view perspective, or pivot, by clients, contracts and year respectively, nevertheless users must still manually dig into the folder structure to toggle views of files and items; in other words, the user cannot see all the pivot views simultaneously. Further, as attributes, or metadata, are leveraged to create stacks in these types of systems, additional vertical nesting of folders as attributes will be drawn to the screen, thereby increasing the level of complexity of both the relationships being modeled, and the steps required to manipulate information. By providing three different views of the same data the user must confront three top level choices, and then, yet another two additional nested choices.

This type of matrix results in a situation where one more folder, e.g. "tax records" would result in four first level choices and three second level choices. Yet another modeled metadata attribute, e.g., "purchase orders", would now result in 5 first level folders and four nested folders per first level folder. There is both a multiplicative, and a duplicative effect on the treeview structure. Rather than one folder modeling contracts, we end up with one "Contracts" first level folder, and then one "Contracts" subfolder 204 per first level folder, namely a "Contracts" subfolder 204 under "clients" and under "year". Further complicating matters, should the nesting level in FIG. 6 grow in size, so too does the virtual folder system in FIG. 7. For example if "years" were further divided into fiscal quarters, four additional folders would be added to the structure; e.g. "2001 quarter 1", "2001 quarter 2", "2001 quarter 3", and "2001 quarter 4".

In FIG. 7 that would result in a third level of the treeview structure and an additional 12 folders. Should the "Fiscal Quarters" folders be further sub-classified the process would continue, adding one level of virtual folder per every folder on the parent level. The complexities of representation, and therefore manipulation, inherent in a single treeview folder structure, regardless of physical modeling or virtual modeling, remain; except now the problems of duplication required to model the different categories create new challenges to the user. Further, as treeviews are contained by the height of the screen, duplication can easily lead to errors as users have to scroll up and down to discern the context of the folder viewed; i.e., is it the "Contracts" folder of the "Clients" folder 202 or the "Year" folder 210?

The greater the number of levels, the more horizontal and vertical scrolling required to keep one's place, and therefore, train of thought. Fatigue and errors are often the result and productivity suffers accordingly. In short, the single treeview shell, irrespective of virtual or physical folder methodology or modeling, does not scale well vertically, and does not scale at all horizontally, as all attributes are modeled by adding levels to the single treeview. Thus, the prior art embodiments still leave a wide gap between the way data is modeled on the screen versus how it is mentally or conceptually modeled by human users; in other words the natural way we relate information in our heads is diametrically opposed to the endless, unwieldy, vertical nesting, inherent in all shell browser paradigms to date.

In terms of abstraction required to create a hierarchical deeply nested treeview modeling the type of virtual folder systems existing in prior art, the user is expected to associate folders with columns; a major paradigmatic shift that is counter-intuitive. In traditional tabular, or row and column based depictions of data as found in relational databases, spreadsheets, and general listings of information, each column represents attributes of the thing described. For example a file has a name, a size, a date modified, and a type amongst other possible attributes. For a virtual folder system like the one described in FIG. 7, to model this paradigm, folders would be created for all files, filename, data modified, type, etc.

The tabular format pre-dates the popularity of the personal computer 62, and is both familiar and self-explanatory to most computer users. Things are visualized horizontally.

A single file would be depicted as one row comprising many columns. This is a horizontal, discrete conceptualization of data. The virtual folder system converts this row into a vertical column of folders, thus changing the physical orientation of the way data is typically visualized. Additionally, each view in the type of virtual folder system described in FIG. 7 must create one folder per column and then nest all additional columns as subfolders.

Thus, eight columns for a "thing" results in eight primary folders containing seven subfolders, the unwieldiness growing in direct correlation to its size. This is in direct contradiction to a tabular format where there is only one row to represent one "thing"; the concept of "one" representing the quintessence of simplicity. However, with the file and digital content management system 94, the simplicity of the traditional tabular structure for listing items and files is maintained by the simple realization that single treeview structures are ill-suited for the modeling of horizontal structures.

The typical shell browser interface is overstressed trying to represent horizontal and vertical relationships simultaneously. This embodiment, by simply creating two complementary treeview structures to model the same data along dual dimensions; namely project and category, can maintain the simplicity of the tabular format for representing attributes, or columns of a "thing".

Figure 7B:
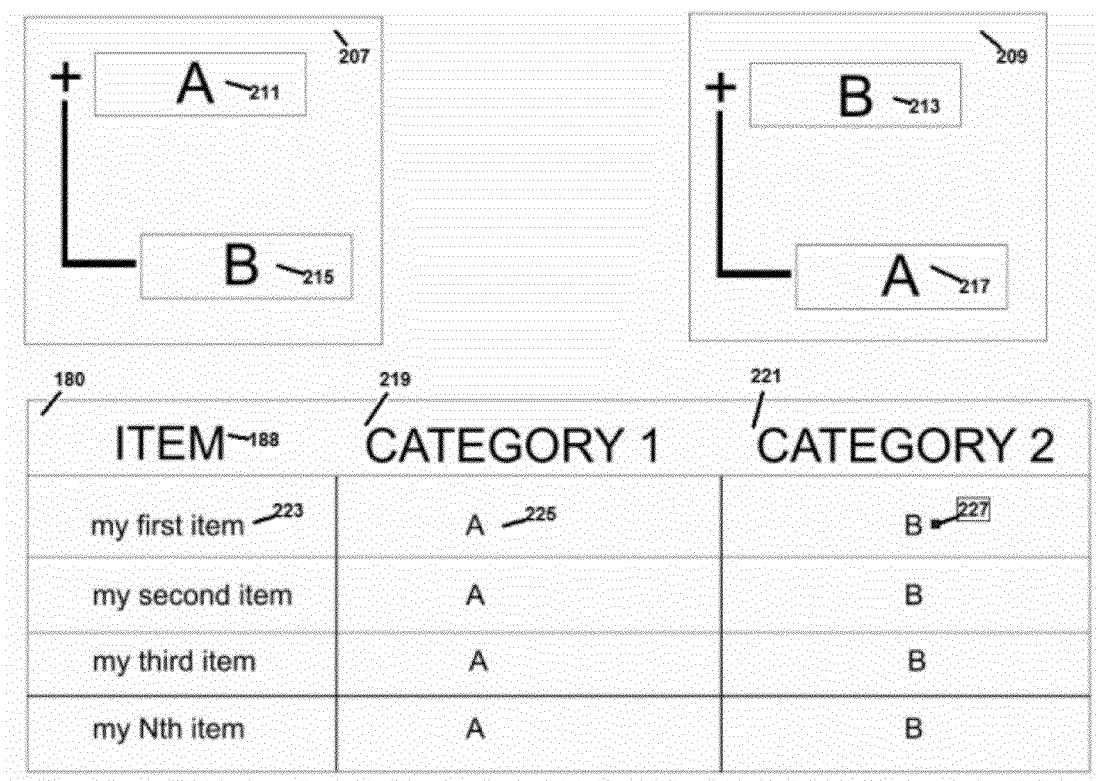
FIG. 7B is an illustrative diagram of the shell browser and view component's dynamically linked, dual-treeview cross-referencing system for transforming the items pane utilizing the category-pairing paradigm implemented by the system.

FIG. 7B is an illustrative diagram of the graphical user interface's dynamically linked, dual-treeview cross-referencing system for transforming the items pane 180 by the category-pairing paradigm implemented by the system. The folders or nodes do not model physical folders, nor do they model a virtual folder system based on "stacks" of metadata as is found in prior art. While they may be "virtual" in the literal sense in that they do not map directly to physical locations on a magnetic storage device, they possess a distinct, and unique, dual-attribute methodology that is absent in prior art and should not be confused with other virtual folder methodologies.

While the embodiments described in the other diagrams all refer to "project-category" pairings, it must be stressed that the specific names used to label the two categories; e.g. projects, categories, etc., are completely arbitrary assignments that in no way should be construed as limitations of the invention or to any specific embodiment.

While an individual can have their name legally changed they are still, after all, the same person, and such is the case with the dual categorizations naming convention. The essence of the dual treeview categorization, and organization methodology is the flexibility inherent therein.

The naming of the two categories can be any arbitrary assignment whatsoever, much in the way a rose by any other name would still smell as sweet. Thus, to clarify the flexible nature of the dual-categorization methodology that lies at the heart of the invention we can imagine that the two broad categorizations used to create items can be named in any manner beneficial to the types of items saved. Further, while the embodiments discussed elsewhere presume the user is naming the root-level folders or categories of the system, this can be done at a systems level.

For example, in an embodiment for organizing clothing for a retail website we may have two broad categories labeled as "apparel" and "manufacturer". Thus all items would contain an "apparel-manufacturer" category-pairing. In this case the user would presumably not be naming the individual category assignments, or root-level folders.

For example, the system could automatically name the folders based upon items found in inventory, thus one item might be a men's suit from the manufacturer "Hugo Boss". Here the item could be "Grey Single Breasted Suit 42R" and the category-pair could be "Men's Suits-Hugo Boss". Thus FIG. 7B distills the invention to its essence, a generic and flexible dual taxonomic methodology for identifying, organizing, and manipulating stored digital items. Items can represent absolutely anything from suits, to compact-discs, to movies, to DNA Sequences. Further, the names of the two umbrella categorizations can be anything that best suits any particular embodiment, and finally the origination of the individual category assignments can be user, or system generated, or both.

For a medical oriented embodiment we might have two broad categories such as "diseases" and "treatments" and all items would then simply consist of "disease-treatment" category-pairs. Or, in a music-related embodiment the categories could be labeled, "genres" and "artists" and every music-related item would possess a "genre-artist" category-pair. The underlying process, and requisite hardware, required to implement any customized embodiment would be no different, only the names of the treeviews would change to accommodate the desired embodiment's theme. Or, as in FIG. 7B, we can simply have two broad categories for illustration of the flexible and generic nature of the cross-referencing methodology entitled, "Category 1" and "Category 2".

This should drive home the point that the invention is completely adaptable to any type of digital data items that require manipulation. Further, there is no absolute requirement that the system needs to manipulate computer files, in addition to digital data. An embodiment of the invention could simply manipulate digital items without the need for associated computer files.

For example, an embodiment that comprises an online encyclopedia e.g., "wikipedia", could benefit from the dual-categorization methodology by creating two broad categorizations, "field" and "contributors" and could thus organize encyclopedic items utilizing "field-contributor" category-pairs. Here, there would be no "hard" requirement to include a digital file management system in this hypothetical encyclopedia embodiment, and all the benefits of the dual treeview categorization methodology would remain intact.

However, should it be perceived at any point the addition of an associated file management feature would be beneficial, the system, as mentioned throughout this document, is equipped to support it.

Thus, we can isolate the key features of the system's dual-categorization and dynamically linked treeview controls in the most generic fashion; namely filtering, and dynamic cross-referencing of treeviews via subfolder selection, as is the case with FIG. 7B.

Here we have two treeview controls. The first is a treeview style control representing generic "Category 1" 207. The second is a treeview style control representing "Category 2" 209.

The "Category 1" treeview 207 contains a root-level category node, or folder, "A" 211, and a system generated "Category 2" subfolder "B" 215, indicative of one, or more, existent category-pairs found within the system's items.

The "Category 2" treeview 209 contains a root-level category node, or folder, "B" 213, and a system generated "Category 1" subfolder "A" 217, indicative of one, or more, existent category-pairs found within the system's items.

The items pane 180 lists the digital items under management in this example. It contains a list of items containing three key attributes, represented by the column headers of the items pane 180; namely, "ITEM" 188, "CATEGORY 1" 219, and "CATEGORY 2" 221. The "ITEM" column 188 lists the name of the item, the "CATEGORY 1" column lists the "Category 1" attribute values as they relate to the root-level folders of the "Category 1" treeview. The "CATEGORY 2" column lists the "Category 2" attribute values as they relate to the root-level folders of the "Category 2" treeview.

The folders and subfolders from either treeview act as a filter upon said items pane 180. The treeviews contain two types of folders or nodes; root-level and subfolders. The root-level folders act as independent transformative filters on the items pane. Thus, "Category 1" treeview root-level folders apply an independent filter transforming the items pane 180 to display items with a "Category 1" attribute value corresponding to the value represented by the root-level folder. The same is true for "Category 2" treeview root-level folders the only difference being the filter operates against the items "Category 2" attribute.

Subfolders, as mentioned above, are the other type of folders found in treeviews and by definition, and design, appear beneath root-level folders. As the subfolder represents existent category-pairs within the items of the system, they apply a dual-filter; the value of the subfolder, and the value of the containing root-level folder. Further, selecting a subfolder from one treeview will automatically synchronize the opposite treeview control such that it will display and highlight the root-level folder that corresponds to the selected subfolder.

Thus, if a user selects root-level folder "A" 211 from the "Category 1" treeview 207, the items pane 180 will be transformed such that only items with a "Category 1" attribute 219 value of "A" 225 will be displayed. Thus the item, "my first item", 223 which possesses a "Category 1" attribute 219 value of "A" will become part of the newly transformed items pane rendered information along with any other items containing the same value "A".

Similarly, if a user selects root-level folder "B" 213 from the "Category 2" treeview 209, the items pane 180 will be transformed such that only items with a "Category 2" attribute 221 value of "B" 227 will be displayed. Thus, again, the item "my first item" 223 which possesses a "Category 2" attribute 221 value of "B" will become part of the newly transformed items pane rendered information along with any other items containing the same value "B".

In this simplified example, the "Category 1" treeview subfolder "B" 215 maps directly to the "Category 2" treeview root-level folder "B" 213. Likewise, the "Category 2" treeview subfolder "A" 217 maps directly to the "Category 1" treeview root-level folder "A" 211. This illustrates the view-centric nature of the dual treeview methodology; every pairing of the two categories results in two views of the data displayed simultaneously; each view from alternate sides of the category-pair's perspective.

In this case the items listed in the items pane 180 all possess the category-pair "A-B". The "Category 1" treeview 207 affords the user a "Category 1"-centric view of the data and the "Category 2" treeview 209 affords the user a "Category 2"-centric view of the data. Should a user simply wish to view all items with a "Category 1" attribute 219 value of "A" they would select the "Category 1" root-level folder "A" 211, and be sure to clear any pre-existing selections from the "Category 2" treeview as category-pair filtering, or folder selection is additive. In this case, if there were category-pairings such as "A-B", "A-C", and "A-D", they would all be displayed in the items pane 180.

Similarly, if the user wished to view all items with a "Category 2" attribute 221 value of "B" they would select the "Category 2" treeview root-level folder "B" 213, once again removing any "Category 1" pre-existing filter if necessary. In this case, if there were category-pairings "F-B", "G-B", and "H-B", they would all be displayed in the items pane 180. Thus, the independent filtering nature of the root-level folders enables users to view data as it pertains to one unit of the pair.

However, as FIG. 7B illustrates, selecting either the subfolder "B" 215 from the "Category 1" treeview 207, or, the subfolder "A" 217 from the "Category 2" treeview 209 will create a full pair filter; "A-B", as we see illustrated in the items pane 180 of FIG. 7B.

All the rows in the items pane 180 have a "CATEGORY 1" 219 value of "A" and a "CATEGORY 2" 221 value of "B". Further, the automatic synchronization feature of the dual treeviews as previously mentioned, will display and highlight the corresponding root-level folder in the opposite treeview, along with any subfolders representative of existent category-pairings. This is the foundation of the system upon which all other embodiments, or manifestations will rest upon, a generic, dual taxonomic, or categorization system that can filter items along one, or both, sides of the category-pairings.

Thus, it becomes clear that the specific names of the two broad categories are malleable, it is the fact that two categories are required to create items in the system that is fundamental to understanding the system under discussion. A dynamically cross-referenced dual treeview shell or explorer interface can quickly, and easily, enable users to manipulate items under system management along these two broad categorizations. The ramifications of this approach to managing digital data shall be discussed further throughout the remainder of the diagram descriptions, and will hopefully become obvious to the reader in the embodiments provided beginning with FIG. 8.

Figure 8:
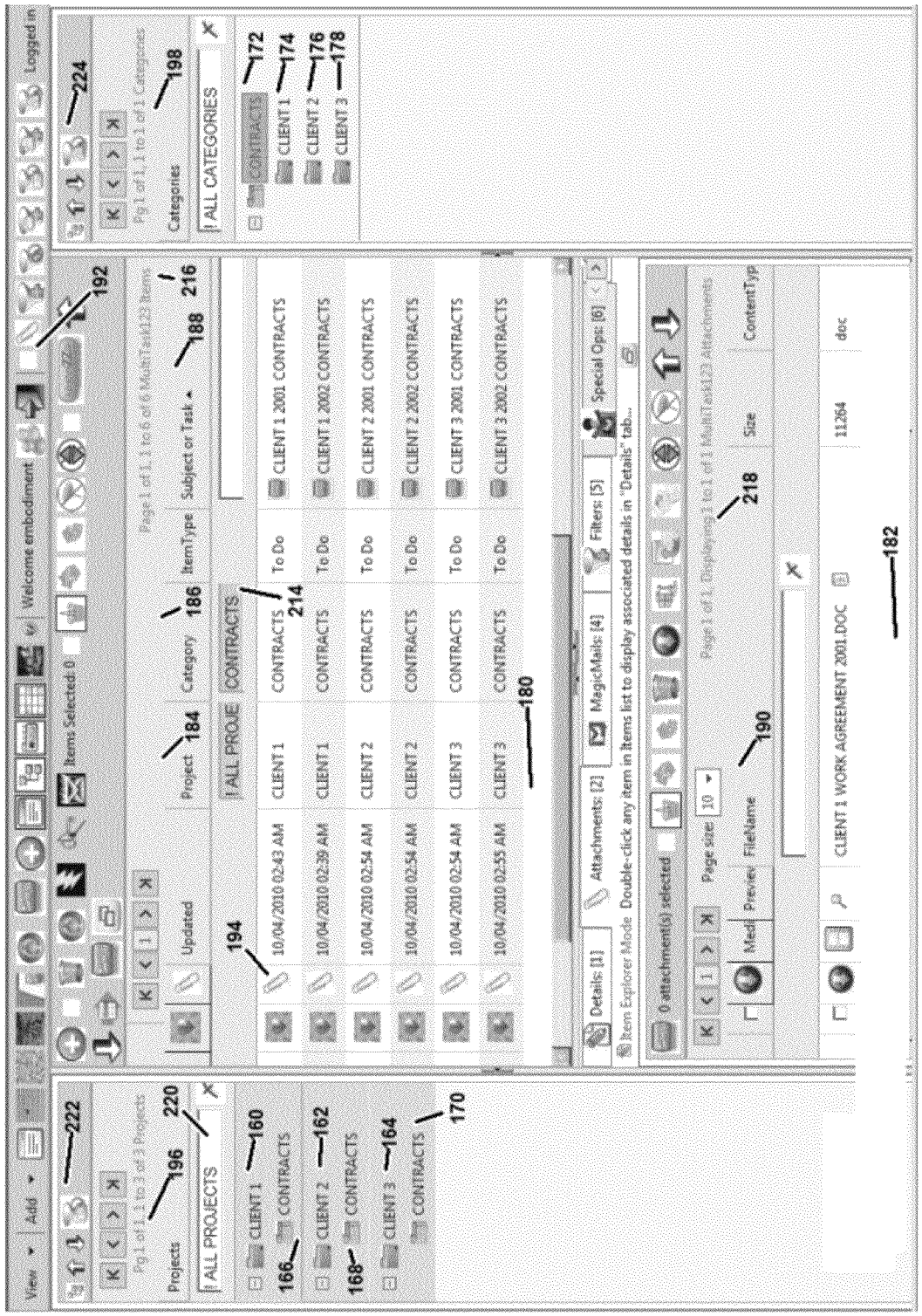
FIG. 8 is an illustration of the embodiment's client and contract example from an item-centric perspective.

FIG. 8 is an illustration of the item-centric mode of the shell browser and view component 84 using the same "Client"/"Contract" exemplary data found in FIG. 6, and FIG. 7, and further demonstrating the embodiment's methodology for addressing the various deficiencies described previously as it relates to prior art. As will be described in more detail below the current embodiment offers both solutions and new possibilities for the grouping and manipulation of massive amounts of information.

In FIG. 8 the information is broken into project-category-pairs. There are three projects and one category. The same three client folders from FIG. 6, namely, "Client 1" 136, "Client 2" 138, and "Client 3" 140 are modeled within the projects treeview control 196 of the embodiment with a first, or root-level, of three folders; namely, the "Client 1" project 160 folder, the "Client 2" project 162 folder and the "Client 3" project 164 folder.

The first level folders of the projects treeview control 196 each contain exactly one level of subfolders that represent project-category-pairs. In this case, the "Client 1 Contracts" subfolder 166, the "Client 2 Contracts" subfolder 168, and "Client 3 Contracts" subfolder 170.

The sole category in this diagram is represented by the "Contracts" category folder 172 in the categories treeview control 198. Here we find three subfolders for the Contracts category, the "Client 1" 174 project subfolder, the "Client 2" 176 project subfolder, and finally the "Client 3" 178 project subfolder.

FIG. 8, as evidenced by the unchecked status of the explorer mode toggle checkbox 192, provides the user with an item-centric view of the data. In this example, the active category filter 214 is set to "Contracts" by the user selecting the "Contracts" category folder 172 of the categories treeview control 198. The items pane 180 lists all items in the system with a category of "Contracts" and any paired project as illustrated in the items pane 180 project column 184.

The user can conveniently see the individual pairings for items by simply looking at the item subject column 188, the project column 184 and the category column 186 of the items pane 180. The filename column 190 of the files pane 182 displays the "Client 1 work agreement 2001.doc" file that is linked to the "Client 1 2001 Contracts" 148 item at row 1 of the items pane 180.

Here the user simply selects the item specific attachments link 194 to view associated files for any item. As will be seen in FIG. 9 the simple act of checking the explorer mode toggle checkbox 192 will create a file-centric pivot or perspective of the same data, opening exciting possibilities for understanding the data within the dynamic "at-a-glance" methodology of the embodiment.

The first thing to notice is the horizontal integration made possible by utilizing a dual treeview structure. At a glance the user can see by the item count display 216 that there are six items to view and by the attachments count display 218 that there is one file on display. The user can see that all items have a category attribute value of "Contracts", the selected category as visually indicated by the highlighted display of the "CONTRACT" category filter 214.

The existence of the paperclip icons for each row serves as a visual indicator that all six items have associated files, and thus, can be viewed in the files pane 182 simply by clicking the desired item's attachment link, i.e. the paperclip icon. Further, the user can see that there are items corresponding to the "Client 1" project 160 folder, the "Client 2" project 162 folder and the "Client 3" project 164 folder, visually indicated by the nesting of the "Client 1" project subfolder 174, the "Client 2" project subfolder 176, and "Client 3" project subfolder 178.

This is the category to project perspective previously mentioned. The exact same information shown in the items pane 180 is depicted in reverse, or "upside-down" fashion by the projects treeview control 196. Here we can see that the three projects, the "Client 1" project 160 folder, the "Client 2" project 162 folder and the "Client 3" project 164 folder, all share a pairing to the "Contracts" category as evidenced by the existence of the "Client 1 Contracts" subfolder 166, the "Client 2 Contracts" subfolder 168, and "Client 3 Contracts" subfolder 170.

Subfolder nesting in either treeview control can never exceed one level; i.e. the depth of the project-category-pair. Thus, there is a predictability inherent in the treeview controls' modeling of project-category-pairs.

The projects treeview control 196 will always list projects at the root-level and contains exactly one level of nested subfolders; specifically the categories subfolders. Conversely, the user can count on the fact that the categories treeview control 198 will always possess one root-level of folders representing categories, and exactly one level of nested subfolders; specifically projects.

Items or files are always grouped by either a project-centric view in the projects treeview control 196 as project folders and category subfolders; or by a category-centric view as depicted in the categories treeview control 198 as category folders and project subfolders. Rather than resort to the additional creation and nesting of folders to model "Year" or "Clients" as in FIG. 7, determining the year is as simple as taking advantage of the sorting and filtering functions offered by the items pane 180.

For example, a partial text match containing the text string, "2001", would only show items where the text string "2001" existed somewhere within the subject; namely all 2001 Contracts. Additional client specific filters can be applied simply by clicking the project folders.

Further, by storing all projects and categories in the relational database 66, each treeview control can be quickly filtered by typing a partial text match, for example, typing "client" in the project treeview text filter 220 would be sufficient to display all projects concerning clients. Applying the Google type search or filter methodology to refining projects, categories, items, and files provides a welcome alternative to managing very large treeview structures and leverages the project-category-pair paradigm in familiar and intuitive ways to minimize unnecessary user fatigue, and errors, resultant from browsing complex, and often abstract, hierarchies of folders.

The remove project filter button 222 in the projects treeview control 196 and the remove category filter button 224 in the categories treeview control 198 can quickly remove filters. This enables users to easily and intuitively filter by project, category, both, or neither. The column headers of the treeview controls and the view panes in the embodiment allow single, or additive multi-column sorting, in addition to partial text filtering.

This scenario not only provides a mechanism for horizontal and vertical scaling of data in the file and digital content management system 94 but encourages it by offering users a centralized interface that does not overwhelm with the abstractions and complexities inherent in prior art explorer type systems. All facets of the shell browser and view component 84 work in concert to manipulate a virtually unlimited number of project, categories, items and files.

Figure 9:
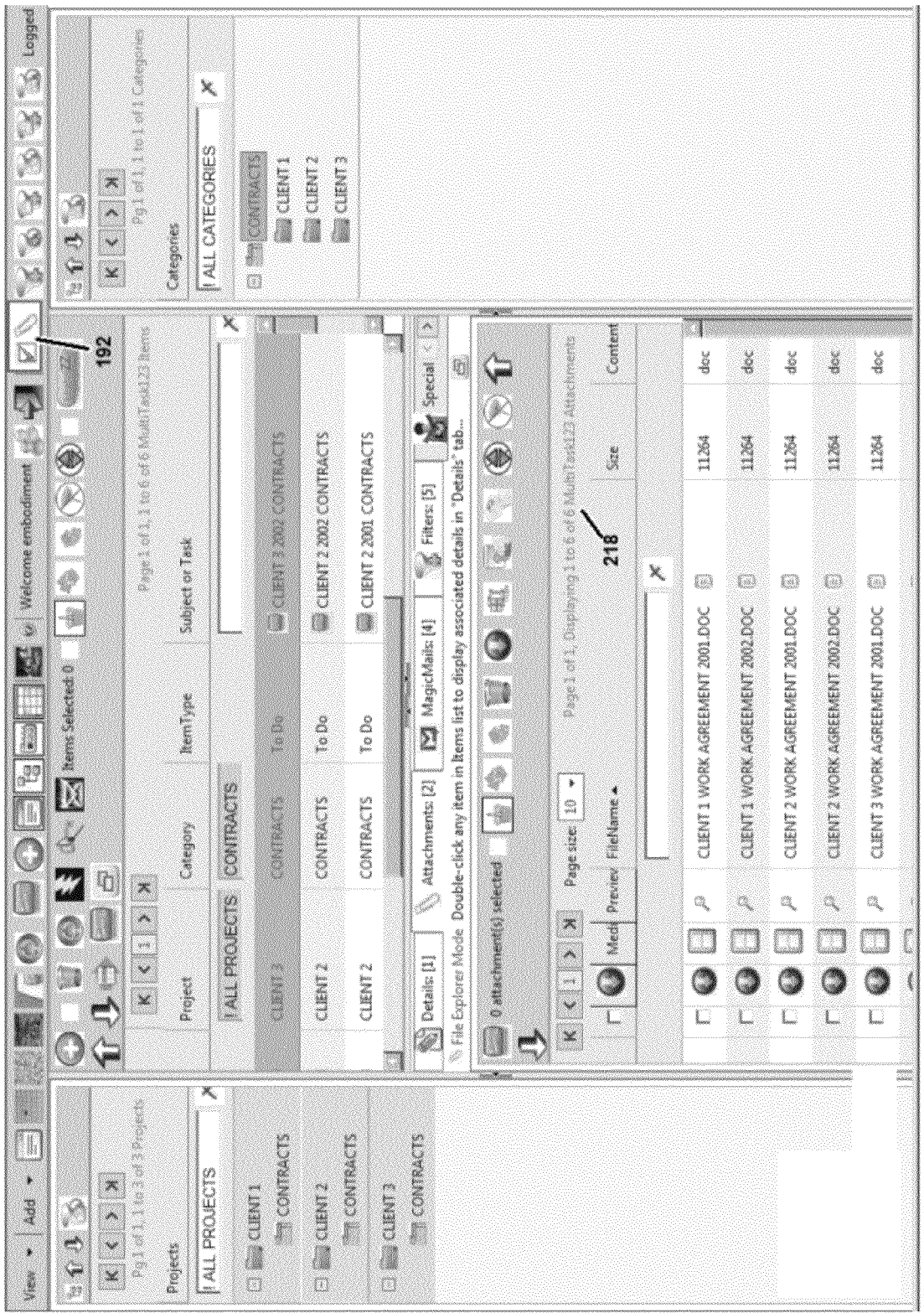
FIG. 9 is an illustration of the file-centric mode.

FIG. 9 is an illustration of the file-centric mode using the same exemplary data from FIGS. 6-8. The user simply needs to check the explorer mode toggle checkbox 192 and the shell browser and view component 84 transform the screen into a file-centric look of the same data.

Here as depicted by the attachments count display 218, we see there are six files that are associated with the active filter, namely a category attribute value of "Contracts" and no filter applied to project. In other words we see all "contract" related files in the files pane 182.

For a more granular view of any specific file's context, namely the item it is associated with, the user merely selects the file in the files pane 182, and the items pane 180 displays the matching item.

Thus, in FIG. 9 we see how the system supports a dual mode view of data under management; either item-centric, as in FIG. 8, whereby selecting items will display related files on a per-item basis, or file-centric as in FIG. 9, whereby selecting files will display the associated item 244 with which the file selected file was originally added to the system. Thus unlike other prior art systems, the file explorer mode can use the item as a metadata store; i.e. the file can be selected and viewed within the context of an item and all its associated attributes, e.g. modified last, details, subject, etc.

What file explorer mode does not change however, is the project-category-pair methodology. With elegant simplicity, the user can now store any type of rich digital content as an item, associate files with it, and take macro or micro perspectives of the data by simply selecting folders from the treeview controls. Further, the simple act of checking and unchecking, the explorer mode toggle checkbox 192 enables users to easily toggle explorer modes, thus integrating their data from a multitude of perspectives previously unavailable in the prior art. From the relatively simple examples covered by FIGS. 6-9, we can now explore more complex examples to further illustrate the benefits of the dual treeview and dual pane methodology represented by the embodiment.

Figure 10:
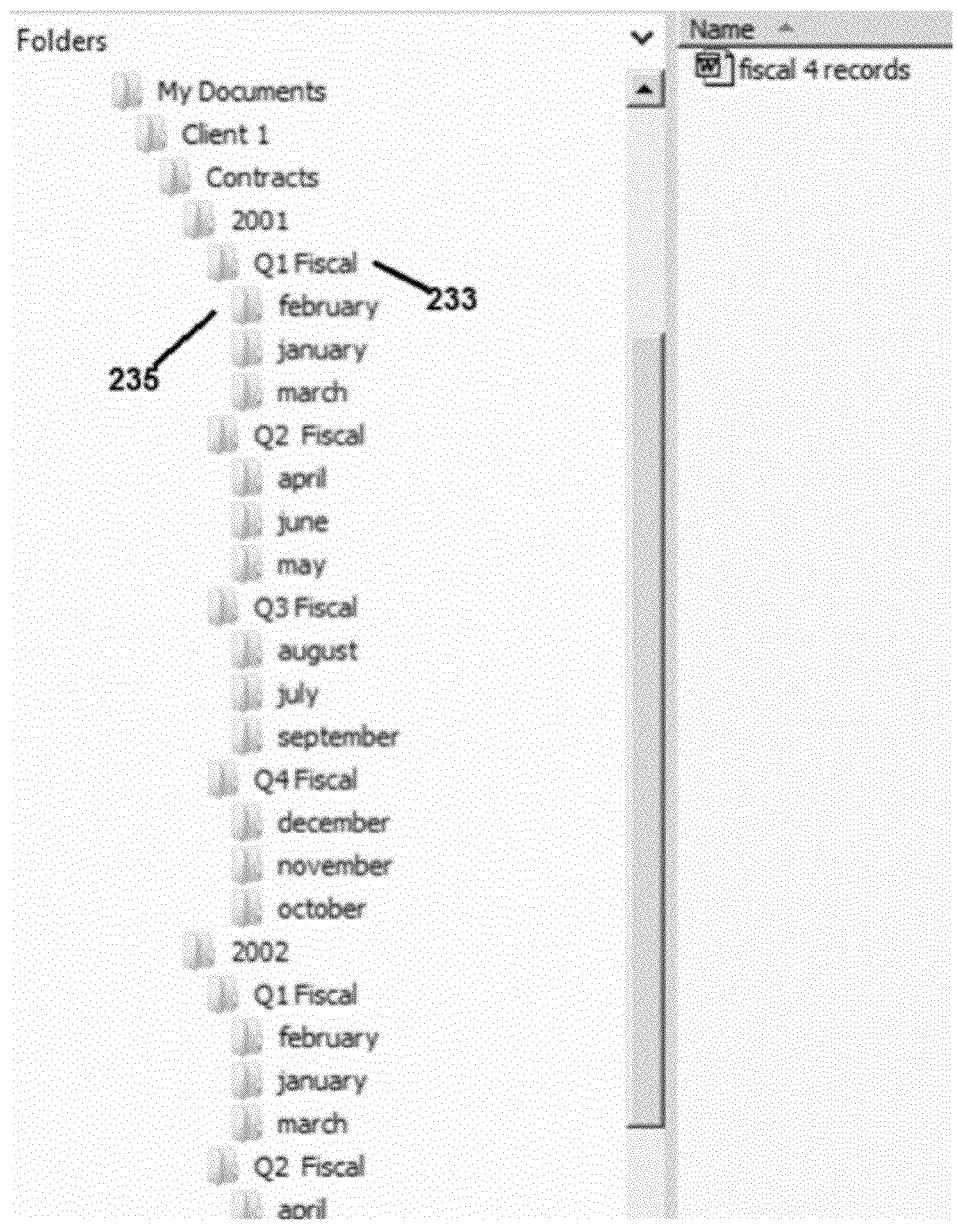
FIG. 10 is an illustration labeled as "prior art" of a typical single treeview shell browser, with a more complex nesting structure built upon the example in FIG. 6.

FIG. 10 is an illustration labeled as "PRIOR ART" of a typical, physical location oriented, single, treeview shell browser, with a more complex nesting structure built upon the example depicted in FIG. 6. This diagram depicts the results of further breaking the "Contracts" up not just by year, but creating further subdivisions by quarter and month. The "Q1 Fiscal" folder 233 is an example of an additional subdivision of the 2001 folder by quarter, and the "february" folder 235 is an example of yet a further subdivision by month of the quarter; the net result being two additional levels of folders cascading across the entire data model by following this pattern.

Figure 11:
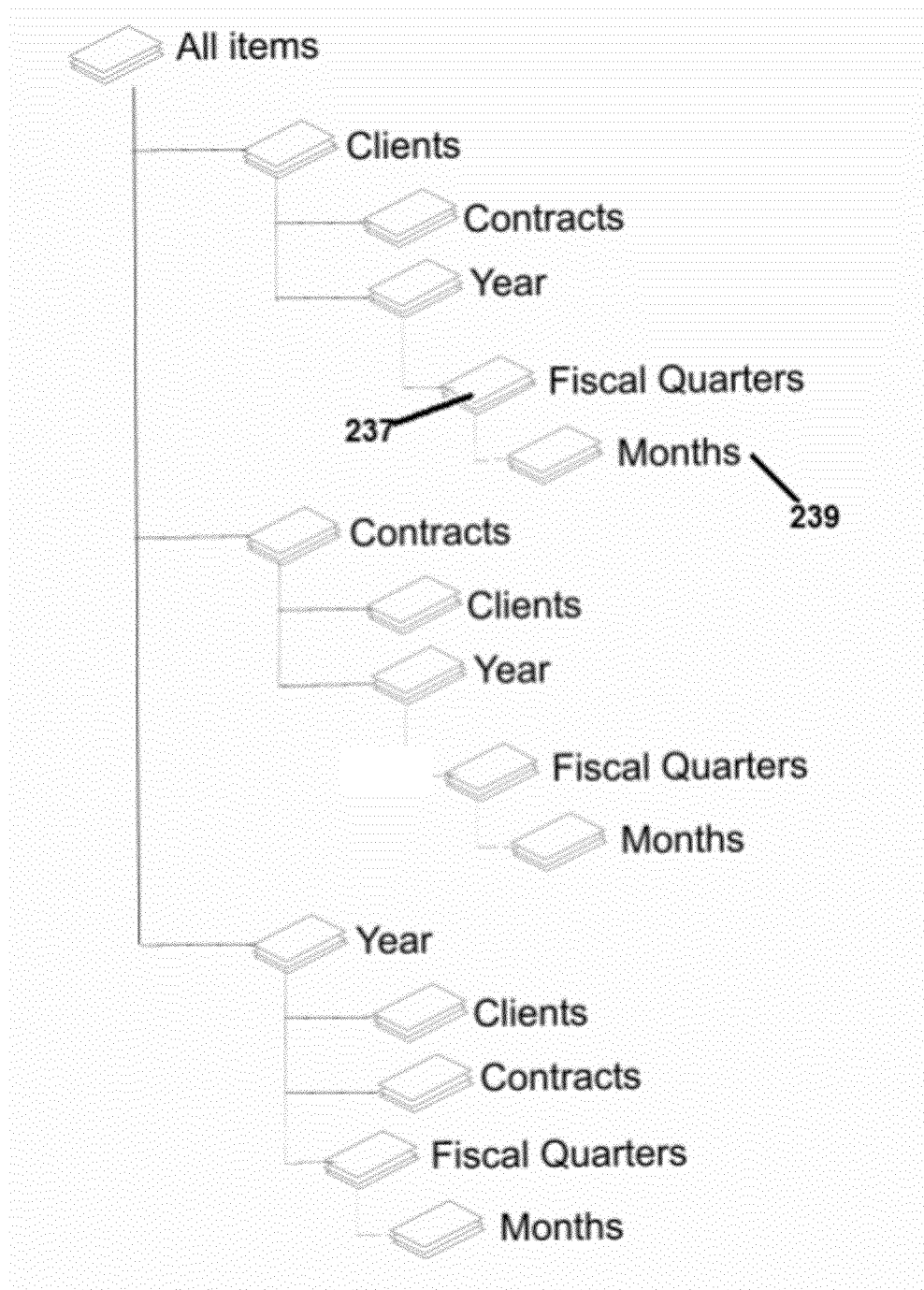
FIG. 11 is a tree diagram labeled as "prior art" of a more complex virtual folder structure built upon the example in FIG. 7.

FIG. 11 is a tree diagram labeled as "PRIOR ART" of a more complex virtual folder structure built upon the example in FIG. 7, once again, further breaking up the "Contracts" not just by year, but again subdividing by fiscal quarters and months so that the "Fiscal Quarters" folder 237 and the nested "Months" folder 239 once again leave the user facing an additional two levels of nesting to deal with during folder browsing operations.

FIG. 10 and FIG. 11, viewed jointly, distill the issue such that the type of treeview structure; physical or virtual, is clearly irrelevant in the quest to integrate information horizontally; both yield nil results in the quest for horizontal integration.

Instead both treeview manifestations only grow vertically, i.e. the inclusion of additional folder levels; namely the year being subdivided by fiscal quarters, and the fiscal quarters subdivided by months. Imagine if the months were then subdivided by weeks, days, hours, minutes, etc.

Both methodologies are simply approaching the problem by equating subdivisions of information with vertical levels in the structure. This requires an inordinate amount of time and concentration devoted to folder browsing. Such time spent is tedious, repetitive, and tangential to the task at hand which is simply to manipulate the system data buried somewhere in the vertically nested folders.

There is a "glass ceiling" on productivity which is simply the depth of the nesting; sooner or later like the children's game "Simon Says", the nesting becomes impossible to keep track of. Perhaps the issue is not so much a question of "where is it?" versus "what is it?", expletives omitted, but rather a question of "who is it?".

The "who is it?" methodology is exactly what the embodiment leverages by integrating the relevant project and category for any item or file as if it were biological parents to a child. The file and digital content management system 94 only asks the user to consider parent-child and sibling/half-sibling methodologies when working with digital information.

By virtue of our very existence, one can relate on all levels to a "who is it?" methodology. Human beings are self-defined by the family structure itself, and no relationship is more primary than that of parent-child. Equating information in a nuclear-family type framework, i.e. parents, children, siblings, and half-siblings, results in a natural and familiar approach to data. Items and files then become a child of two parents rather than an unknown and unpredictable level in a "where is it?" or "what is it?" endlessly nested treeview structure.

Figure 12:
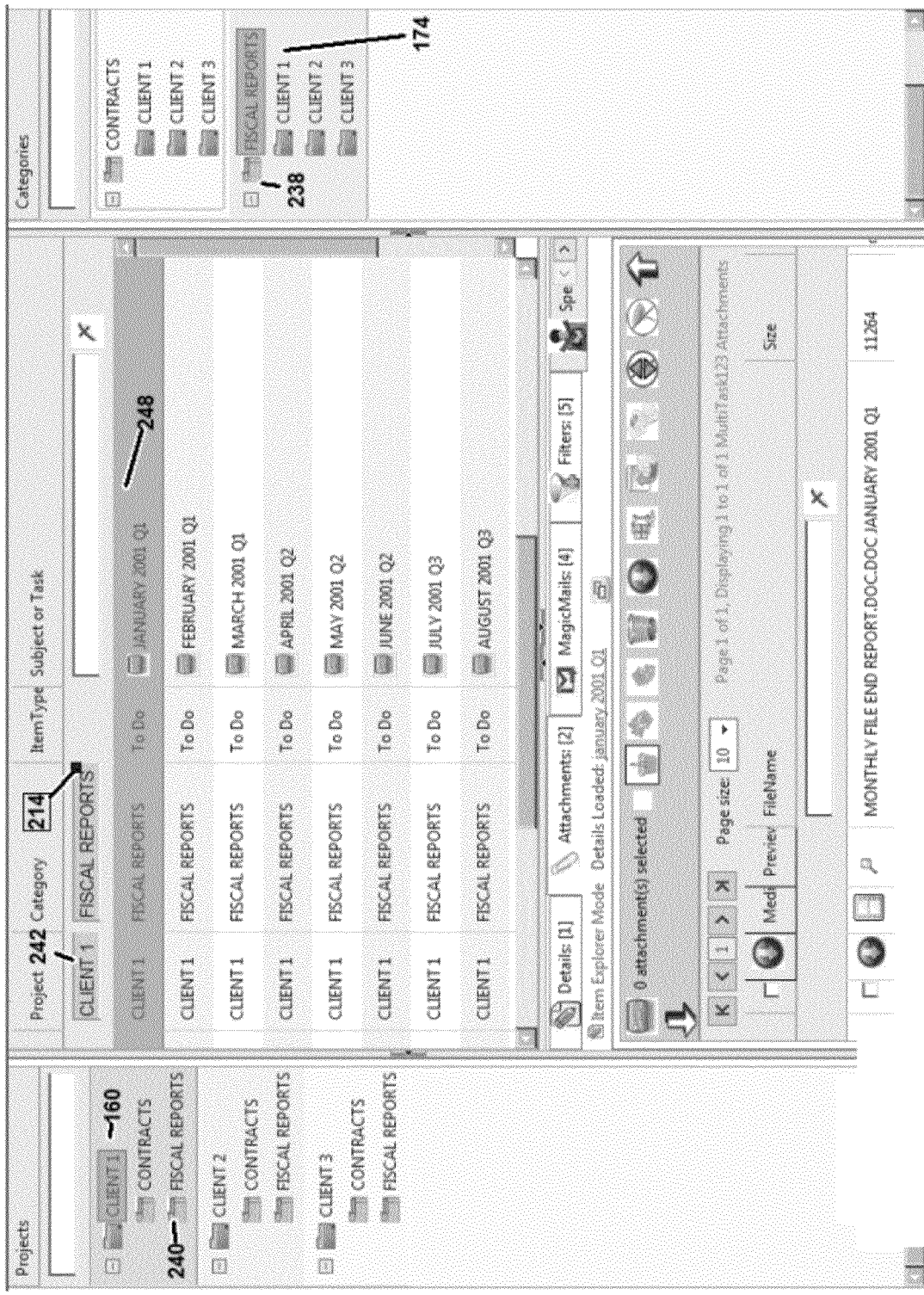
FIG. 12 is an illustration of the embodiment's item-centric mode with the more complex data structure used in FIG. 10 and FIG. 11.

FIG. 12 is an illustration of the embodiment's item-centric mode with the more complex data structure used in FIG. 10 and FIG. 11.

Figure 13:
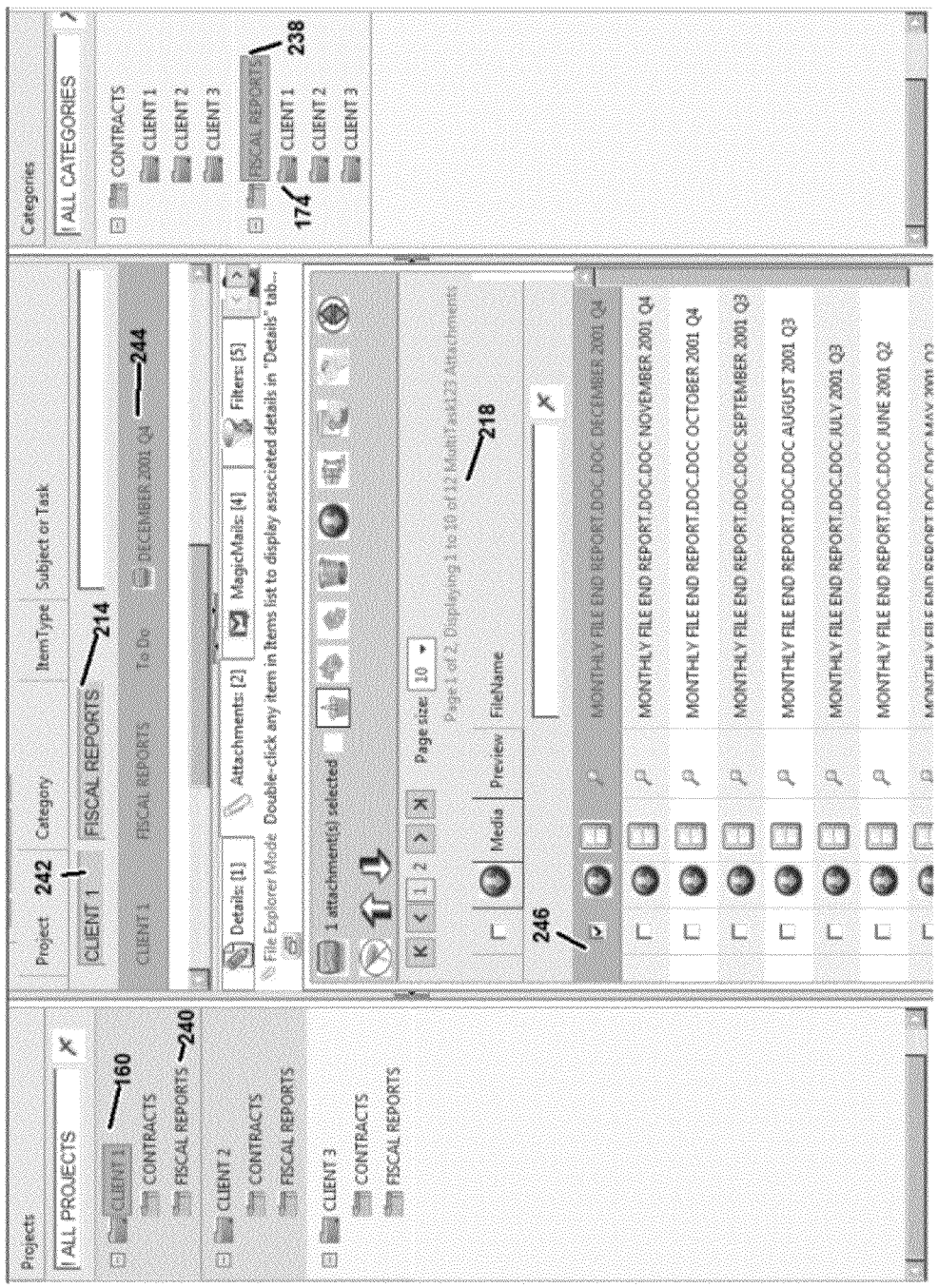
FIG. 13 is an illustration of the embodiment's file-centric mode with the more complex data structure used in FIG. 10 and FIG. 11.

FIG. 13 is an illustration of the embodiment's file-centric mode with the more complex data structure used in FIG. 10 and FIG. 11.

Both FIG. 12 and FIG. 13 are illustrative of the embodiment's ability to handle the increased complexity of additional sub categorization without sacrificing any simplicity in visual presentation.

FIG. 12 is an item-centric perspective, i.e., the user has not checked the explorer mode toggle checkbox 192. FIG. 13 displays the screen transformation when the user checks the explorer mode toggle checkbox 192 of the shell browser and view component 84 of the system. The only difference is the latter behaves as a file shell and the former as an item shell, as previously explained.

In either case, the user can see the "FISCAL REPORTS" 174 category folder displayed in the categories treeview control 198 and the "FISCAL REPORTS" category subfolder 240 displayed in the projects treeview control 196 under the projects treeview control 196's "Client 1" project 160 folder. In this example the user clicked the "CLIENT 1" project 160 folder and the "FISCAL REPORTS" category subfolder 240 beneath it.

The active project filter 242 and the active category filter 214 represent the project-category-pair controlling the browser shell and view component display, namely "CLIENT 1" project 160 and category "FISCAL REPORTS".

In FIG. 12 the user has selected item "January 2001 Q1 248", i.e., the first record of the items pane 180. This results in the files pane 182 displaying the associated file, in this case the month end report for January 2001, "MONTHLY FILE END REPORT 246.DOC JANUARY 2001 Q1 248".

In FIG. 13 representing the system's file explorer mode, the user has selected "monthly file end report 246" for December 2001, the first record displayed in the files pane 182, thus, filtering the items pane 180 on the linked, or associated item 244, "DECEMBER 2001 Q4". At no point does the embodiment add additional levels of vertically nested folders to model the increased complexity. All that is necessary is to add a new category for "FISCAL REPORTS".

The newly added "FISCAL REPORTS" category folder 238 in the categories treeview control 198 is automatically populated with project subfolders as items are added to the system with a category value attribute of "FISCAL REPORTS" and any other project the user may select. In FIG. 12 and FIG. 13 we can tell by glancing at the categories treeview control 198 that information exists for the "FISCAL REPORTS" category folder 238.

This is visually indicated by the "FISCAL REPORTS" category folder's 238 nested project subfolders. For example, the "CLIENT 1" project subfolder 174 of the categories treeview, "FISCAL REPORTS" root-level category folder represents the fact that items exist in the relational database 66 with project-category-pairings to match the folder/subfolder structure. This is the formula for understanding how relational database 66 tables are modeled by the treeviews and items pane 180 and files pane 182.

Further, now that the "client" project contains items for both the "CONTRACTS" category, and the "FISCAL REPORTS" category, we have achieved horizontal integration amongst the data. Without resorting to the need to activate pivots, i.e. select different folders, or, drill into unpredictably nested subfolders, the user knows that the "FISCAL REPORTS", and "CONTRACTS" categories, both relate to client related projects. At any given point the user can change the project and/or category filters and easily access the filtered items and/or files.

Moreover, at any point the user can sort and further filter data. Combined with the ability to easily toggle between item explorer mode and file explorer mode the user is empowered with both a powerful methodology and the appropriate tools to leverage it.

As mentioned, at any point the user can execute additional type related filters, and sorts, as they relate to projects, categories, items, or files. The system can scale to accommodate ever-increasing information loads without resorting to endless folder nesting, or, forcing the user to deal with virtual folders methodologies requiring a counter-intuitive paradigm that raises the bar to leveraging any potential benefits therein. The file and digital content management system 94 of this embodiment can best be described as maintaining an almost religious fervor concerning integration and simplicity.

From the structure of the relational database 66, to the components of the file and digital content processor 86, to the treeview controls and view panes of the shell browser and view component 84, the embodiment is the quintessential case of the whole being greater than the sum of its parts. The paradigm balances a generic dual categorization methodology with the full capabilities offered by modern graphical software interfaces.

Well known controls such as treeview controls, tabular view panes, text search boxes, etc. are leveraged to keep the user focused on the data itself rather than relying upon exhausting heuristic iterations to navigate the unwieldy characteristics inherent in all manner of single treeview shell browser style interfaces.

The goal of the system is to increase computer users' productivity by creating a shell around their digital world that does not require more than average computer literacy to exploit great efficacy in terms of personal organization and work output. In fact, this system functions well as a general purpose digital learning tool, in that major technology benefits such as internet webpage publishing, emailing links to items and files, embedding rich digital content, maintaining collections of digital content, etc. are integrated into the system; thus enabling novice and intermediate users to be as effective, if not more so, than more experienced users lacking in the precision data integration resources that this system represents; namely a one stop shop for most generic computing needs.

Additional embodiments can easily include loosely connected social networking applications, digital libraries, data warehouses, educational study aids, email systems, and any other type of application designed to address the requirements of organization, manipulation and communication as it relates to digital files and content.

And as evidenced by the computer model depicted in FIG. 1, the system could easily be used as an explorer shell for personal computers of any flavor, e.g., windows, apple, Linux. Further as depicted in FIG. 1B additional web based embodiments can easily include any other type of mechanism that requires users to navigate through tabular information, e.g. a video on demand service, reservation service for car rentals, hotel and airline reservations, etc. If it can be categorized along two dimensions the embodiment can accommodate it in any form on almost any device.

It is hoped that this embodiment can form the basis for a new informational paradigm shift that enables multitudes of computer users to benefit through the powerful methodology of dual classification of data modeled through dual treeview controls and dual view panes covering all but the most arcane computer use cases.

Figure 14:
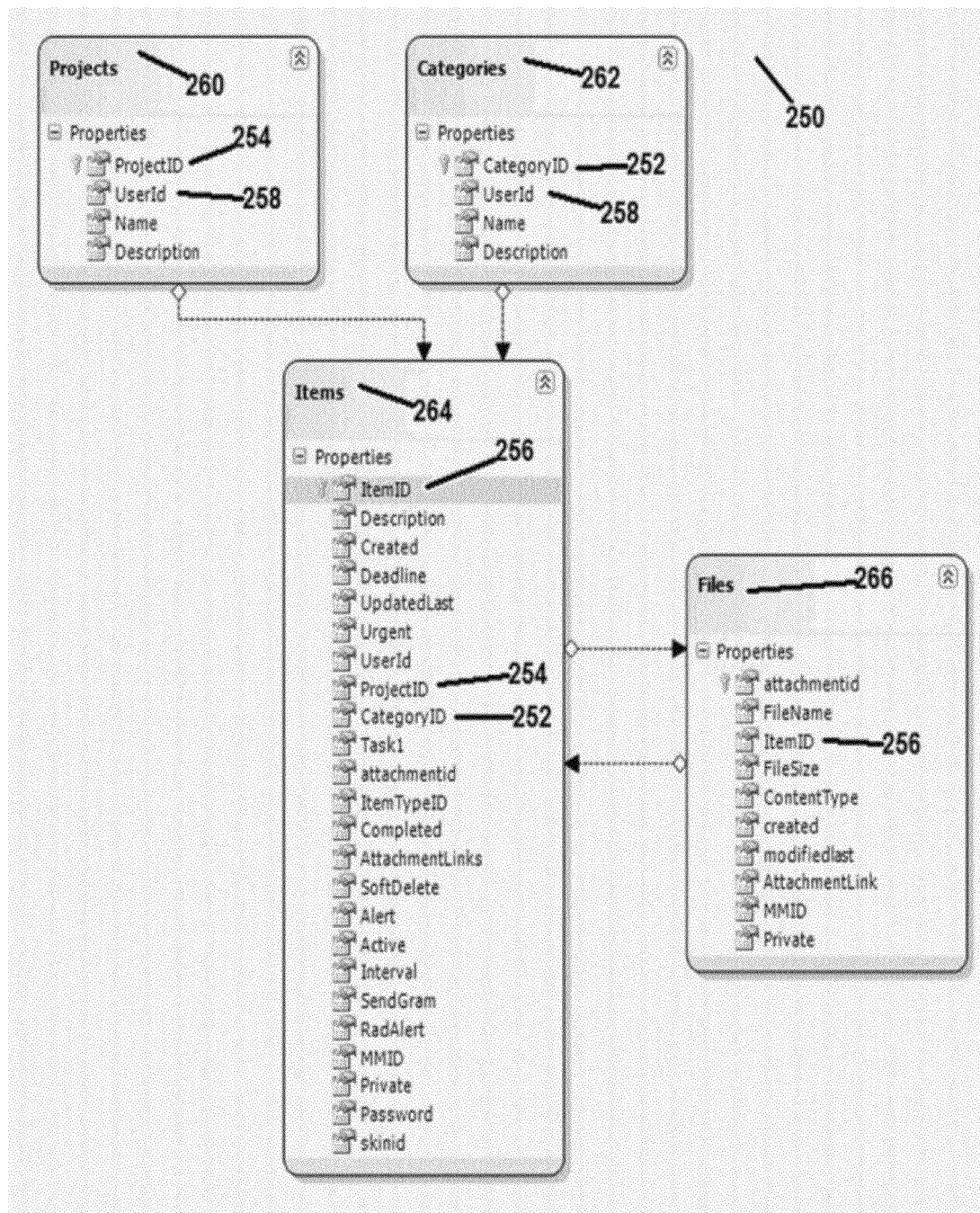
FIG. 14 is a schematic diagram of the structure of the types supplied by the type factory component to map the relational database to the shell browser and view component.

FIG. 14 is an illustration of a schematic diagram 250 of the structure of the types supplied by the type factory component 76 to map the information stored in the relational database 66 to the shell browser and view component 84.

Figure 15:
FIG. 15 is a schematic diagram of the tables of the relational database.

The types in the system, namely projects, categories, items, and files, map to the tables in the relational database 66 as illustrated in FIG. 15. Each type has multiple attributes that map directly to the columns of the relational database's tables and thus will be discussed in a mutual context of mapping relational database 66 tables and columns to the types and attributes of the type schema.

FIG. 15 is an illustration of a schematic diagram of the tables of the relational database 268 used to persist projects, categories, items, and files that are under management of the file and digital content management system 94.

The file and digital content processor 86 transforms user actions into db queries that can be passed by the query component to the relational database 66. The relational database contains a projects table 274, a categories table 276, an items table 278, and a files table 280. The categoryid column 272 of the categories table 276 maps directly to the categoryid column 272 in the items table 278, creating the link and enforcing the categoryid requirement for saving an item in the items table 278. The projectid column 270 of the projects table 274 maps directly to the projectid column 270 of the items table 278, enforcing the projectid requirement for saving an item in the items table 278. The items table 278 contains an itemid column 282 that maps to the itemid column 282 of the files table 280. The userid column 284 found in the projects and categories table 276, enables the embodiment to operate on a macro scale or a per user scale.

Thus, the embodiment can function as a single user file and digital content management shell for individuals, groups, or for a global information sharing network. This allows for embodiments where various roles can be assigned to users, e.g. administrative, as might be used in an embodiment for a company intranet information management system. The types allow the enumerator component 74 to transform the rows and columns of the relational database 66 returned by the rowset parser component 72, in response to user generated queries. The transformation is achieved by instantiating the types as objects, e.g. a project, that can be mapped to a column attribute.

For example, the column of the relational database's projects table 274, maps to the projects type 260 project identifier 254 attribute. The query results can be transformed such that information in the system is dynamically linked via shared attributes.

For example, the project identifier 254 exists in both the project type and the item type. This enables the shell browser and view component 84 to link projects to the items type 264. The same is true for the categories type 262, which links to the items type 264. Further, the relationship between files in the system, as modeled by the files type 266 and the items type 264, can also share. The categoryid and the projectid columns in the relational database 66 enforce the relationships required to enforce referential integrity amongst the system data.

They further provide the queries with a methodology for joining tables by the key columns, e.g. projectid, categoryid, itemid, userid, etc., to dynamically deliver the information required by the cross-referencing component 68 of the file and digital content processor's 86 request to populate subfolders for the treeview controls. The enumerator component 74 of the file and digital content processor 86 can reconcile the column values supplied, on a row by row basis, by the rowset parser component 72.

Each column value supplied to the enumerator component 74 is simply mapped to a corresponding attribute of the instantiated type; e.g. the projectid column 270 value becomes the value of the categories types 262 category identifier 252 attribute. These types then are transformed and bound by the databinding component 78 to represent objects such as treeview folders. This enables project identifiers 254, category identifiers 252, and the like, to be leveraged by the shell browser and view component 84 to dynamically link user actions; e.g. clicking on a folder, to specific requests to the request broker component 82.

At any point in the process, user actions are automatically capable of creating parameterized queries to the file and digital content processor 86. For example, the projects type 260 contains the project identifier 254 attribute used to filter items, and files, by specific project folder selected by the user in the shell browser and view components projects treeview control 196. The attachmentid column 286 in the files table 280 is used in the embodiment to enable users to select one or more files for participation in common file management system scenarios, e.g. copy, move, delete, download, etc. The user identifier 258 can also be used to not only filter information by single users, or groups of users, but also facilitates communication by rapidly allowing shared items to be identified with their original author.

For example, if a user in the embodiment generates a hyperlink to enable an item to be viewed in a browser, that link can be emailed to multiple recipients. Those recipients in turn can forward those links. At any given point, a recipient of the item link can identify the original author of the content through the embedded user identifier 258. In a social networking paradigm, this can facilitate security and collaboration scenarios, e.g. getting in touch with the original author to discuss the content, or contacting a provider to complain about objectionable material. No user is anonymous in the system and can always be readily identified as the system grows to accommodate vast amounts of content. Further, intellectual property rights can be easily respected by having a mechanism to quickly remove material that any individual user does not have the right to publish.

Figure 16:
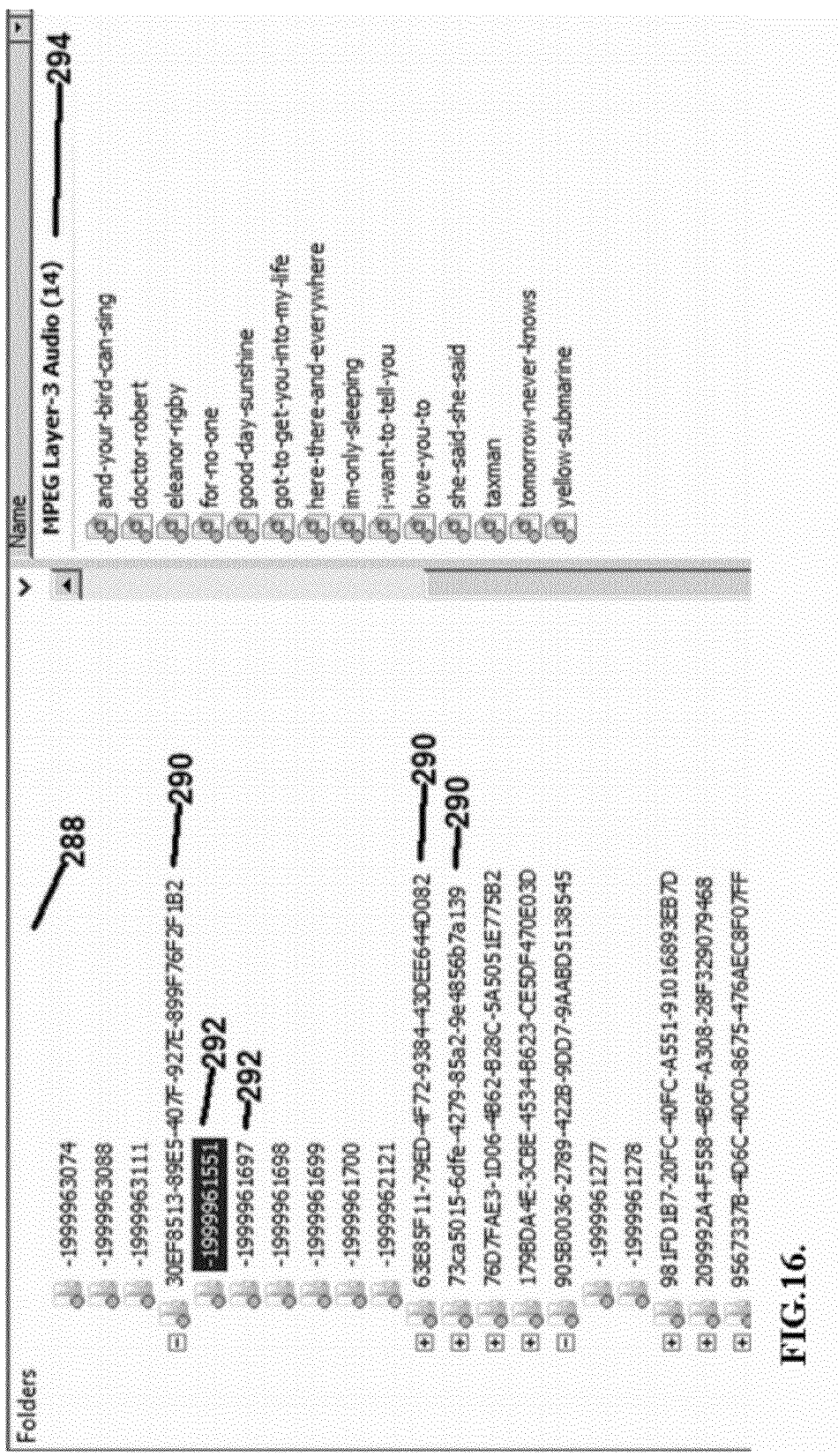
FIG. 16 is a physical treeview diagram of the file and digital content management system's file server management methodology and physical structure on a hard disk, or file server, or similar physical storage device, capable of storing digital files.

FIG. 16 is a physical treeview diagram of file server management methodology 288 in practice. Every user on the system is assigned a unique user identifier 258 value. This unique value forms the user identifier as folder name 290 methodology for storing and manipulating all files under management on a per user basis and further, links or associates items with files. The item identifier as folder name 292 methodology allows the input/output component 88 to create, remove, and rename directories on a file server 90 or hard disk 91 which are used to store the actual physical files. Thus, the physical files listing 294 are stored in an item subfolder of a user folder. This is by design and provides a native alternative for associating files on the hard disk 91 or file server 90, with files stored in the relational database's files table 280.

In the embodiment, the file and digital content processor's 86 request broker component 82 and file broker component 92 work in tandem to keep the files synchronized with the database; critical in maintaining the system's referential integrity. While the embodiment provides for an atomic transactional model, i.e. file operations and database operations either succeed or fail as a whole, the structuring of the information provides a failsafe whereby the file server 90 can be audited at any time by the system for missing links, etc., by comparing the identifiers in the relational database 66 with the physical directory structures. Further, the embodiment's physical file structure methodology provides a major additional benefit; security through obfuscation.

As the folder naming mechanism is based, not upon text, but the unique computer generated values representing users and items, the content and ownership of the files is obscured. In other words, looking for a specific file is like searching for a needle in a haystack without intimate knowledge of the storage methodology implemented. An additional benefit appreciated by those tasked with administration responsibilities is that, like the treeview controls, the file system does not nest folders beyond the item level. Administrators need only know the user identifier 258, and item identifier 256, to manipulate physical files on the system.

No unpredictable folder nesting (a major deficiency of file shell browsers themselves) is introduced anywhere in the system. Thus, additional applications can be applied to the file system in accordance with the overall methodology of the embodiment; for example, an embodiment of the file and digital content management system 94 for system administrators. In such a scenario, the projects might consist of users and the categories of items. A system administrator can therefore manage files by groups of users. Thus, the system is not only scalable it is extensible; i.e. easy to modify, for new and previously unanticipated uses.

Figure 17:
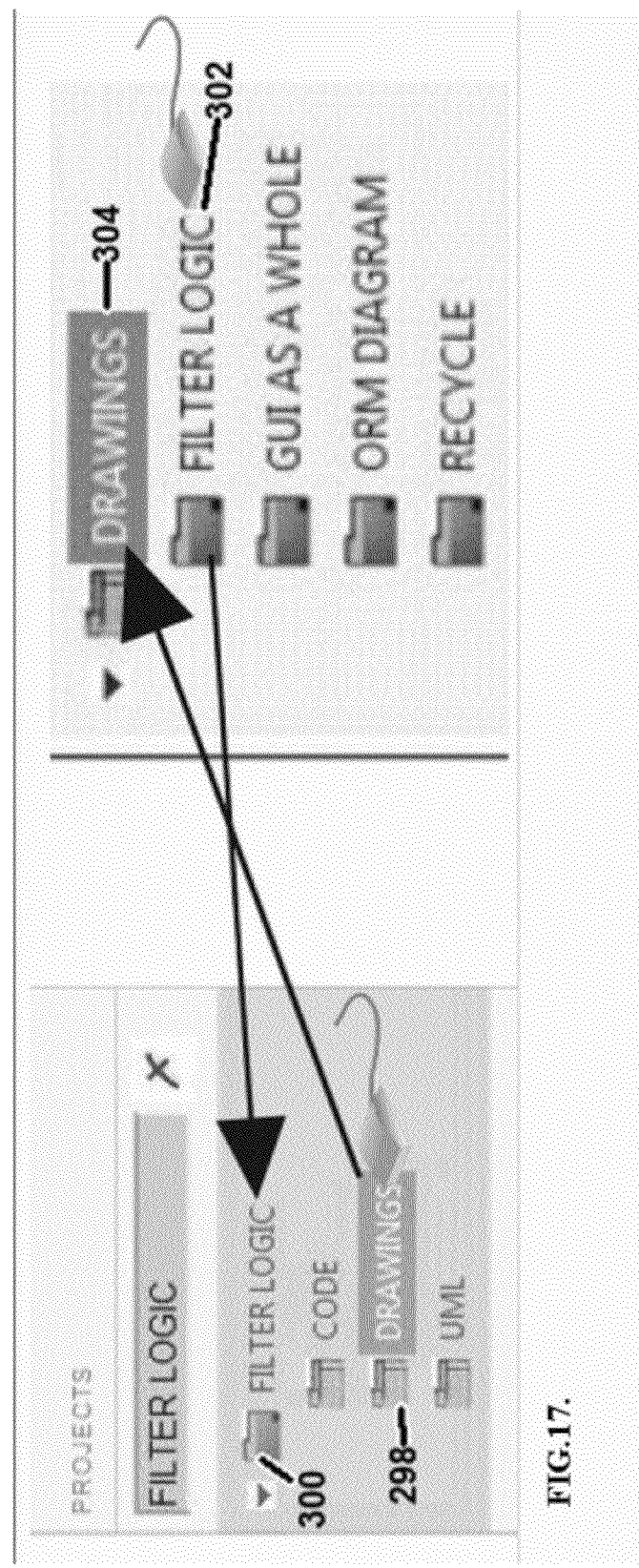
FIG. 17 is a functional relationship illustration diagram of the projects treeview and categories treeview automatic synchronization feature.

FIG. 17 is an illustration diagram of the projects treeview and categories treeview automatic synchronization feature in the shell browser and view component 84. The diagram depicts the projects treeview control 196 on the left, where the "FILTER LOGIC" folder 300 is expanded to display the "DRAWINGS" subfolder 298. On the right, we see the categories treeview control 198 displaying the "DRAWINGS" folder 304, expanded to display the "FILTER LOGIC" subfolder 302.

If a user selects a subfolder in either treeview control, it will trigger a call to the other treeview control to synchronize to display the subfolder clicked as a parent level folder in the opposite tree control. Additionally, as previously mentioned, this will activate the project and category filters that pass query requests to the file and digital content processor's 86 request broker component 82. This mechanism continuously synchronizes the entire shell browser and view component 84 and dynamically displays all related pairings as subfolders. At a glance, we understand the filter logic project folder is a subfolder in the categories treeview control 198, representing the two available combinations of associated items 244; i.e. project-category or category-project.

The user can also see other pairings, represented as subfolders. Thus, it is apparent that the filter logic project has pairings with categories such as "CODE", and "UML", in addition to "DRAWINGS". The user can see their filter logic project not only has associated drawings, but also code and uml type information.

In the case depicted; the information might be used to create drawings and diagrams in a patent application. The user can also see, at a glance of the categories treeview control 198, that the "DRAWINGS" category, in addition to being associated with the "FILTER LOGIC" project, is also associated with the "ORM DIAGRAM", "RECYCLE", and "GUI AS A WHOLE", projects. This might enable the user to find an orm diagram they wish to use as a template for a filter logic drawing for a patent application.

Hence under the embodiment the item sought can be quickly located, cloned, and further manipulated. The dual treeview cross-referencing and synchronization feature, combined with the clone feature, discussed later, of the item's data entry form, allow for similar data to be used as templates for other similar, related data, as will be discussed in the next diagram.

Figure 18:
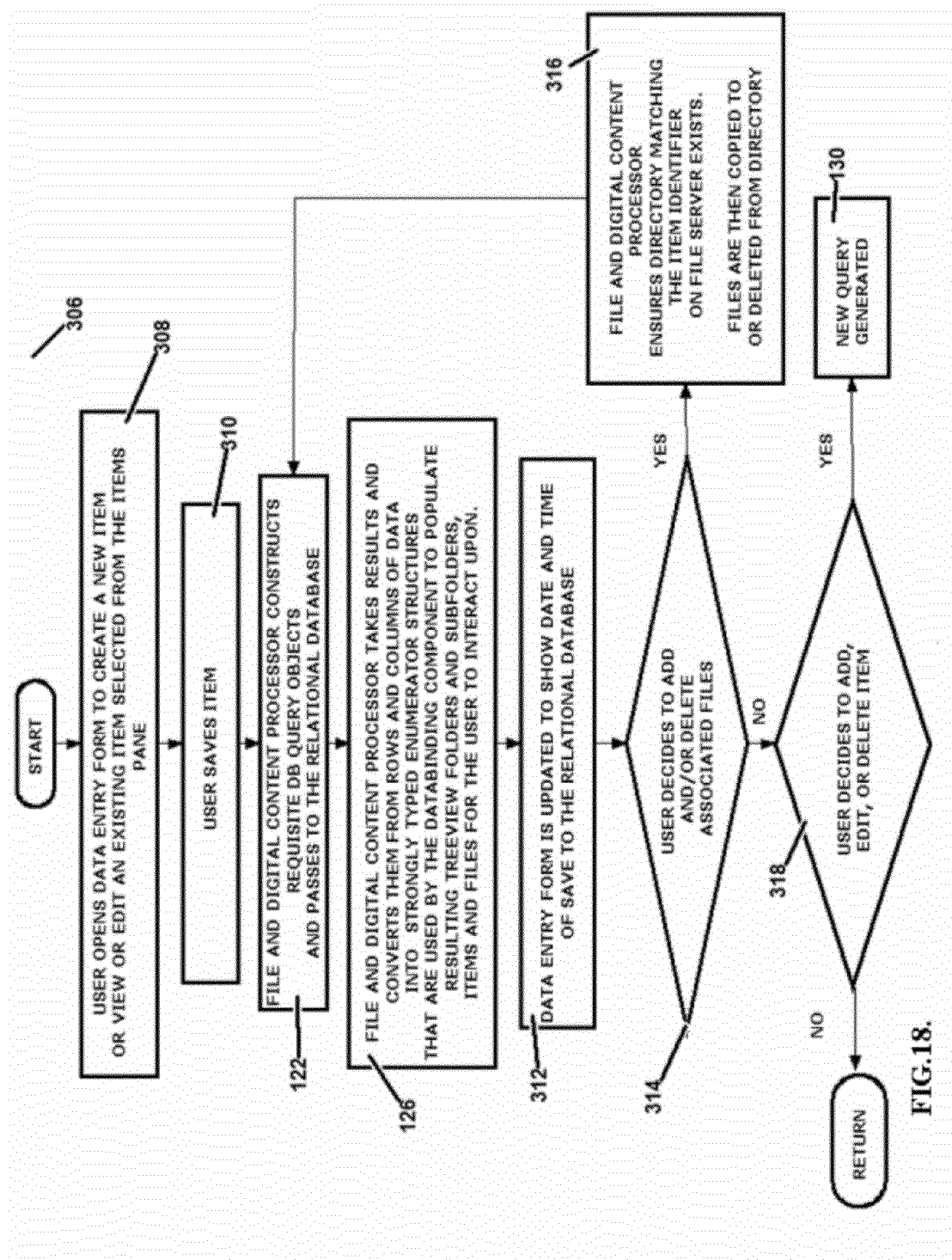
FIG. 18 is a flow diagram illustrative of a routine by which the system data entry form allows users to manipulate file and digital content in the relational database and file server and transform the screen to display the modified data and await further user input.

FIG. 18 is a flow diagram illustrative of a routine by which the shell browser and view component's data entry form 306 allows users to manipulate file and digital content in the relational database 66 and file server 90, and transform the screen to display the modified data and await further user input. At a block, the user opens the data entry form to create a new item or view or edit an existing item selected from the items pane 308. At a block, the user saves the item 310. In a block, the file and digital content processor 86 constructs requisite db query objects and passes to the relational database 122.

At a block, the file and digital content processor 86 takes results and converts them from rows and columns of data into strongly typed enumerator structures that are used by the databinding component 78 to populate resulting treeview folders and subfolders, items, and files, for the user to interact upon. At a block, the data entry form is updated to show date and time of save to the relational database 312. In a decision block, the user decides to add and/or delete associated files 314 for the item. At a block, the file and digital content processor 86 ensures a directory matching the item identifier 256 on file server 90 exists. Files are then copied to or deleted from directory 316. Control returns to block and the process repeats.

In a decision block, where the user did not decide to modify files, the user decides to add another item, or edit, or delete the existing item 318. The process depicted enables the system to continuously manipulate the data under system management and thereby keep the treeview controls and view panes of the shell browser and view component 84 updated with the current data stored in the database and on the file server 90 or system hard disk 91.

Further, any items opened as data entry form instances will be synchronized with the latest changes to the system, should a user; for example, add, rename, or delete, a project, or a category. The file and digital content processor 86 can identify all screen elements to determine if they have been impacted by a user action in the shell browser and view component 84.

Figure 19:
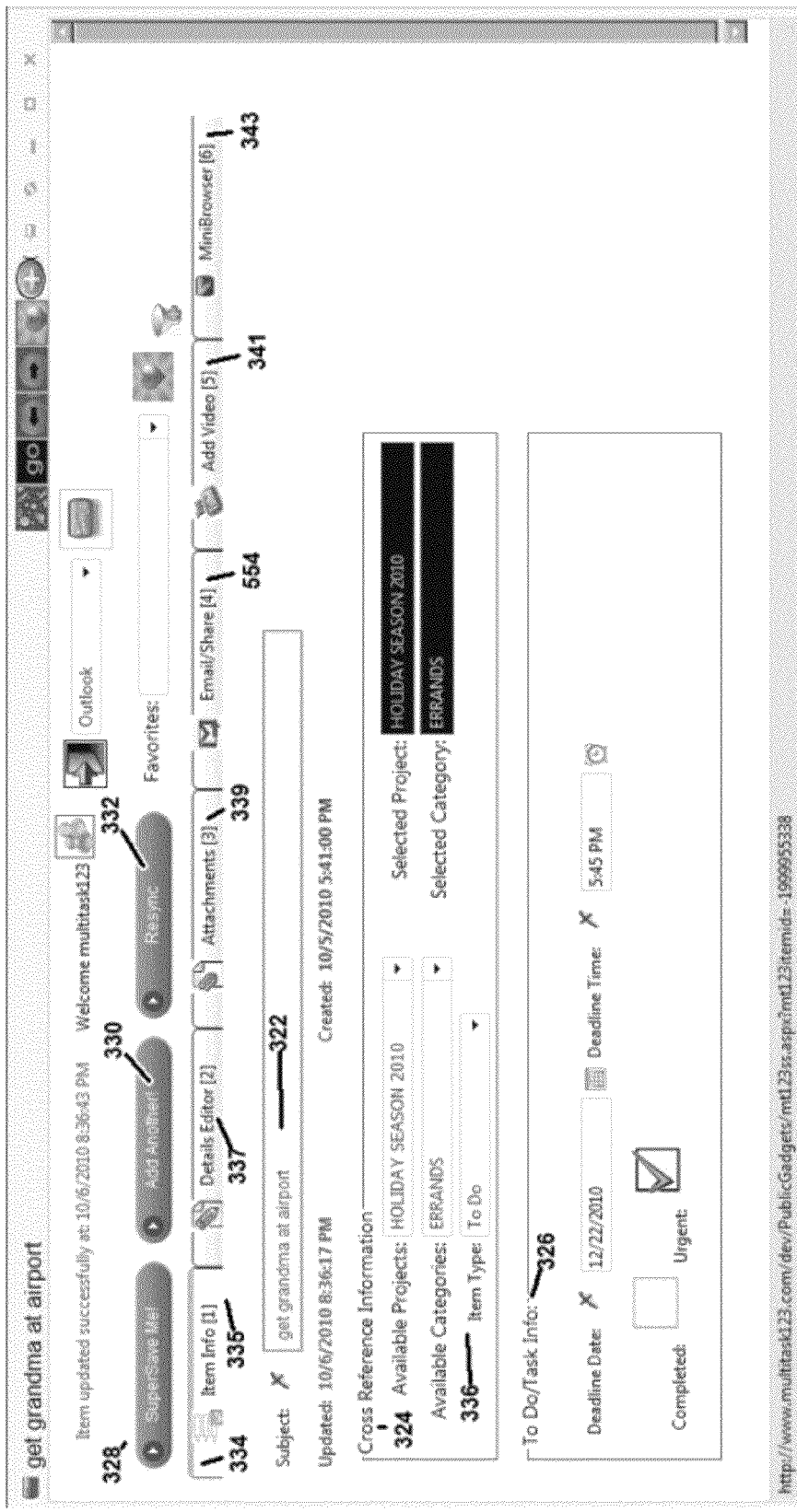
FIG. 19 is an illustrative diagram of the shell browser and view component's data entry form for an Internet enabled, or web based, embodiment of the system.

FIG. 19 is an illustrative diagram of the data entry form for an Internet enabled, or web based, embodiment of the system. As those skilled in the art would appreciate, the general architecture of the file and digital content management system 94 lends itself to, not just a local, per system embodiment as depicted in FIG. 1, but an easily modified for the network 546, cloud or internet web scenario, as illustrated in FIG. 1B.

The remainder of the diagrams will describe a web-enabled embodiment of the system as it pertains to data entry, digital information sharing, and digital content publishing. One particular advantage of a web enabled embodiment is that a centralized storage location can be accessed from any Internet, or similar network connected, client.

The physical location of any particular machine becomes superfluous as any browser becomes capable of hosting the shell browser and view component 84; and therefore, the entire file and digital content management system 94 becomes globally available, regardless of any specific client machine. The advantages of storing information in a globally available computer network enable a scalable, network of linked users, who can quickly share information and files through the file sharing features of the embodiment. This physical proximity of global file servers yields performance advantages for copying files between users in the system, and is equally effective in, for example, corporate intranets as it is in public extranets and the Internet itself.

Sharing files and information in this type of embodiment only requires that files be copied from one directory on the file server 90 to another directory; rather than from one computer to another, eliminating that paradigm's resultant latency of network upload and downloading wait-times required in such a single computer embodiment.

The data entry form is broken into sections through the form's tabbed control 334. The form's tabbed control 334 contains an "Item Info" tab 335, a "Details Editor" tab 337, an "Attachments" tab 339, an "Add Video" tab 341, and a "Mini-Browser" tab 343. This compartmentalized structure breaks the key aspects of the data entry paradigm into attribute, e.g. subject, and task related, e.g. "Email/Share" sections to help users quickly manipulate the items and attachments that represent the files and digital content under management.

The diagram depicts the first tab of the data entry form, the item info tab; where metadata for the item is entered, the item subject field 322, for example. The item info tab is broken into sections to group related fields, thereby clarifying the relationships of the fields modeled.

For example, the cross reference information section 324 contains dropdowns for projects and categories, which are required to save any item in the system. Further, an item type identifier 336 dropdown is provided so that any item can be toggled between two broad conceptual categories, namely "to do" or "other". "To do" items model tasks to be addressed by users, and "other" indicates the opposite; the item is not a task, e.g. a phone number or address stored as part of a "contacts" category.

The to do/task info section 326 models the task management aspect of the embodiment as a dual, digital content library-style, repository for collections of digital information; as well as a project, or task management system, possessing fields for the entry of attribute values such as deadline date and time, urgent status, and completed status.

Thus, the data entry form in this embodiment supports a generic, extensible, and multi-purpose management set. Items are general containers for all manner of rich content.

They can be extended in multiple alternate embodiments to support all manner of information management systems capable of benefiting from the integrated and dynamic features of the file and digital content management system's 94 dual categorization and synchronization features.

It takes no skill in the art to realize that information generally falls into two broad categories; things we store persistently over time (such as a collection of music or the past 7 years tax returns), and things that imply some type of action on a user's part is required (such as a task).

There is a great deal of overlap and integration to be leveraged between these two broad distinctions, such as a persistent collection of driving directions and maps that are stored in a category; "MAPS". These types of items can be combined with task type items to enable users to conduct their professional, academic, and personal lives more efficiently.

Another example occurs when a user enters an item with a subject of "get grandma at the airport". The user can label the item as a "To Do" type item and add the deadline date and time. The item would help to ensure grandma is not stood up at the airport.

Directions to the airport can be obtained from the maps category, and the two items can work in concert to help the user get to the airport to pick up grandma. Rich digital content can easily be copied and pasted between items through the "details" tab of the data entry form. For example, as will be illustrated in FIG. 20, a user can save an item with a subject of "driving to Kennedy airport" and embed a live Google map into the item through the detail tab's rich web editor/word processor feature. This item could be stored under a project "DRIVING" and category "MAPS".

The data entry form further includes a save button 328; for saving an item; and an add another item button 330; for creating a new template with which a brand new item can be inserted into the relational database 66. A resync button 332 is provided in the embodiment to allow users to update displayed data entry forms with the latest data, as it is saved in the relational database 66 and on the file system hard disk 91 or file server 90. The system, in a web enabled embodiment, allows the shell browser and view component 84 to be opened multiple times; for example, in a tabbed browser.

Thus, the user can work with multiple, simultaneous views of the data under management, as is common in modern internet browser applications, e.g. Firefox, Internet Explorer, Chrome, Safari, etc. A resync feature would enable a user to ensure they are always viewing the latest available snapshot of the data as it is stored in the relational database 66 and on the file system. Further, in a multi-user embodiment, more than one user might make changes to items a user is currently working with. Thus, the user would appreciate a fast method for guaranteeing they are viewing up-to-date data. As those skilled in the art would appreciate, web enabled embodiments require a way to bridge the disconnected nature of clients on a network. A simple button to resynchronize data entry forms would be highly helpful and appreciated in such a scenario.

Figure 20:
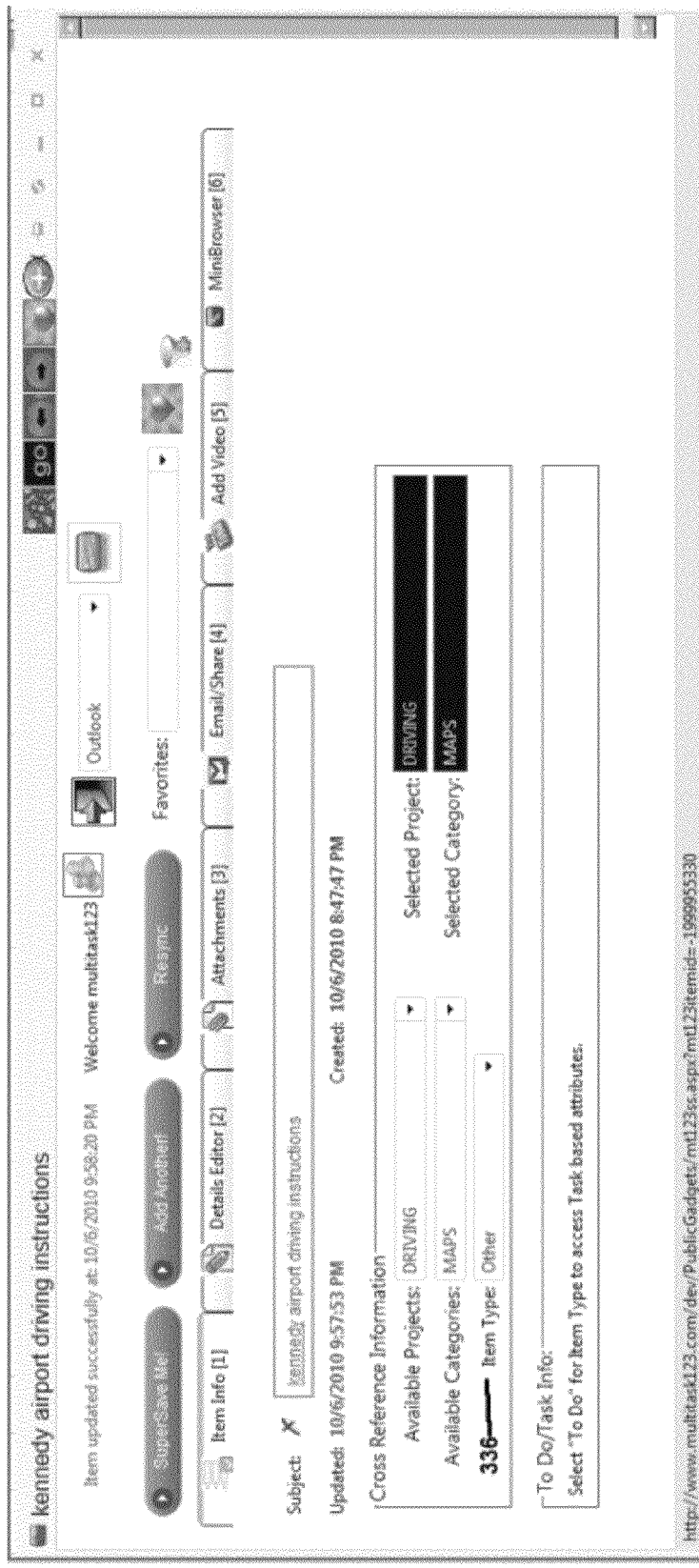
FIG. 20 is an illustrative diagram of the shell browser and view component's data entry form for an item containing a map and driving instructions to New York City's Kennedy airport.

FIG. 20 is an illustrative diagram of the shell browser and view component's data entry form 306 for an item containing a map and driving instructions to New York City's Kennedy Airport. As previously mentioned this would necessitate the item type identifier 336 drop down control possesses a value of "Other" as opposed to "To Do".

Figure 21:
FIG. 21 is an illustrative diagram labeled as "prior art" of a Google maps web page with driving instructions to JFK airport in New York City.
Figure 21:

FIG. 21, labeled "PRIOR ART", is an illustrative diagram of a Google maps web page with driving instructions to JFK Airport in New York City 352. It contains an html embedding feature 350 that those skilled in the art will appreciate as being ubiquitous throughout modern web sites like youtube.com, yahoo.com, google.com, etc. The data entry form is "html embedding" compliant, as will be described further below.

Figure 22:
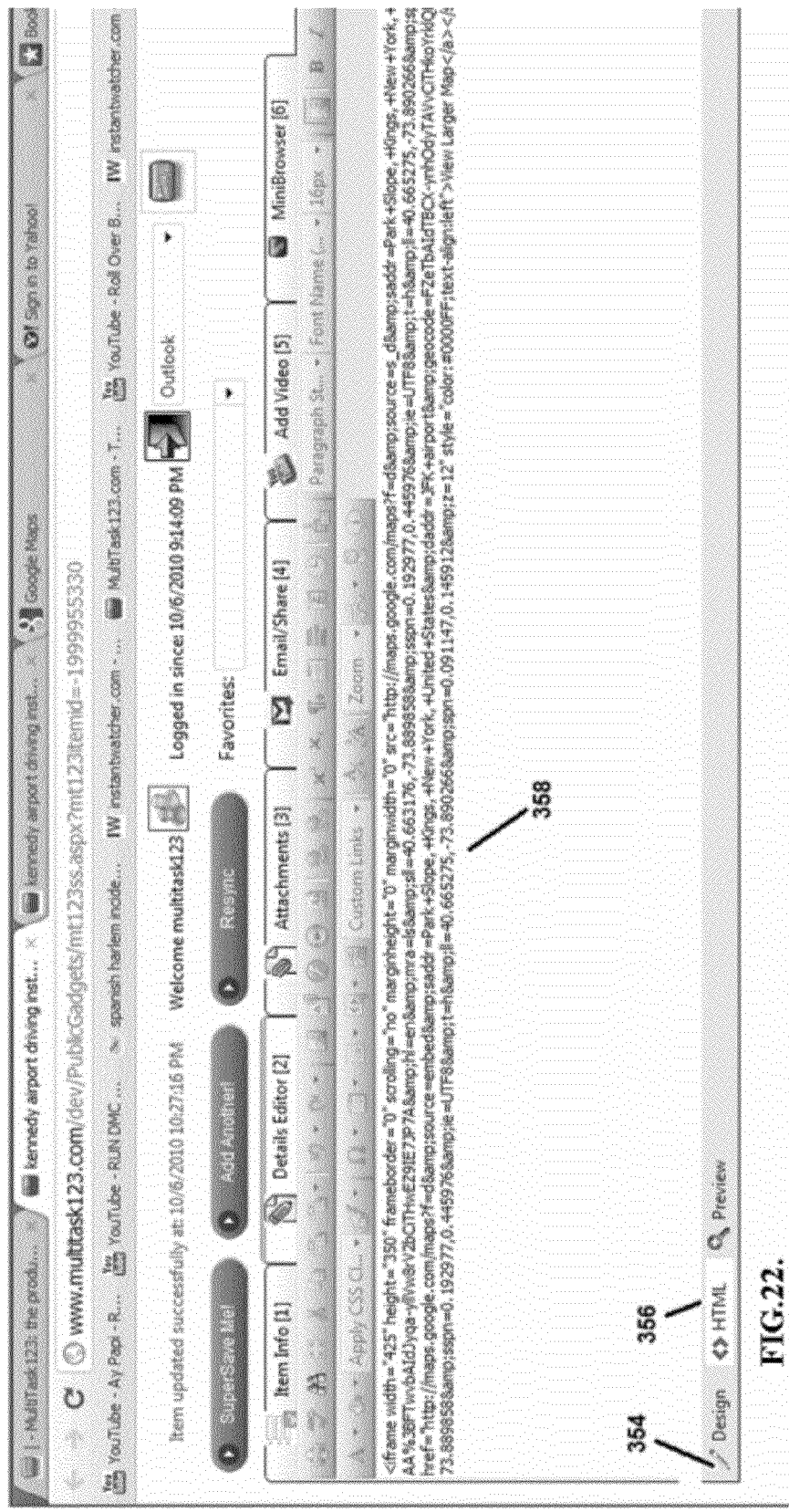
FIG. 22 is an illustrative diagram of the data entry form's details tab.

FIG. 22 is an illustrative diagram of the data entry form's "Details Editor". It contains a word processor component that enables users to add content for each item, such as text, images, video, other web pages, etc. The word processor has a WYSWIG (what you see is what you get) mode that works like familiar word processors, allowing users to cut and paste, style text, add web page links, etc. It also has an html mode 356 that allows users to add and edit html tags directly, e.g., a Google map as depicted 358 in FIG. 21. Here we see the results of the user copying and pasting the html code for the Google map in FIG. 21 into the details section while in html mode 356.

Figure 23:
FIG. 23 is an illustrative diagram of the data entry form after saving an embedded Google map as depicted in FIG. 21 and FIG. 22.

FIG. 23 is an illustrative diagram of the data entry form after saving an embedded Google map as depicted 358 in FIG. 21 and FIG. 22. It contains a link supplied by Google maps to "view larger map 364." Clicking that link will change the view to a more detailed map and text based driving instructions.

Figure 24:
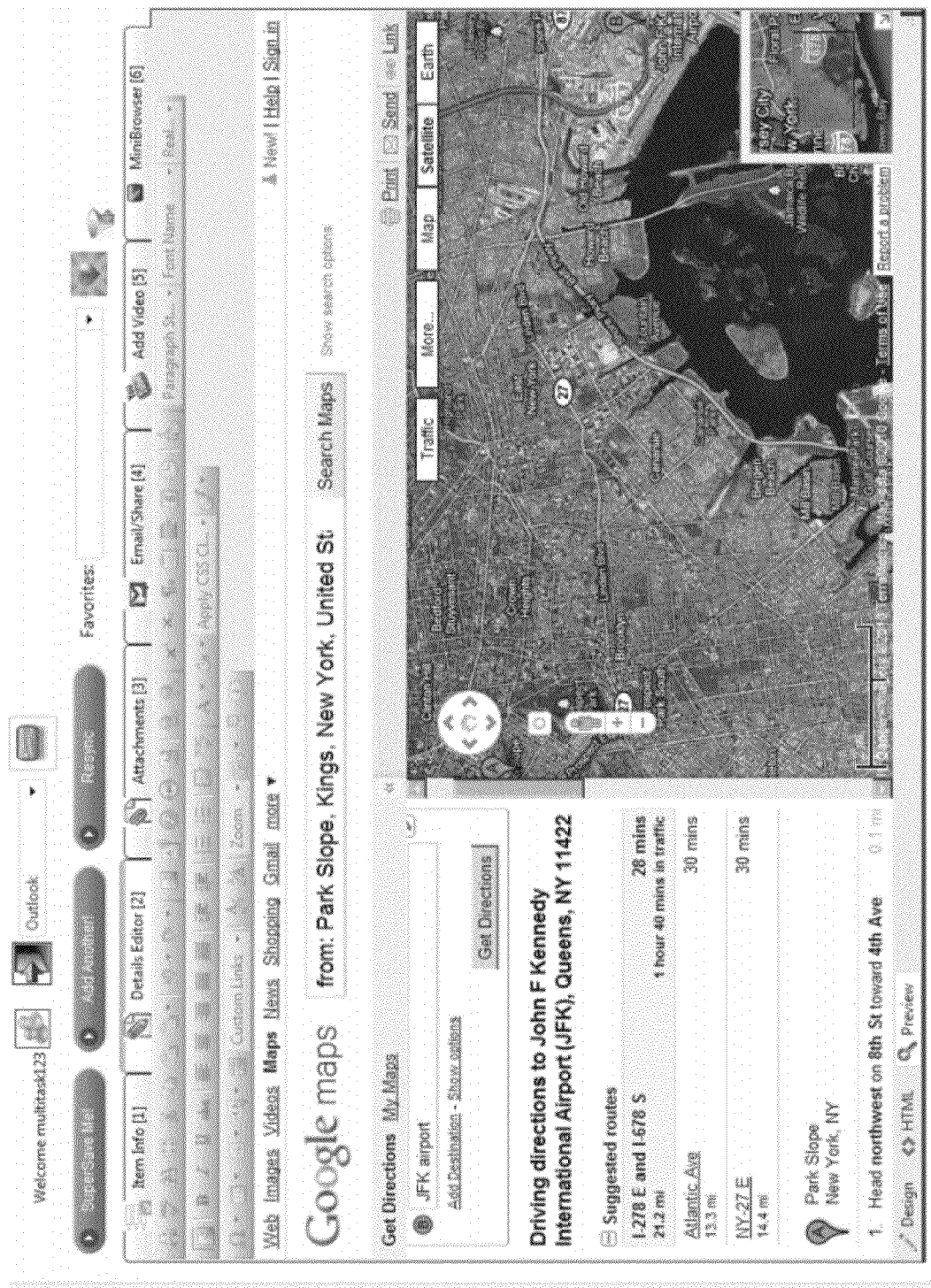
FIG. 24 is an illustrative diagram of the results of the user clicking on the view larger map link in FIG. 23.

FIG. 24 is an illustrative diagram of the results of the user clicking on the "view larger map 364" link in FIG. 23. The content dynamically changes to display various options for driving to JFK airport and a live map that can be further manipulated.

Thus, we see that the embodiment is capable of integrating dynamically linked, rich digital content, that is highly useful for building a repository of information that can be recycled, modified, and integrated, with other digital content rich items. The result is a dynamic, internet compatible, and highly leveraged system designed to increase personal, and/or group productivity, by removing the lines that separate general related areas of computing tasks; e.g. web browsing, email, task management, file management, etc. The details tab of the data entry form represents an all-purpose attribute of the item that can persist virtually any type of text or html based content. The embodiment always attempts to integrate, upon the widest possible dimensions, the various strengths of all its components, to enable users to work intuitively with all manner of data.

To continue the discussion of integrating items from FIG. 19's example of a task-oriented item for picking grandma up at the airport, we can now imagine how the embedded Google map example in FIGS. 20-24 can benefit by integration with the map and driving instructions contained in the driving errand depicted in FIG. 19. While previous examples have shown how items can be integrated through project-category-pairs, there is another alternative for grouping items; links, which will be discussed below.

Figure 25:
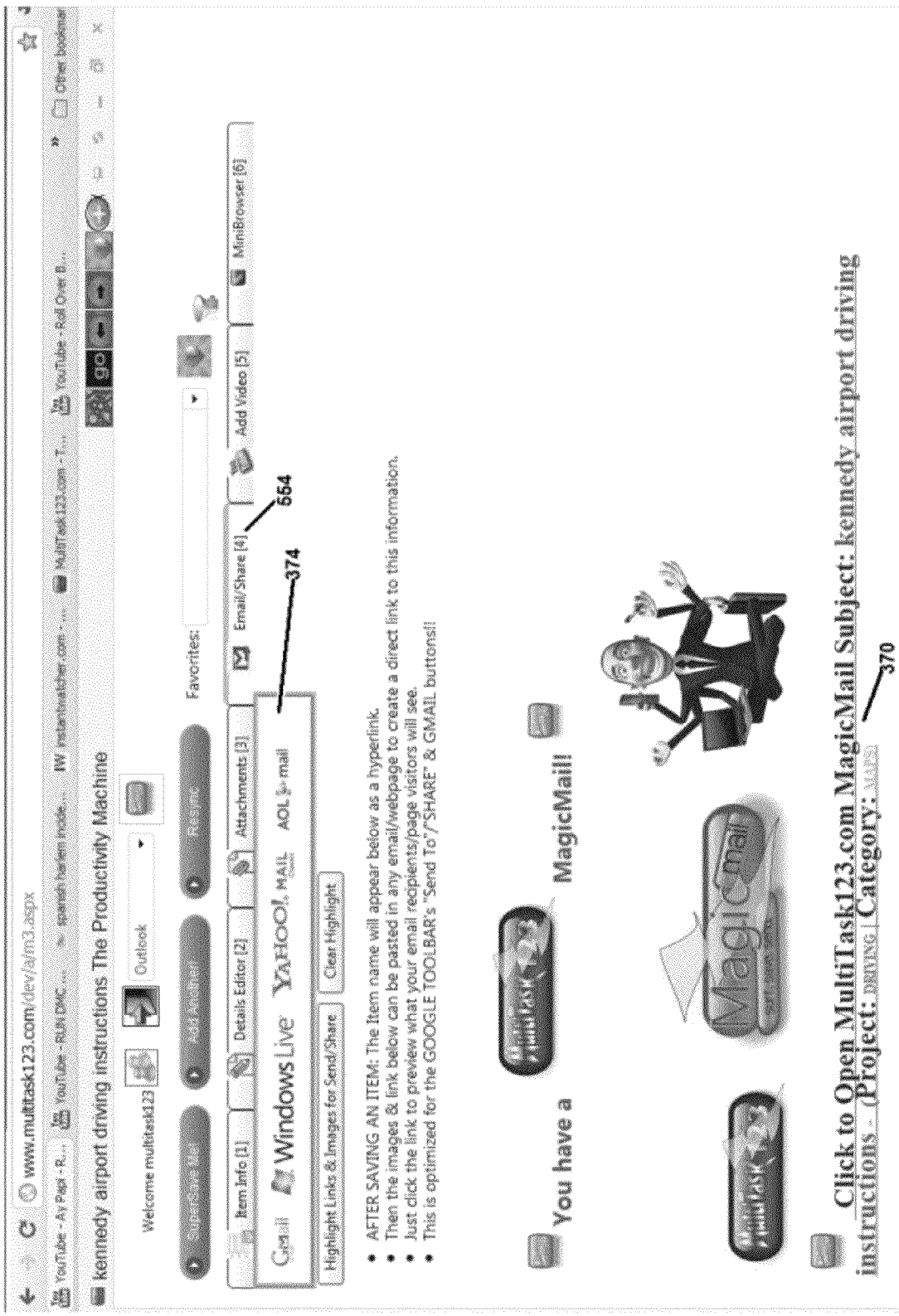
FIG. 25 is an illustrative diagram of the email/share tab of the embodiment's data entry form.

FIG. 25 is an illustrative diagram of the "Email/Share" tab 554 of the embodiment's data entry form for the driving errand item from FIGS. 20-24. Clicking on the "Email/Share" tab 554 will dynamically create a web page link to the item that lists the subject, project, and category as part of the link's text comprising the web URL for the item 370. Further illustrated are links to popular email systems 374 like Gmail, Yahoo, etc.

Figure 26:
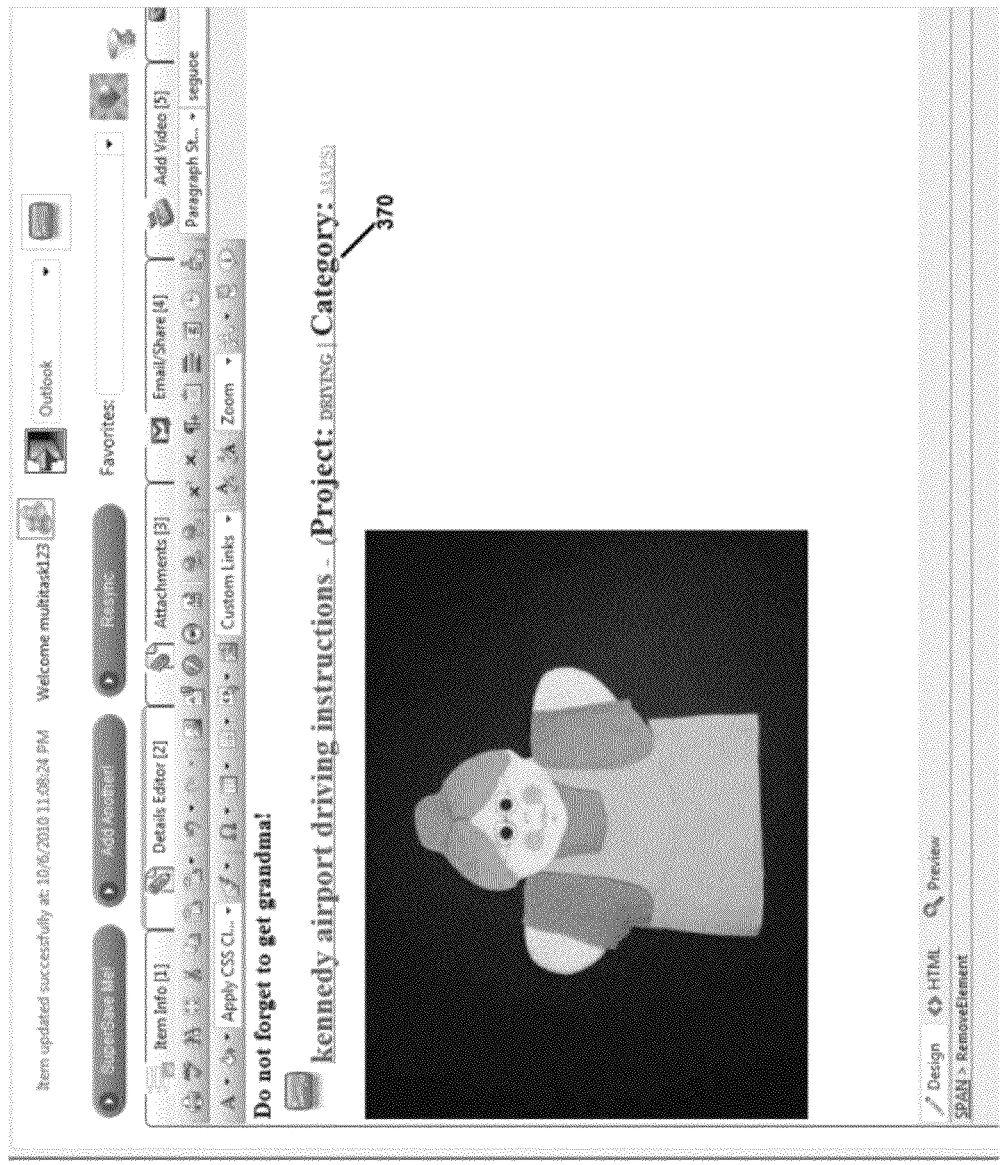
FIG. 26 is an illustrative diagram of the details editor tab of the embodiment's data entry form.

FIG. 26 is an illustrative diagram of the "Details Editor" tab 337 of the embodiment's data entry form for the "grandma" example from FIG. 19. We can see the user has pasted the web URL for the item 370 from FIG. 25. The task based item, "get grandma at airport," now contains a link to another item that actually contains a map and driving directions.

Those skilled in the art will appreciate that this methodology has the added benefit that the user can modify items and all links will continuously retrieve to the freshest data available in the system. Thus, if there is major road construction that would affect the driving instructions, all links will point to an embedded Google map that will contain the most recent driving instructions from Google, as though a fresh search had been run. Additionally, it should be appreciated that the ability to create links for items means that content from multiple items, regardless of project-category-pairs, can be mixed and matched, removing any final barriers to integration that might exist.

Further, it can be appreciated that the links to popular email systems 374 shown in FIG. 25 represent quick links to launch popular email systems. The item links can then be sent via regular email to allow other people to view the embodiment's items. Those skilled in the art will appreciate the benefits offered by this feature from the perspective of dynamic connectivity, as well as security.

System users can send links to personal, highly sensitive information via publicly available, popular email systems like yahoo mail, but the information sent is only a link to an item. The content is opened independently of the email system transporting said link as will be illustrated in FIG. 27.

Thus, the content can be kept secure through the implementation of security features like SSL, encryptions, etc. in the embodiment. Those familiar with email will recognize that it represents a relatively static medium of communication as it relates to computer systems in general.

Once an email is sent, it can neither be edited, nor recalled. The user of the file and digital content management system 94 can always modify, or delete the item after the link is sent. Therefore, the user has fine grain control over communications not only right up to the point where it is received and viewed but even after the fact.

For example, if the user thinks of something else to add, or remove to an item, or if additional files need to be attached, it can be done after a link has already been sent via email. Recipients of links will always view the most recent information available on the system, even if it is notification that the item was removed by the user. Further they could bookmark the link in their web browser of choice and any subsequent edits by the author will be reflected automatically.

Figure 27:
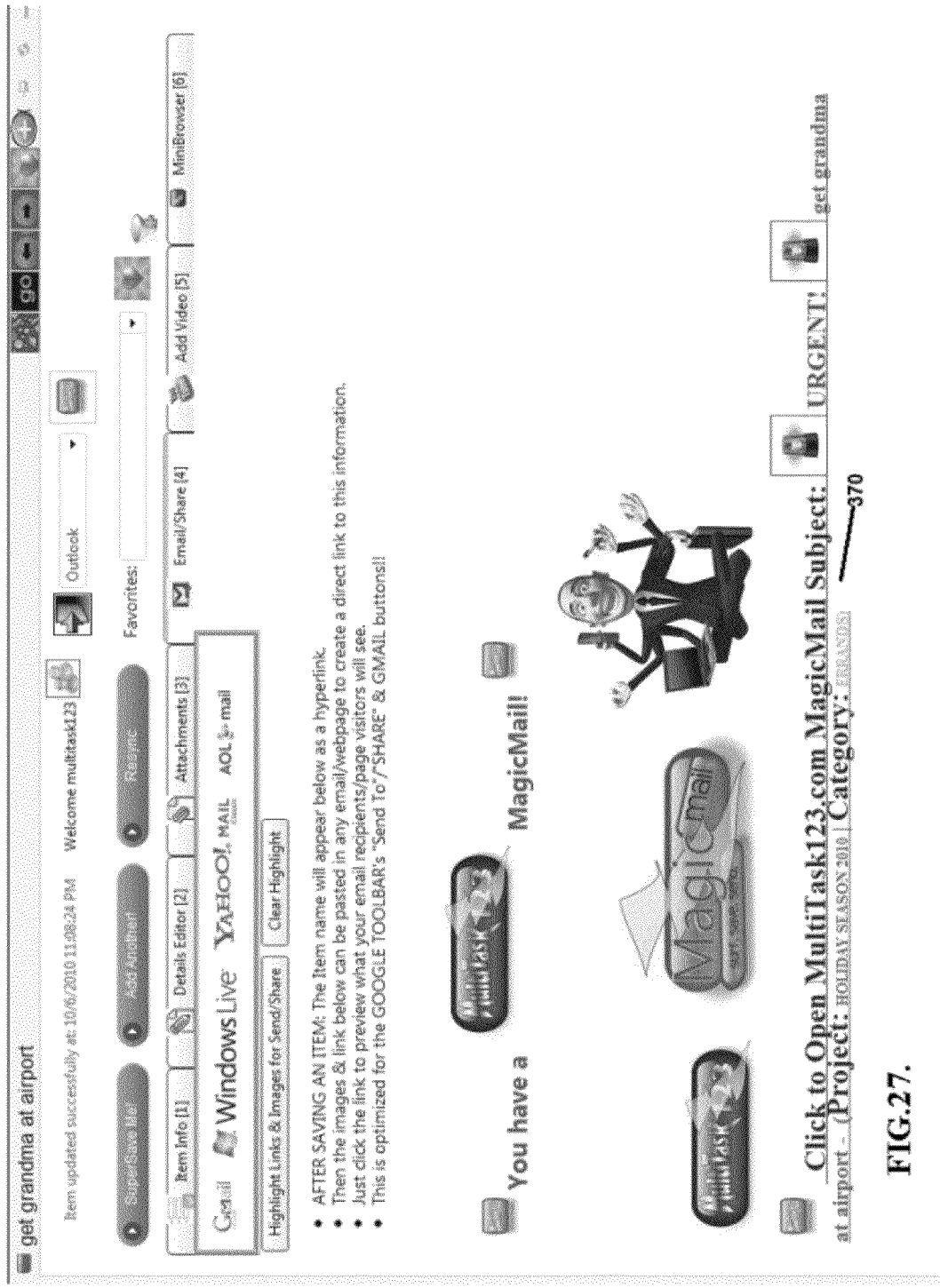
FIG. 27 is an illustrative diagram of the email/share tab of the embodiment's data entry form for the item depicted in FIG. 19.

FIG. 27 is an illustrative diagram of the "Email/Share" tab 554 of the embodiment's data entry form for the item depicted in FIG. 19, namely, "get grandma at airport". In the web URL for the item 370, we see the subject, project, and category. The effects of clicking on this link will be discussed below.

Figure 28:
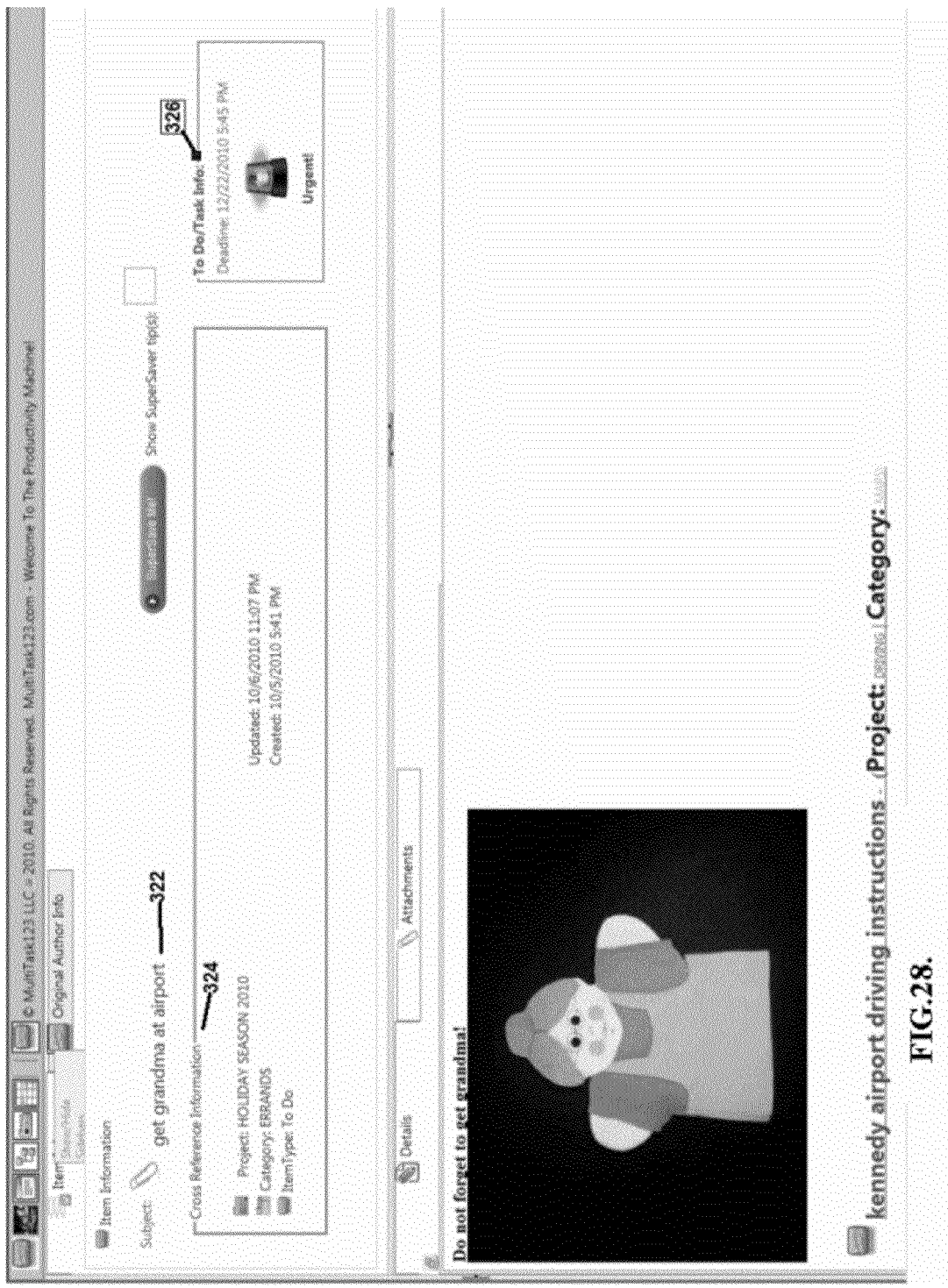
FIG. 28 is an illustrative diagram of the system's ability to serve system items to a browser as a web page.

FIG. 28 is an illustrative diagram of the system's ability to serve items and files to a browser as a web page. The information is the same as the data entry form, but the mode is read-only and the display mode is one of a generic, tabbed, sectioned web page. Tabs are provided for files, item information, original author information, and the details. In this example, we link to the item discussed in FIGS. 20-24; the map and driving instructions to JFK airport. Those skilled in the art will appreciate that this serves as a combined item/file view-friendly representation that can be viewed both within the system by the author, as well as externally by link recipients.

Figure 29:
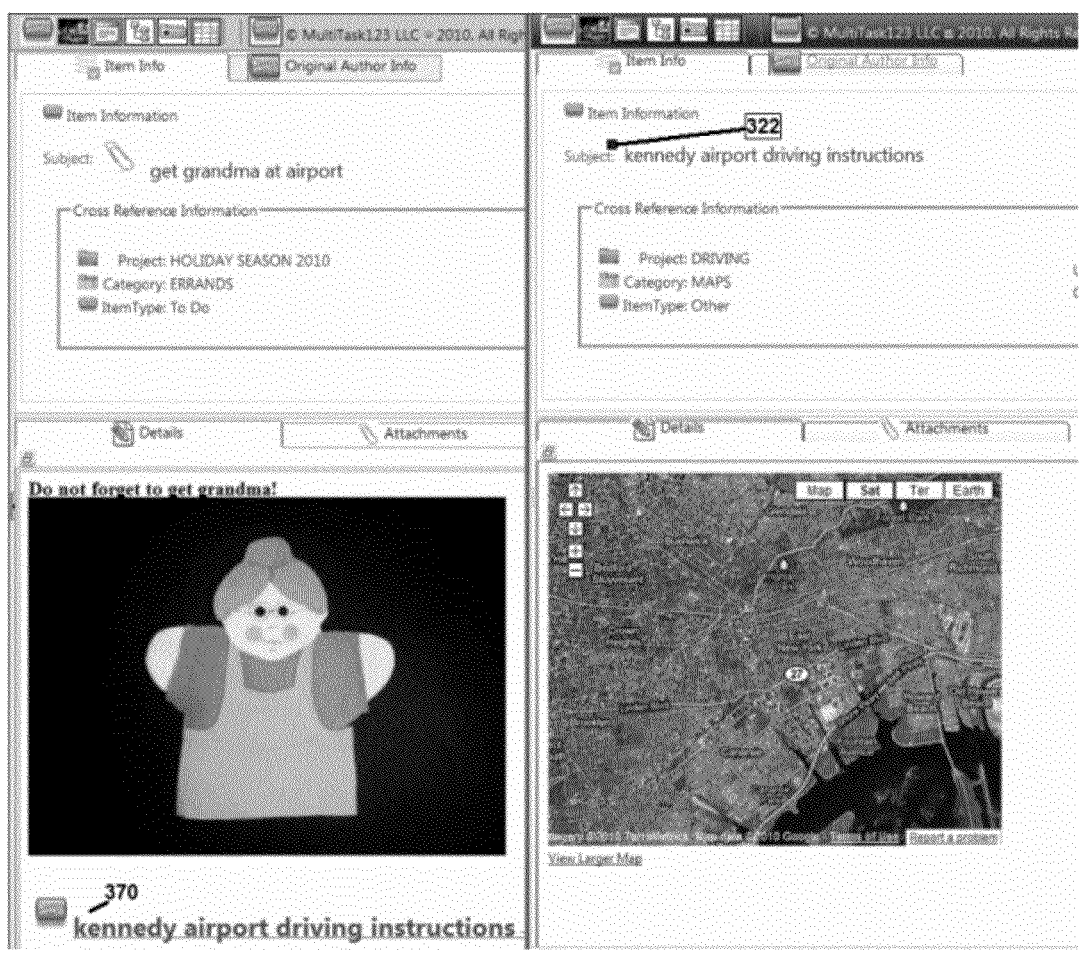
FIG. 29 is an illustrative diagram of the system's ability to serve system embedded item links from the details section.

FIG. 29 is an illustrative diagram of the system's ability to serve embedded item links from the details section of one embodiment generated web page to launch another generated web page for the item represented by the link. In this example, the user has clicked on the web URL for the item 370, "Kennedy airport driving instructions," and the system has launched the item as a new web page. The fruits of integration are realized and the user has a means (the map) for accomplishing a task (get grandma at the airport).

The item subject field 322 of the page on the right matches the web URL for the item 370 link of the display details section of the page on the right. Those skilled in the art will appreciate that this leverages the modern tabbed browser methodology fully, and, moreover can be used in windows based applications as easily in as a web browser. Thus, multiple views of information can be viewed within, and without, the main shell browser and view component 84.

Figure 30:
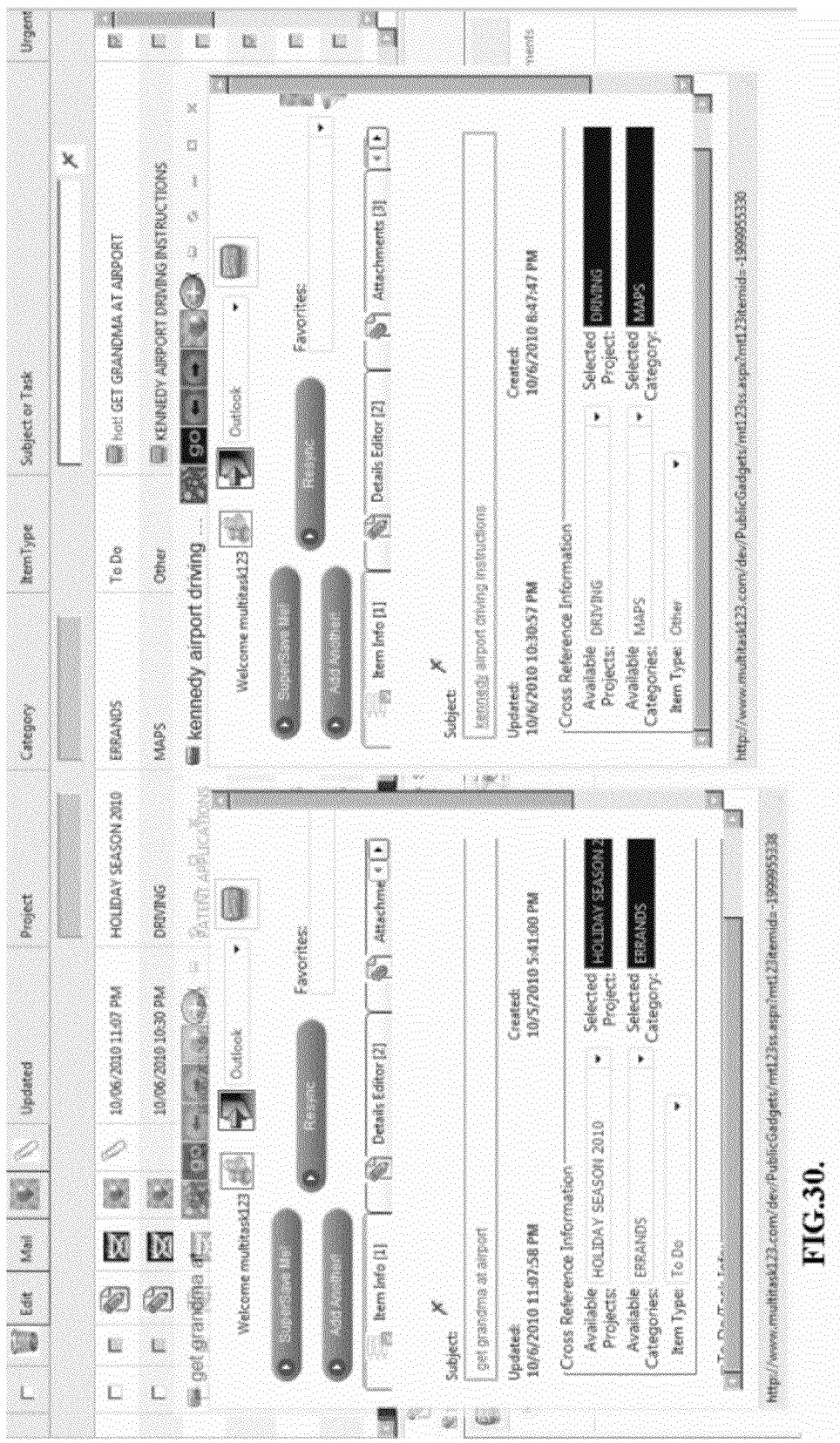
FIG. 30 is an illustrative diagram of two instances of the data entry form opened side by side.

FIG. 30 is an illustrative diagram of two instances of the data entry form opened side by side in the shell browser and view component 84, using the items discussed in FIGS. 19-29. This ability of the embodiment to open multiple items for both view and editing is designed to prevent the project-category-pairs from ever becoming a system limitation. Multiple items from multiple project-category-pairings can be opened and manipulated simultaneously to empower users to intuitively handle all data.

Figure 31:
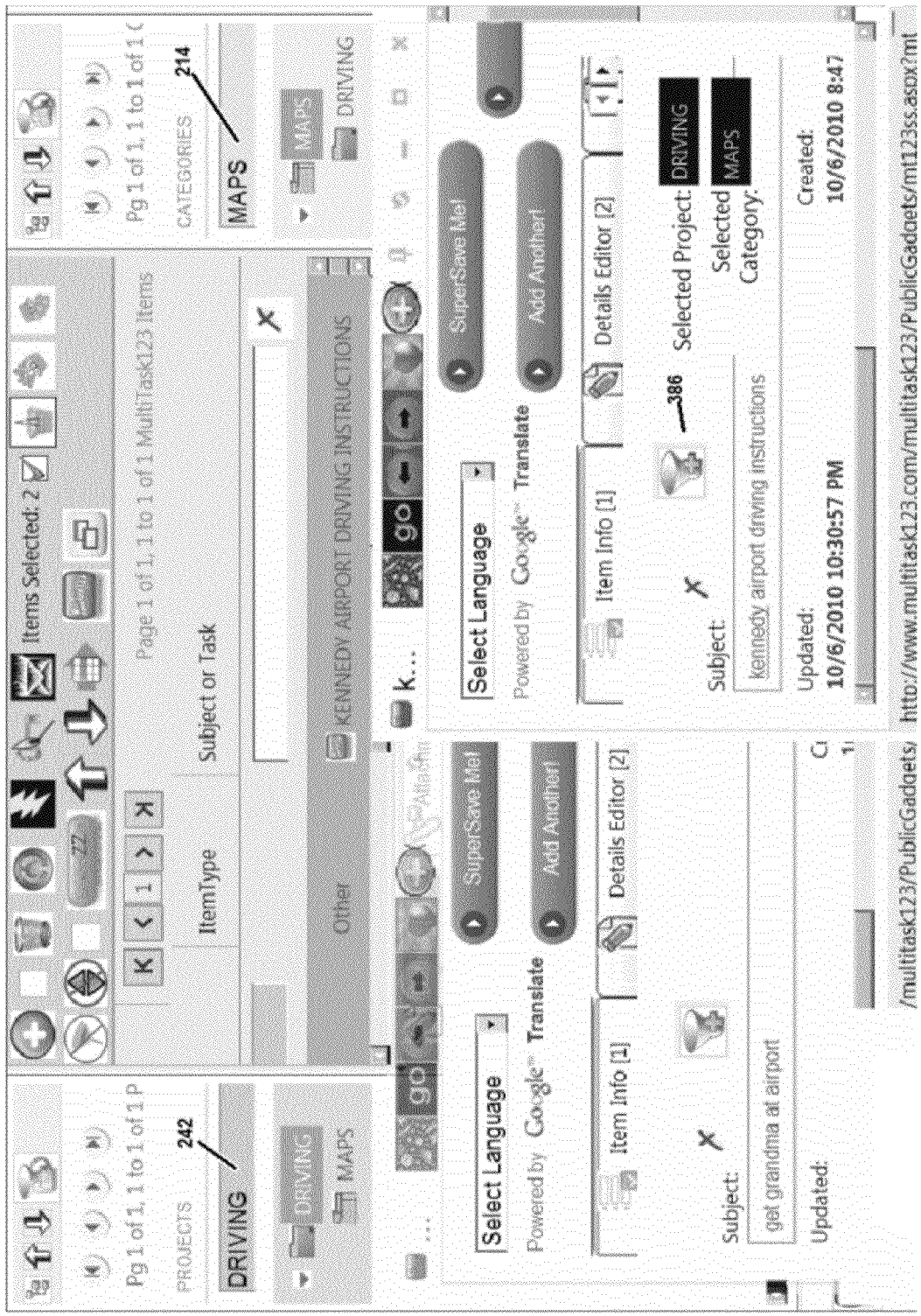
FIG. 31 is an illustrative diagram of two instances of the data entry form opened side by side where the user has activated the filter feature of the Kennedy airport driving instructions item.

FIG. 31 is an illustrative diagram of two instances of the data entry form, opened side by side, where the user has activated the filter feature of the "Kennedy airport driving instructions" item as depicted in FIG. 30. The user simply clicks on the automatic project-category filter feature 386 and the shell browser and view component's treeview controls and view panes reflect the filter of item in the data entry form, as can be seen in the active project filter 242 and active category filter 214 of the diagram.

Figure 32:
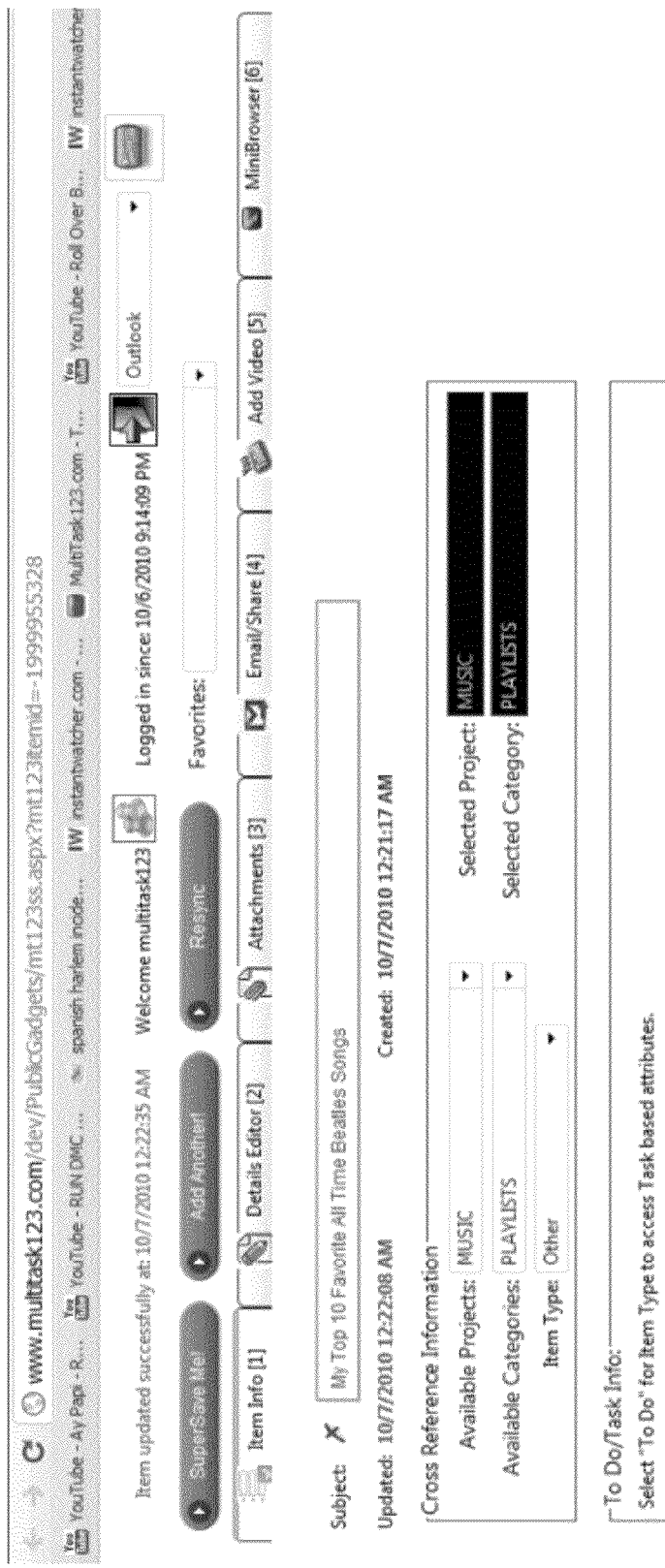
FIG. 32 is an illustrative diagram of the data entry form where the user is adding music files.

FIG. 32 is an illustrative diagram of the data entry form where the user is planning on adding music files to an item with a project named "music" and a category named "playlists." The user has added an item subject field with a value of "My Top 10 Favorite All Time Beatles Songs" and an item type of "Other". Since this item implies no task to be performed, as previously mentioned, the suitable attribute for the item type is "Other". Here, one can only presume that the user is out for a bit of multimedia enjoyment.

It should be noted that while FIGS. 19-31 illustrate a web enabled embodiment, the general architecture of the relational database 66, file server 90 or hard disk 91, file and digital content processor 86 components, and the user interface of the shell browser and view component 84, are platform agnostic methodologies that can be applied to all manner of network topologies, single computer embodiments, as well as all manner of computing devices, from digital portable devices like iPhones and Blackberries, to the multi-monitor 64 powerful client computer workstations seen in the state of the art.

The relational database 66, file server 90 methodology, and processing components operate independent of the specific implementation of the shell browser and view component 84, i.e. web browser or PC/MAC/Linux, etc. based non-web embodiments.

The embodiment can be applied to a multitude of operating systems, e.g. windows, apple, Linux, etc. and can be easily implemented in any modern computer language. Further, the specific flavor of the relational database 66, e.g., Microsoft SQL Server, or Sun's MySQL, is irrelevant to the overall function of the embodiment. The file and digital content management system 94 is, at its heart, a machine, method, and process for manipulating information through project-category-pairing and link based integration.

Figure 33:
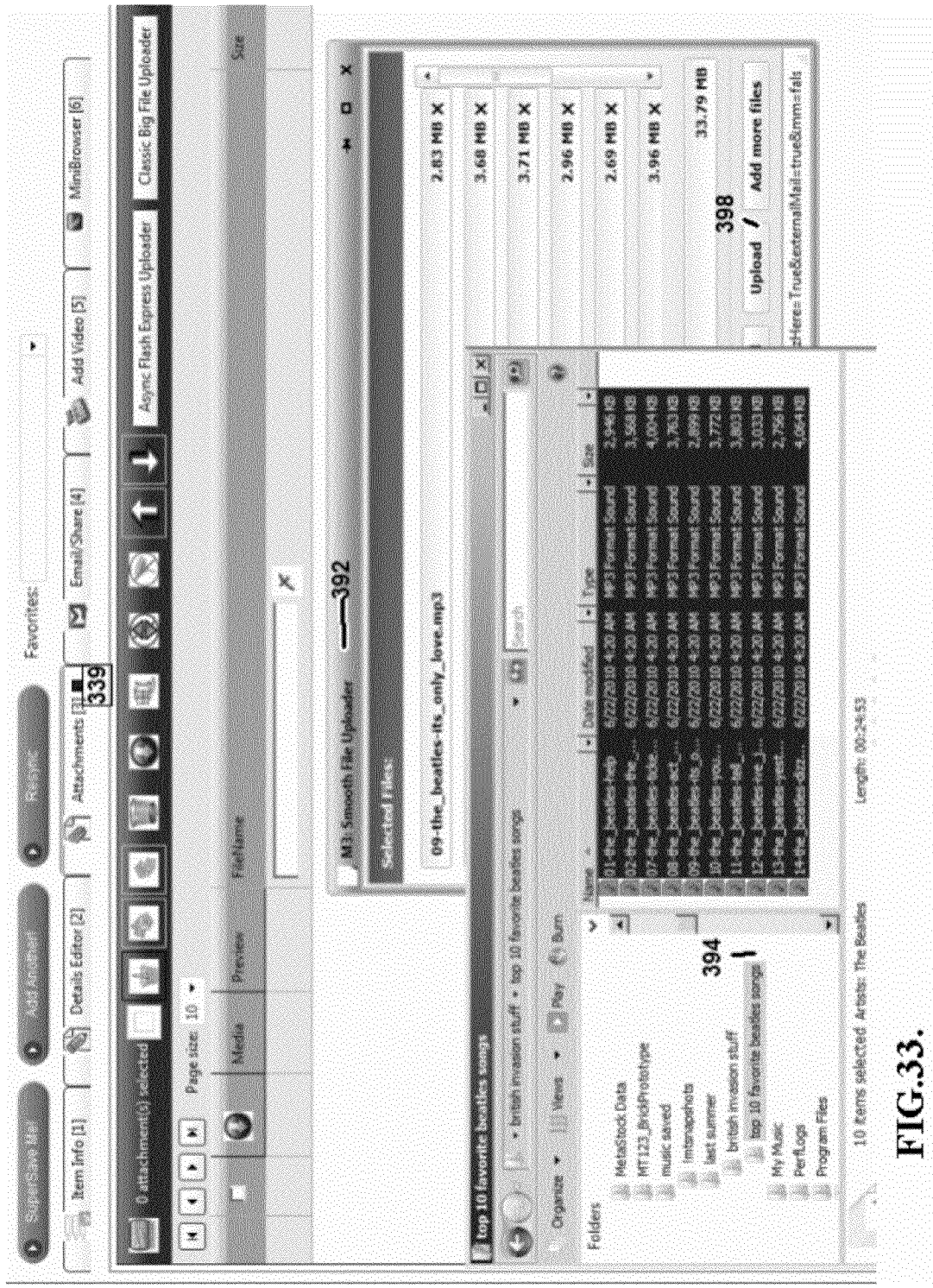
FIG. 33 is an illustrative diagram of the data entry form's attachments tab where files can be added, renamed, and deleted from the system.

FIG. 33 is an illustrative diagram of the data entry form's "Attachments" tab 339 where files can be added, renamed, and deleted from the system. The files to be added to the system are depicted in the windows folder with files for upload 394, which lists ten files the user has selected in a folder named, "C:\music saved\last summer\british invasion stuff\top 10 favorite Beatles songs." In this embodiment, the user has dragged and dropped the ten selected songs on to the upload control 392 component of the attachments tab, and will presumably click the upload button 398 of the upload component.

Figure 34:
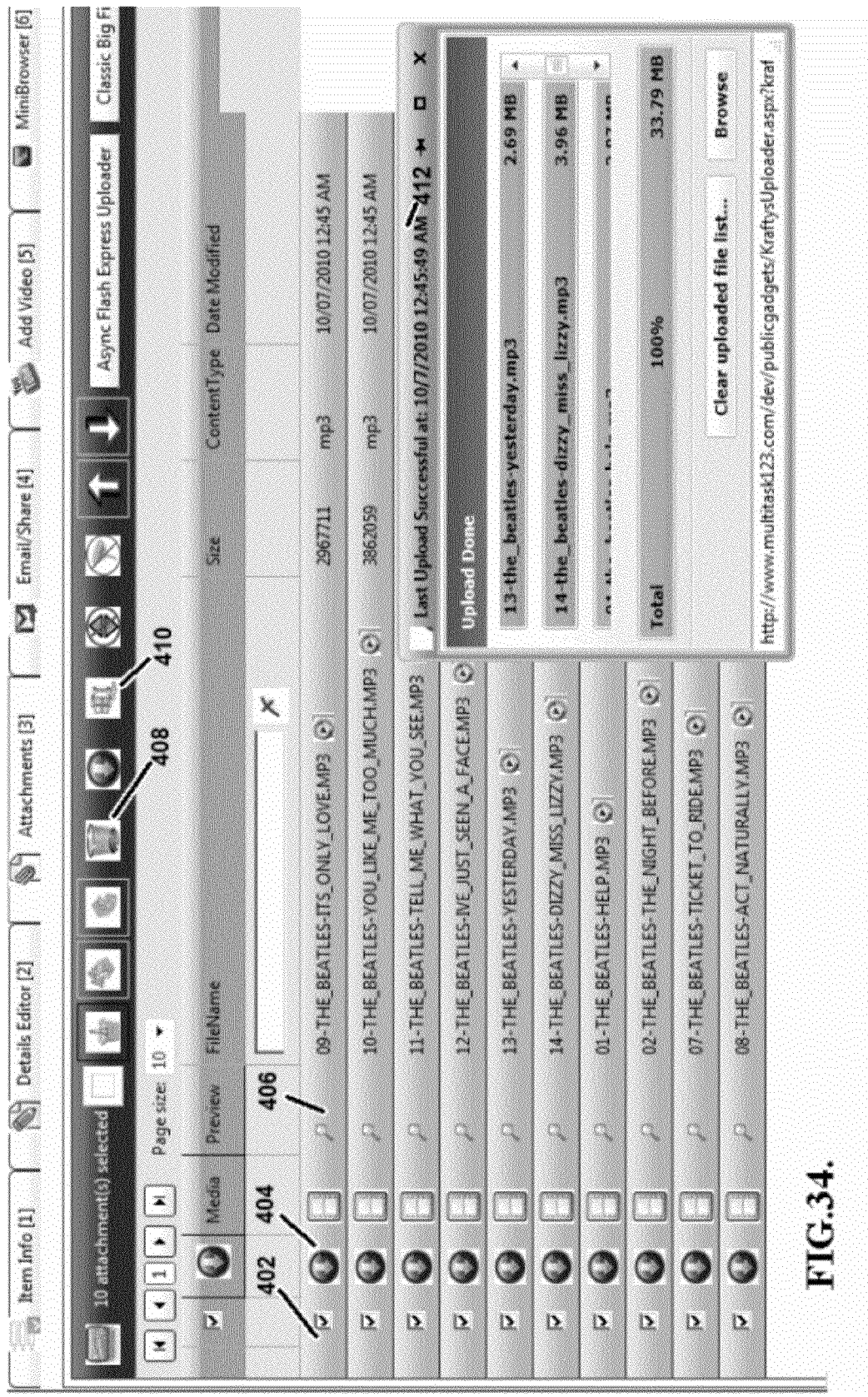
FIG. 34 is an illustrative diagram of the data entry form's attachments tab where the files from FIG. 33 have been successfully added to the system and associated with the "top 10 Beatles" item.

FIG. 34 is an illustrative diagram of the data entry form's attachments tab where the files from FIG. 33 have been successfully added to the system and associated with the "top 10 Beatles" item. The upload successful message 412 indicates to the user that the files have been added to the system's file server 90 or hard disk 91 component. Further, this diagram depicts the files view pane of the shell browser and view component 84. It can display files for an item when viewed in the attachments tab of the data entry form; or, for one or more items, projects, or categories, when viewed in the files pane 182 of the shell browser and view component 84.

The files view pane on the attachments tab contains select file checkbox 402 buttons for each file allowing files to be additively selected. Selected files can then participate in the common functions endemic of a file shell type system, such as being downloaded by a download button 404. The compressed download button 410 can trigger a compression routine for network transfers to reduce bandwidth. A preview button 406 is provided to view multimedia content, pictures, adobe PDF files, etc. from the files pane 182 itself. A delete button 408 is provided to enable the users to remove files. As those skilled in the art will appreciate, additional file manipulation features can easily be extended to operate on the selected files listed in the files view pane now that the system conveniently organizes and classifies them based upon their association to specific items, as previously discussed.

Figure 35:
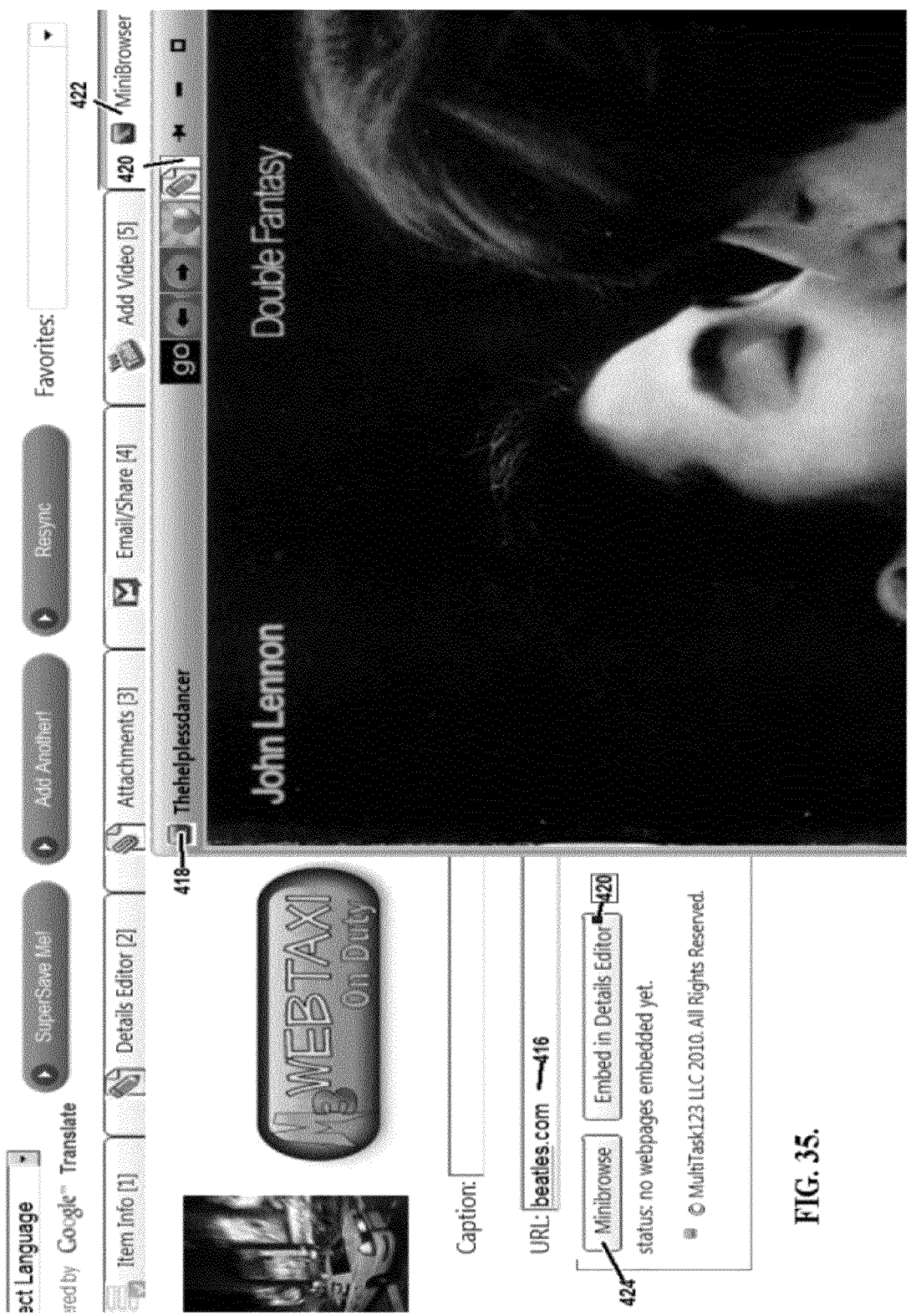
FIG. 35 is an illustrative diagram of the data entry form's web browsing and URL embedding feature.

FIG. 35 is an illustrative diagram of the data entry form's web browsing and URL embedding feature found on the data entry form's minibrowser tab 422. The illustration depicts a user who has entered the beatles.com web URL into the URL address textbox 416 of the minibrowser tab 422. Clicking the minibrowse button 424 opens the beatles.com web site in the minibrowser component window 418.

The user has the option to embed the entire web page in the item via the URL embedding button 420 function. As those skilled in the art will appreciate, the simple iframe tag of the html specification will take a web address or URL as an attribute. The system simply embeds the iframe tag in the details of the item. This provides a powerful methodology for embedding rich digital content from any web page on the Internet that exposes its content; e.g. Google maps.

Thus, the system can easily add one or more web pages to an item's details. The web pages appear wherever the details of the item are displayed, and the embedded web pages provide a live, embedded portal to external content. With today's web centric technological paradigm, the ability to embed any html text on a per item basis turns every item into a rich multimedia unit, regardless of a web embodiment, or other embodiment. For example a windows embodiment can just as easily display iframe content; in fact this is exactly what a web browser application is. Thus, the html compliant details section expands the integration of every item with Internet content, subject only to security restrictions.

Figure 36:
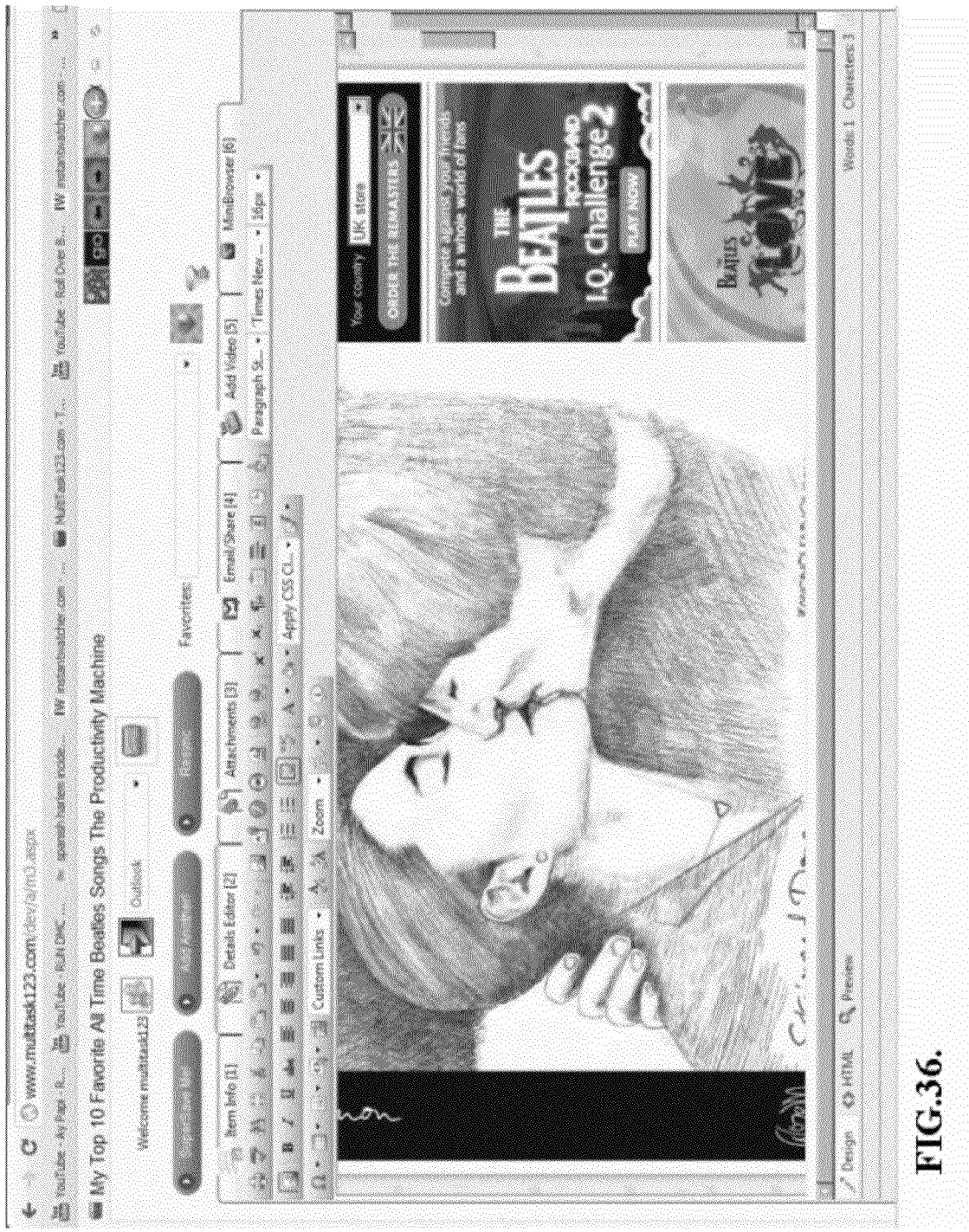
FIG. 36 is an illustrative diagram of the results of embedding a URL viewed in the minibrowser component.

FIG. 36 is an illustrative diagram of the results of embedding a URL viewed in the minibrowser component. Continuing the example begun in FIG. 35, the user utilized the URL embedding button 420 and the URL has become the value of the "src" attribute in a plain vanilla iframe tag common to all web developers. However, the benefit here is that the user needs to only know the web address to embed the site page, rather than learn html tags and how to embed them manually in the details editor's html mode 356 embodiment. The system abstracts the complexities of file and data management, as well as networking concepts, so that the average computer user can begin to build a library of rich digital content and files that can be easily shared via email or wherever web links can be posted; e.g. blogs, tweets, RSS feeds, facebook pages, etc. The user simply learns a new paradigm for the projects treeview control [196] and categories treeview control 198, namely the project-category-pair methodology, and then no further learning curve is required, as the embodiment uses common interface components like tabular grids, windows, treeview controls, drop downs, shortcut menus, tabs, scrollbars, etc. and so forth. The intent is to provide an integrated and cohesive information management system that favors simplicity wherever it applies to integration.

Figure 37:
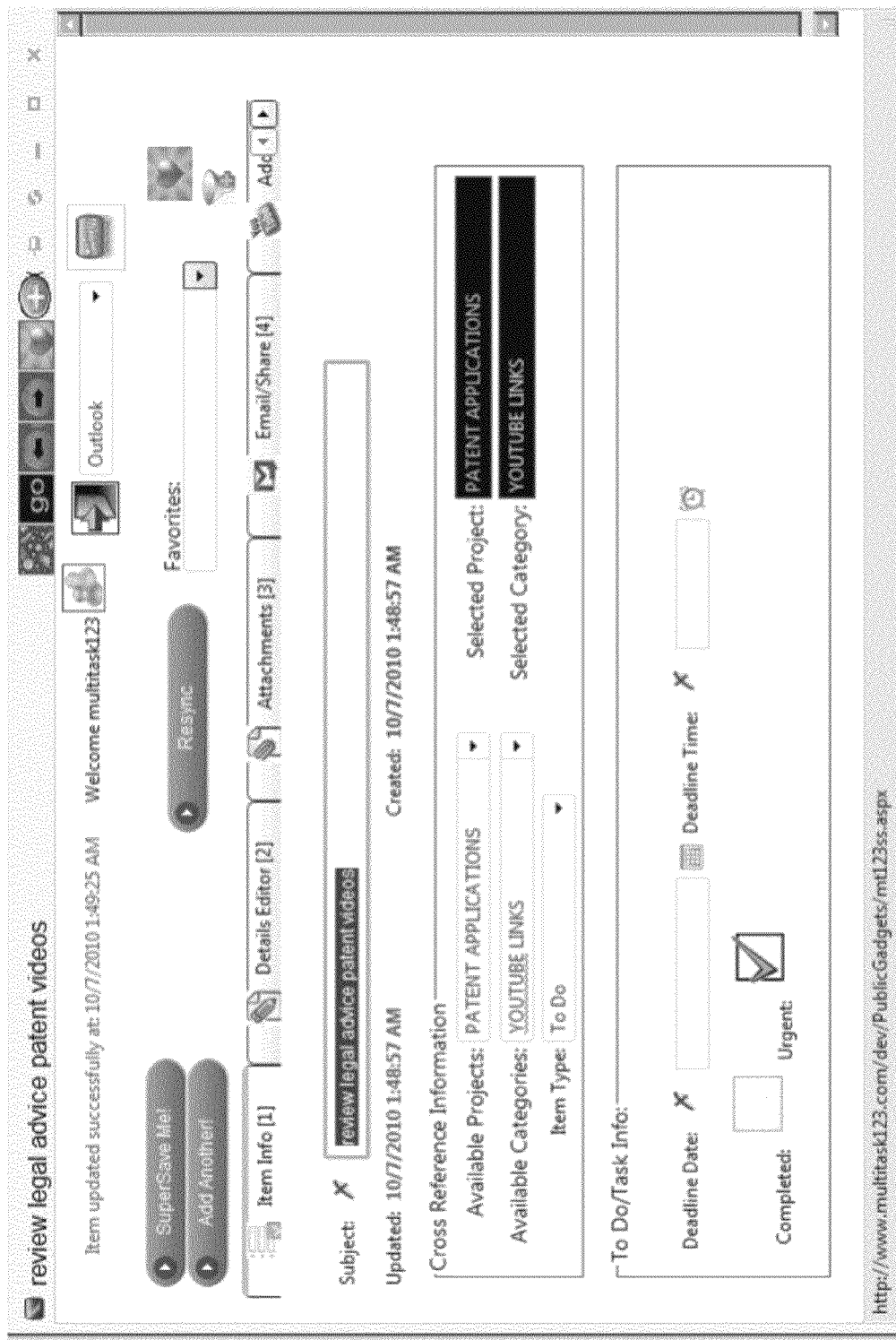
FIG. 37 is an illustrative diagram of the data entry form where the user is going to embed video.

FIG. 37 is an illustrative diagram of the data entry form where the user is going to embed video. The user has created a new item with a project-category-pair of "patent application" and "youtube links" respectively. The item subject attribute is "review legal advice patent videos."

Figure 38:
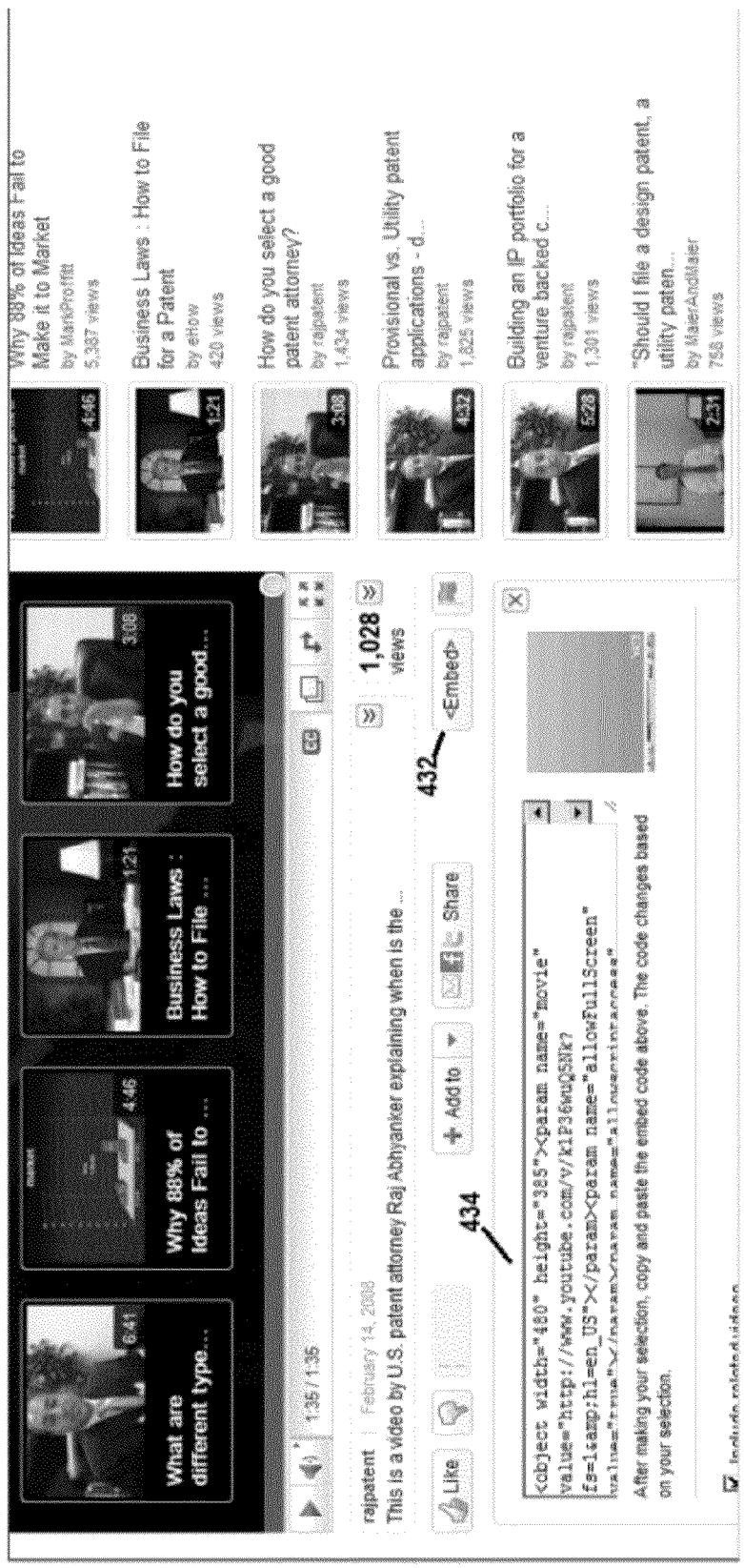
FIG. 38 is an illustrative diagram of a youtube webpage exposing an embeddable object tag for a patent application related video.

FIG. 38 is an illustrative diagram labeled as "PRIOR ART" of a youtube.com webpage exposing an embeddable object tag for a patent application related video. The embed video button 432 exposes the object tag source code for video 434 that can be copied and pasted into the embodiment's video embedding tab of the data entry form.

Figure 39:
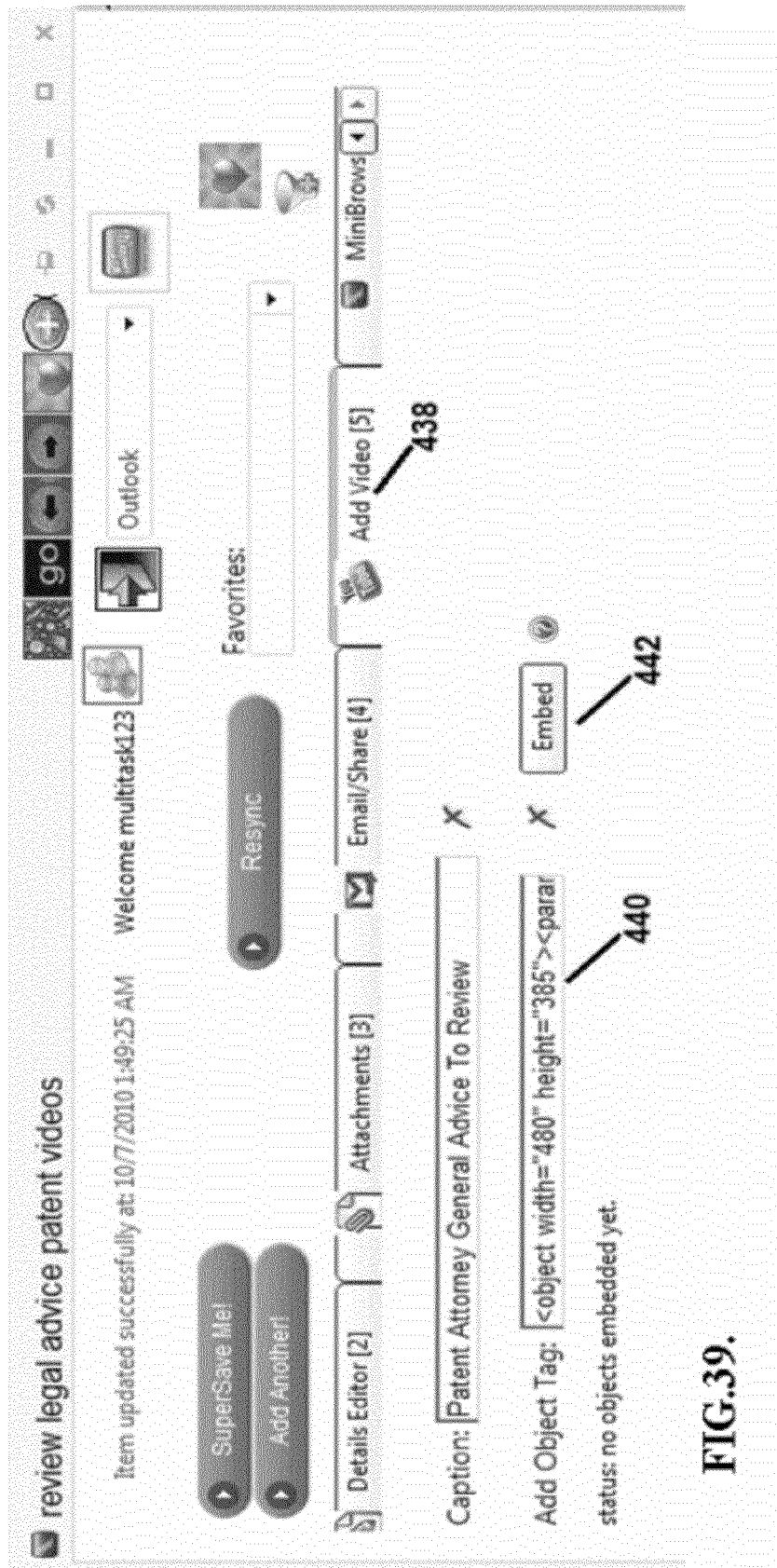
FIG. 39 is an illustrative diagram of the data entry form's video embedding feature.

FIG. 39 is an illustrative diagram of the data entry form's video embedding feature. The add video tab 438 of the data entry form has an add object tag text entry area 440 and a video embedding button 442. Thus, the embodiment allows the average computer user to quickly create rich digital content items in the system by a simple copy and paste operation between the site with the video object tag to be embedded, and the data entry form.

Figure 40:
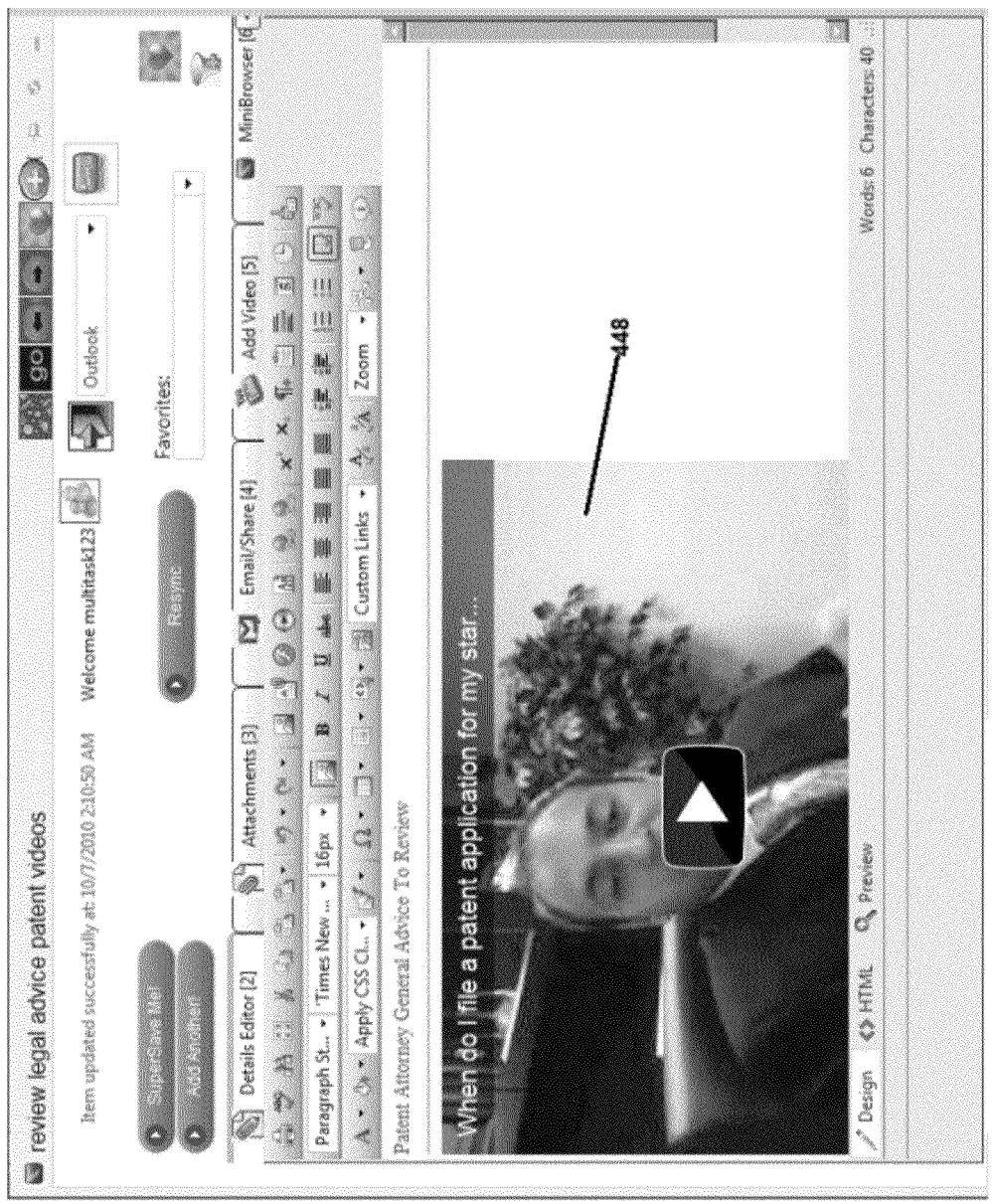
FIG. 40 is an illustrative diagram of the results of embedding an object tag for displaying video in the details editor tab of the system.

FIG. 40 is an illustrative diagram of the results of embedding an object tag for displaying video in the details editor tab of the system. As is the case with embedding a URL (depicted in FIG. 36), the rich digital content is automatically added for the user to the details editor. It will be appreciated by those skilled in the art, a full spectrum of users can benefit from the rich digital content capabilities by having two edit modes for the details editor, namely design mode 354, and html mode 356. Design mode 354 works like a normal word processor, and no specific technical knowledge beyond that of web browsing, word processing, email, etc. is required. However, the html mode 356 allows the technology professional to tweak the html source code of their items thereby allowing a full spectrum of users to leverage their own skills without being limited by the embodiment "dumbing down" its capabilities for manipulating digital content.

Those skilled in the art will appreciate that the data entry form can serve a double duty for the web professional as a quick "mock-up" web designer. The html contents can then be pasted in more "industrial strength" web development environments. However, the grunt work of embedding, etc., is done automatically, allowing html developers in a web enabled embodiment to focus on content before refining layout and other procedurally oriented tasks as regards web development.

Further, the integrated, dynamic nature of the file and digital content management system 94 allows professional programmers to easily build a code library that can be used as a utility to increase computer programming productivity. The generic nature of the system enables anyone who performs repetitive, informational based tasks, to custom tailor partial automation of any work flow by creating project-category-pairs to encapsulate the information, and files, they wish to manage.

Figure 41:
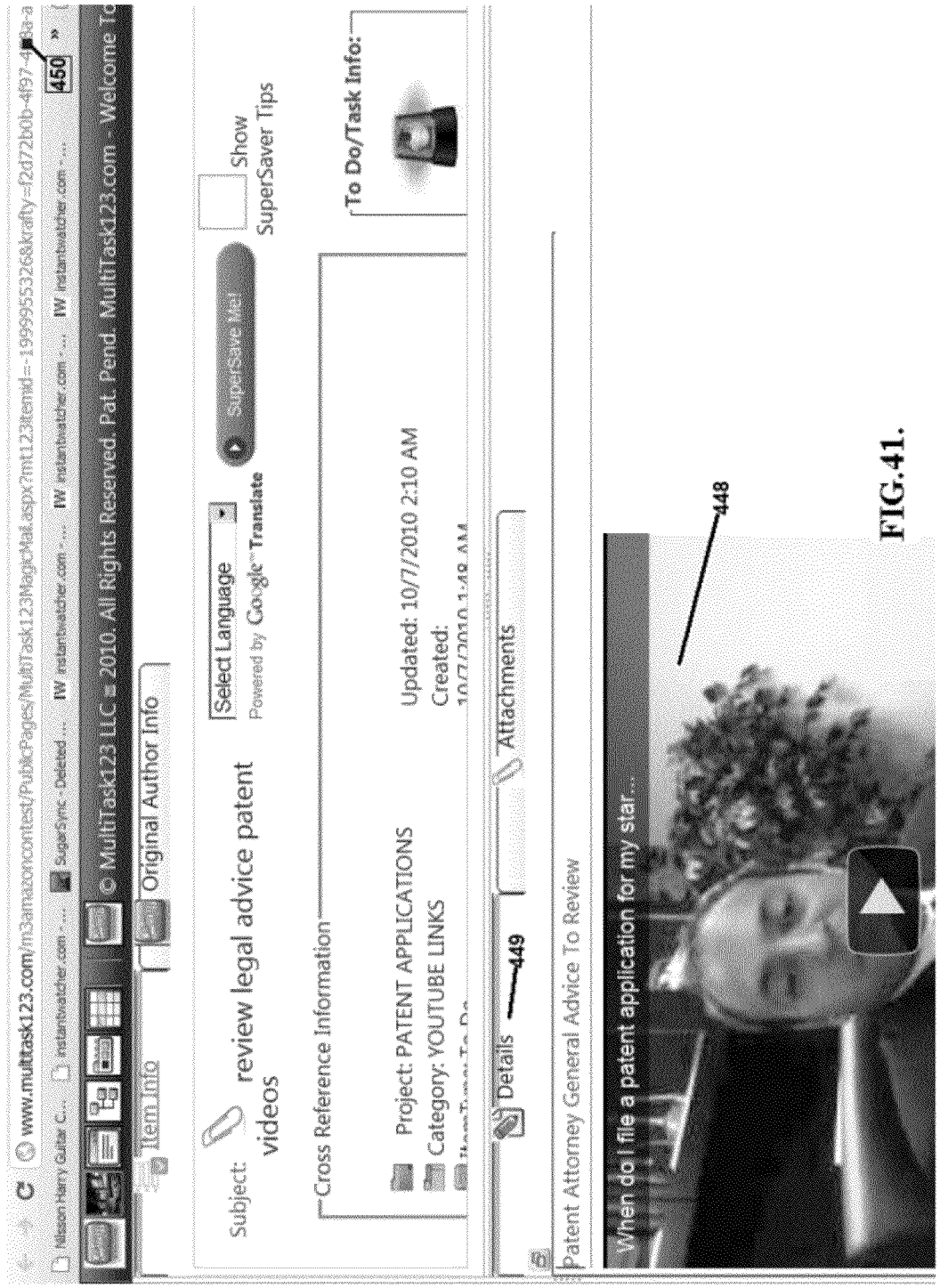
FIG. 41 is an illustrative diagram of an item with an embedded video viewed as a web page.

FIG. 41 is an illustrative diagram of an item with an embedded video 448 viewed as a web page. The web page's details tab view mode 449 contains or displays the embedded video 448. Further, based upon the user identifier 258 and the item identifier 256, the system can quickly create a unique URL for each and every item in the system. Therefore, in the web enabled embodiment, the system takes on another dimension; as a repository for web pages. The system's ability to function as a digital library becomes apparent as the system can be customized simply by creating accounts for different purposes. For example, to create a digital retail web site an account named "PaulMart.com" can be created for this specific purpose. The projects and categories could all relate to retail categories, e.g., "housewares", "electronics", etc., and the categories could be as diverse as "daily specials," "holiday sales," etc. The user can simply add items for sale, and/or other sales related information, and use the system to enable non-programmers to add content to the sales embodiment of the system.

Another example of the customizable nature of the embodiment for serving a web based business model, would be as a library of movies and television shows that can be browsed, viewed, saved, watched, etc. Projects could be genres, e.g., "action", "romance", "film noir", etc.; and categories could be as diverse as "top picks", "academy award winners", "star ratings", etc. The number of embodiments, uses, and manifestations the system can assume are only limited by the user's imagination of how they would categorize data and files under system management. As those skilled in the art will appreciate, the file and digital content management system 94 possesses many aspects of a traditional programming framework; in other words, reusable objects that can be modified with relative ease to assume many forms that share common core functions; i.e. polymorphism.

The system's ability to dynamically create browser compliant web URL 450 addresses on a per item basis, bridges the gap both automatically and intuitively, between a generic file and content management system; either single-computer based, or networked via common client-server paradigms, and a web based content management system. This is accomplished by providing several complementary paradigms that integrate throughout all facets of the system.

From the schema of the relational database 66; to the schema of the type factory component 76; to the databinding component's ability to merge project, category, user, and item identifiers with key aspects of the shell browser and view component 84 (e.g., the treeview controls folders filtering and dynamic synchronization functions), the system creates a complete solution to a plethora of common problems that can best be classified under the umbrella, "information overload."

As the technological capabilities of computers and networks advance, more and more information is created on a daily basis world-wide. The need for a comprehensive, integrated, and general purpose solution can, in the aggregate, conceivably save billions of man-hours per day, as few would argue that the best way to increase productivity is through the systematization of repetitive tasks; i.e. automation.

Figure 42:
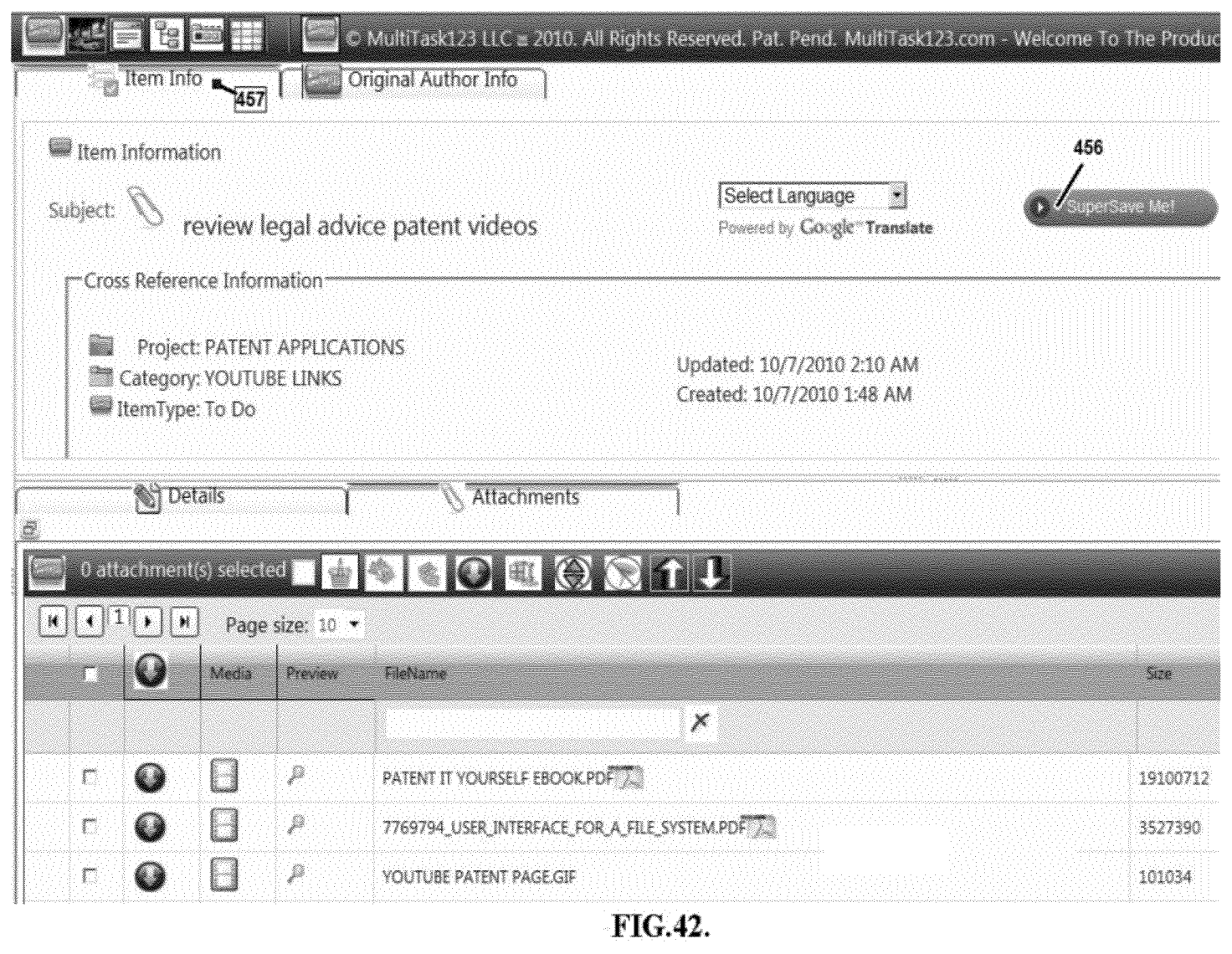

FIG. 42 is an illustrative diagram of the view mode "Item Info" tab 457 top section and the bottom section "Attachments" tab 339 for the item depicted in FIG. 41. The supersave me button 456 in the item info tab of the diagram represents the system's method for sharing items and files; cloning.

As those skilled in the art will appreciate, a major obstacle to the adoption of any file and digital content management system 94 is the ease within which data can be manipulated. User interfaces that require unnecessary steps, or have complicated menu systems, are often the focus of negative sentiment on the part of users. Computer systems, if they are nothing else, are repetitive. Repetition is a close cousin of tedium, and sooner or later tedium reduces output and morale. Users become unmotivated and will use systems both reluctantly and only when absolutely necessary to avoid the perceived unpleasant user experience. As will be described further below, the embodiment provides a cloning system for items and files that enables each item to perform, through its web page type view embodiment, as a template from which a new item can be created that shares both its attributes, and files.

Figure 43:
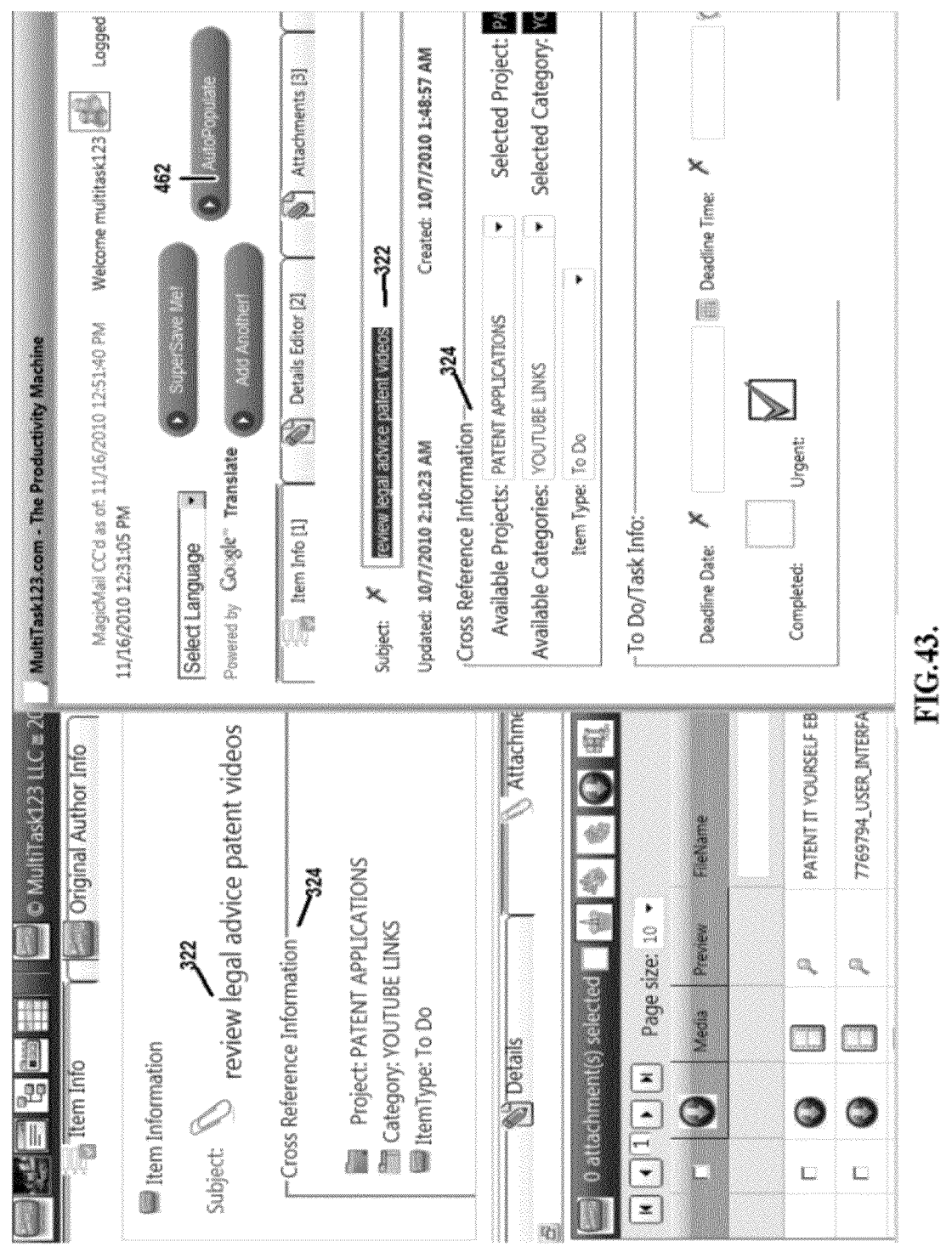

FIG. 43 is an illustrative diagram of the data entry form of the system cloning an item viewed as a web page. The autopopulate button 462 takes the information from the item being viewed, and uses it as a template to populate the data entry form opened by clicking the supersave me button 456 in FIG. 42. Thus, if the user wishes to save many new items using one item as a template, a significant amount of data entry time can be saved. For example, if the user is creating invitations and is simply customizing them for friends and family, most of the information, except for a personalized greeting might be identical; e.g. driving directions, date and time of the party, and other invitation related attributes. The user could then simply create one invitation and then open it as a web page. The supersave me button 456 would keep opening new data entry forms for the user that can subsequently be customized to satisfy the needs of the item author.

Further, templates need not be used by the same user. This is the mechanism by which the embodiment creates a loosely connected rich digital content and file sharing network. Any user who is given access to an item via a generated URL, and has an account; i.e., a user identifier 258 on the system; can simply clone another user's item into a new item under their own account. Users can therefore collaborate in a very flexible way, cloning all manner of rich digital content, and file attachments, for any item they have a link to, for example, by email, or clicking on a webpage link, etc.

Figure 44:
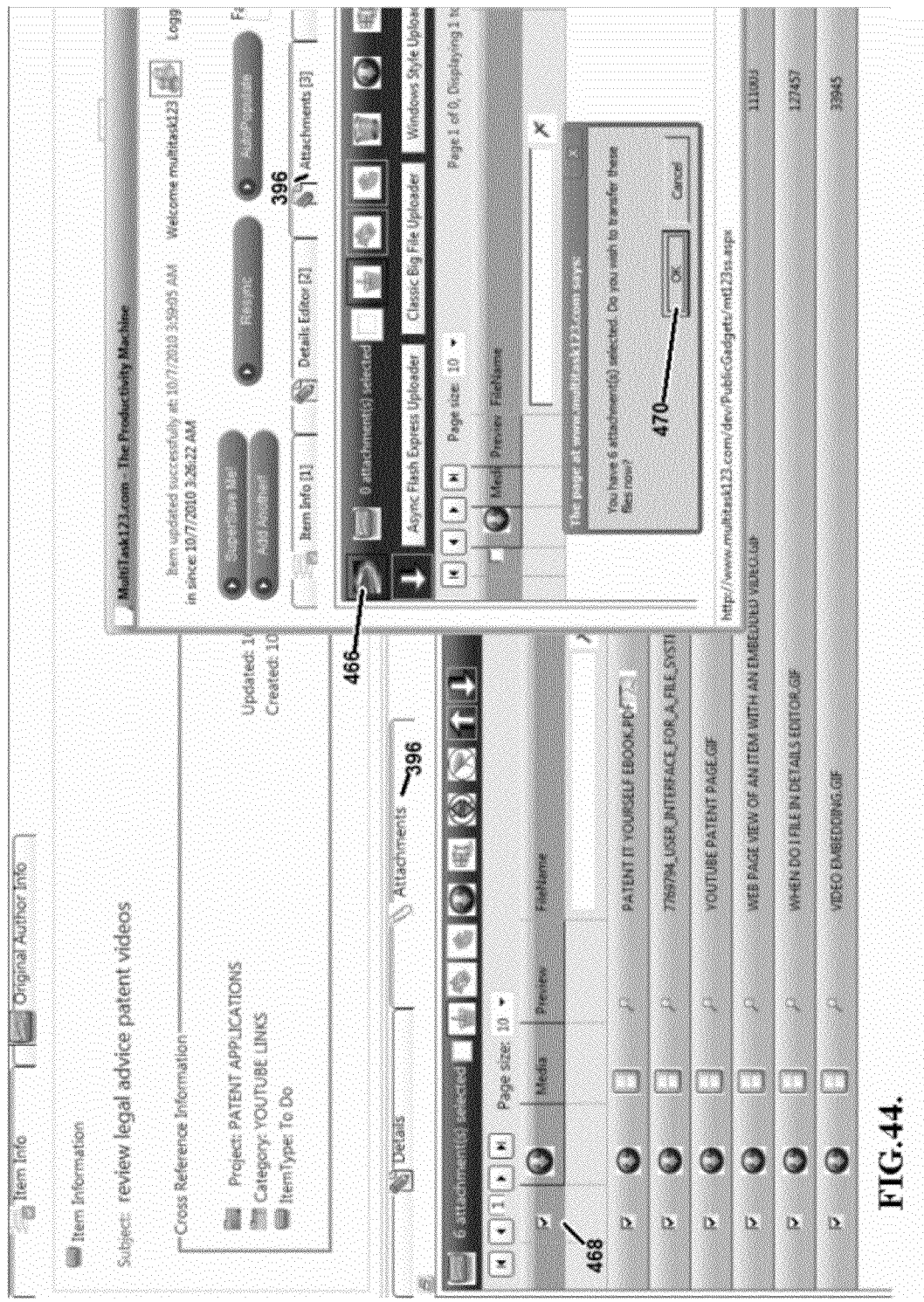
FIG. 44 is an illustrative diagram of the file-cloning feature of the attachments tab of the data entry form.

FIG. 44 is an illustrative diagram of the file cloning feature of the attachments tab of the data entry form. The file transfer button 466 simply takes the selected items as indicated by the presence of a checkmark in the selected files checkbox 468 column, and the user simply clicks the "OK" 470 button to activate the file transfer. For example, in the item depicted in FIGS. 40-43, the user can take an embedded youtube video about the basic patent application process, and a list of files which include a do-it-yourself patent book adobe acrobat file, scanned drawings for the preliminary application, etc. that can become a template for full cloning of the content and files. Once cloned, the item can be further customized using the myriad of aforementioned features available in the file and digital content management system 94. Thus two individuals could collaborate on a patent application, ensuring that no time is wasted on repetitive, tedious, tasks that do not directly relate to the goal, i.e. filing a patent application.

Figure 45:
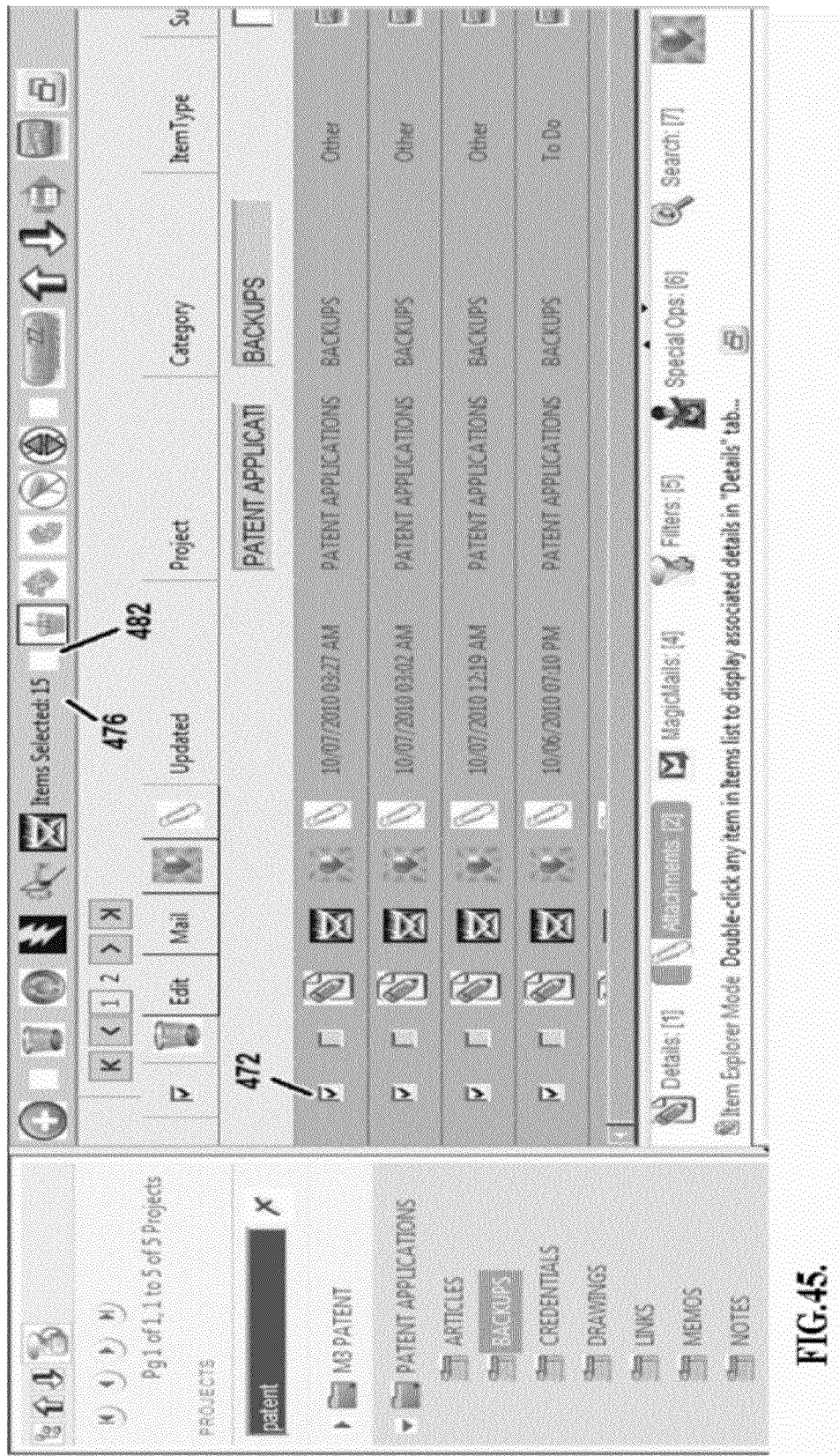
FIG. 45 is an illustrative diagram of the embodiment's items pane item shopping cart feature.

FIG. 45 is an illustration of the embodiment's items pane 180 selected items "shopping cart" feature. The presence of the checkmarks in the selected items checkbox column 472 represent items that have been selected and added to the shopping cart. The shopping cart is identical to a shopping cart one might find on any retail website. Items can be selected and placed in the cart and thereafter participate in batch operations. The selected items count label 476 indicates the number of selected items.

Figure 46:
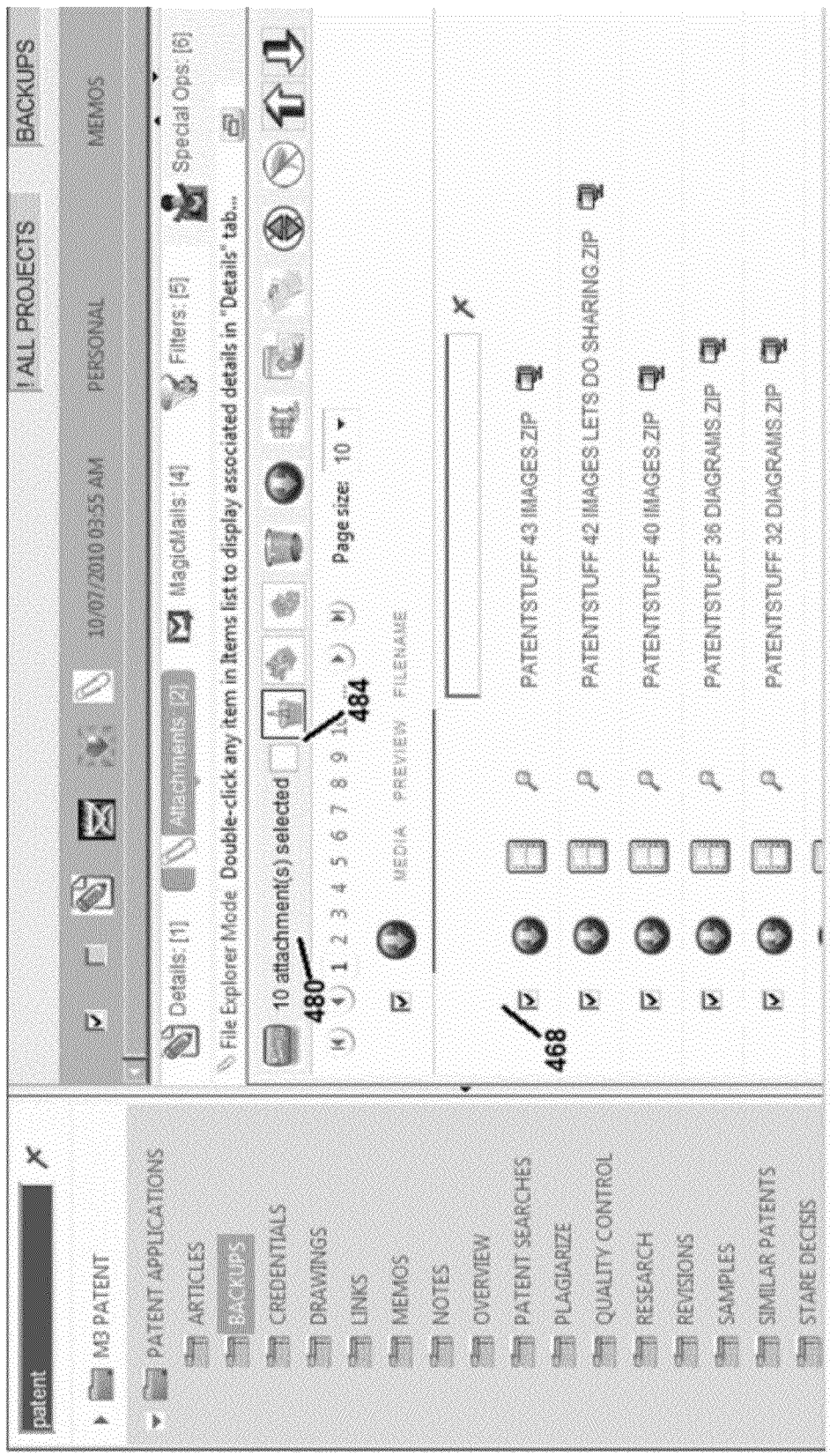
FIG. 46 is an illustrative diagram of the embodiment's files pane file shopping cart feature.

FIG. 46 is an illustration of the embodiment's files pane 182 shopping cart feature. Like the selected items shopping cart of FIG. 45, the function is identical, only the content in the cart is the user's files instead of items. The selected attachments or files count label 480 indicates the number of files for which the selected files checkbox 468 button has been checked by the user.

FIG. 45 and FIG. 46 are not only two sides of the selection process of content under management, but are complementary, as they integrate with the overall function of the system. Selecting an item adds the item identifier 256 to a list, and deselecting the item removes it.

Similarly, selecting a file adds the file identifier to a list, and deselecting the file removes it from said list. By creating shopping carts of files, and items, the user can browse the system via the project-category-pair paradigm as represented by the projects treeview control 196 and categories treeview control 198 and at any given point, the user can select items or files to be added to their respective shopping carts.

The selected items and files shopping carts can be further manipulated by activating the selected items filter checkbox 482 and/or the selected files checkbox filter 484 of the shell browser and view component's items pane 180 and files pane 182. The filter transforms the screen to display only selected items and files, and will work in tandem with the other filters available in the items pane 180 and files pane 182; i.e., project, category, partial text matching, item subject, etc. Selected items and selected files remain the target of the system's batch operations, such as deleting all selected items, files, etc.

Further, selected files can be copied or cloned to multiple selected items. Those skilled in the art will appreciate the geometric increase in productivity that can be attained by providing a mechanism to not just copy files from one folder to another but rather to clone them and copy them to multiple items simultaneously.

Thus, if ten files are selected, and, ten items are selected, the system's move or copy feature can simultaneously pass a request containing the selected items' identifier list, and the selected files' identifier list to the request broker component 82. The file and digital content processor 86 component can simply iterate through the list, performing its normal processes of modifying the contents of the file server 90 and relational database 66 as previously described.

Manipulating information through simple group and select features, combined with the ability to perform manipulations in batches, results in a greater productivity yield for individual users and furthermore suggests that tremendous productivity gains can be achieved in a networked file sharing embodiment, as said productivity yields are multiplied across large numbers of users.

Figure 47:
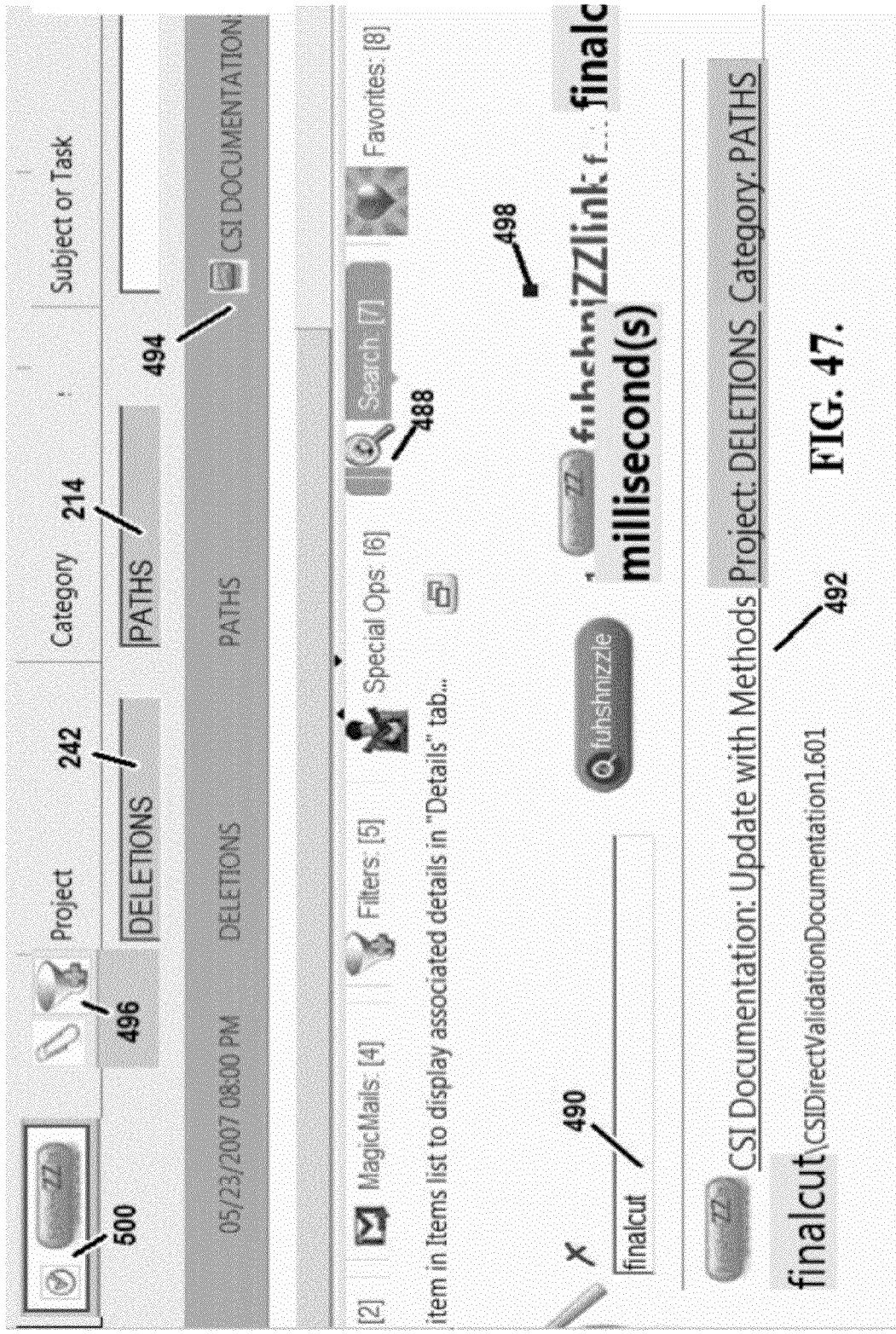
FIG. 47 is an illustrative diagram of the shell browser and view component's rich digital content search feature.

FIG. 47 is an illustration of the embodiment's search feature. The shell browser and view component's search tab 488 is displayed and offers a Google like search feature to users. The search tab 488 has a partial search text 490 entry area. In this diagram the user initiates a partial text item search on the text string "diagrams." The partial text match item links 492 are returned to the shell browser and view component 84 from the relational database 66, courtesy of a db query object constructed by the file and digital content processor 86. The system simply pulls back each item as a link that contains a partial text match in the details column of the items table 278 as found in the relational database 66.

The search results listing 498 contains the link to the item. The link, just like the Email/Share tab function of the data entry form, lists the item's subject attribute value, the project, and the category. Clicking on this link will filter the items pane 180 to display the selected item filtered by user selected search result 494. Thus, we see the items pane 180 contains one item, "CSI DOCUMENTATION UPDATE WITH METHODS", matching the link selected. Once the item is displayed in the items pane 180 viewer, the user can select the filter on selected item project-category-pair 496 button and automatically synchronize the projects treeview control 196 and the categories treeview control 198 on the selected search result's project-category-pair; revealing other project-category-pairings, thus offering an additional level of horizontal system-wide integration; searchability. The visual indicator rich digital content search mode 500 reminds the user that they are in search mode. Simply unchecking the checkbox in this embodiment will return the shell browser and view component 84 to its default mode.

Those skilled in the art will appreciate that no matter how intuitive a paradigm for information management is presented to the user, it is always possible to misplace an item through user error. Thus, a generalized digital content search feature provides another complementary integration mechanism of the file and digital content management system 94. In this embodiment, a partial text match is all that is required to return project-category-pairs, and item subject information, along with surrounding text, and rich digital content, enabling the link to convey the primary information the item represents. At this point, the user can leverage all the other integrated features of the system; e.g., project-category-pair filters, to further refine the data displayed. The shopping cart selected items, and files lists, can be modified to add the searched item or file to the general shopping cart lists for items and files. Thus, the user has another way to add items to be used in batch operations, and need never sacrifice productivity when confronted with the limitations of any general shell paradigm. All general use-cases are contemplated, and integrated, into the shell browser and view component's multi-tabbed paradigm, allowing key features required for maintaining control over ever-growing data repositories.

Figure 48:
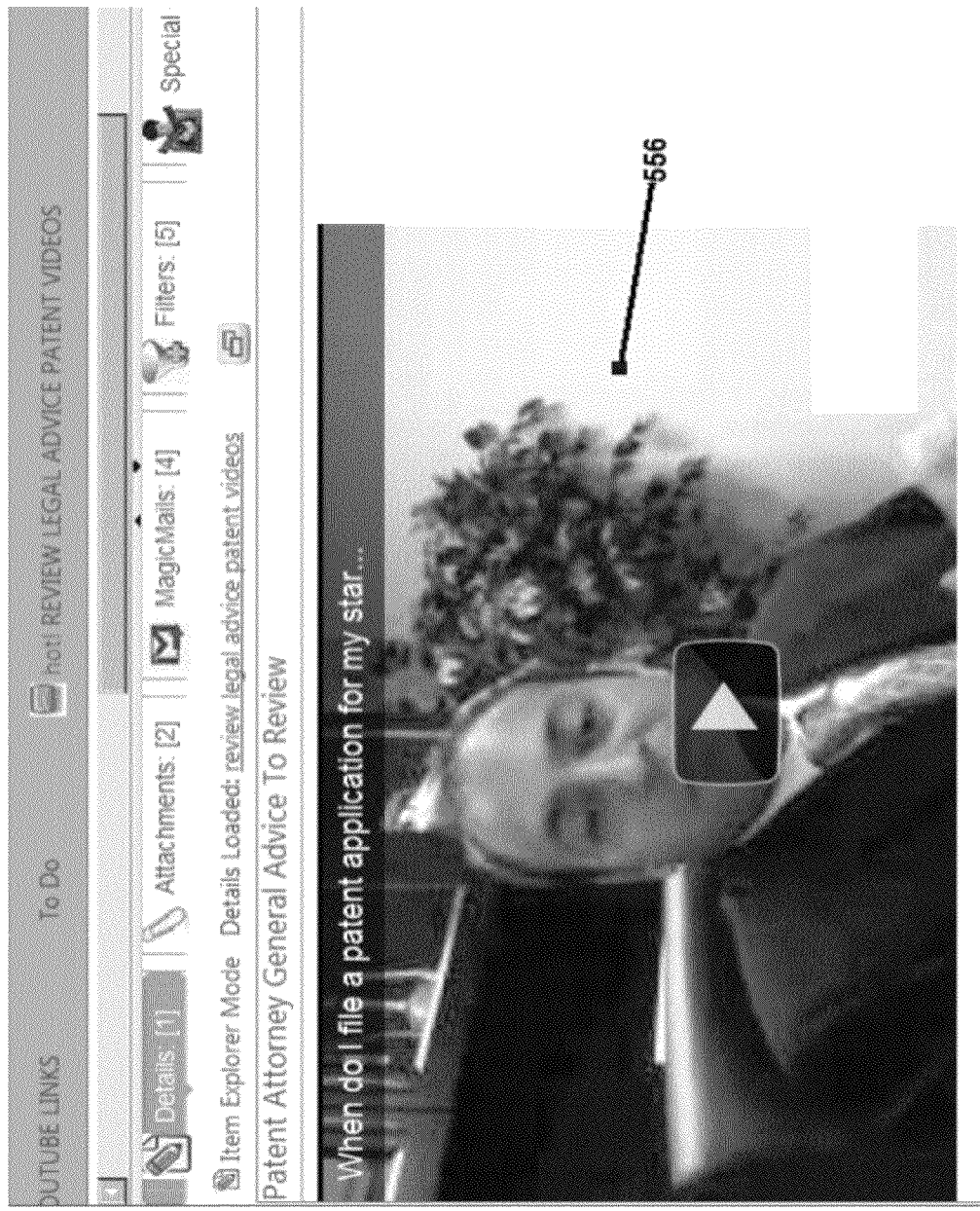
FIG. 48 is an illustrative diagram of the shell browser and view component's rich digital content item detail display feature.

FIG. 48 is an illustrative diagram of the shell browser and view component's rich digital content item detail display feature. Simply double clicking any item in the items pane 180 will transform the shell browser and view component's bottom view panel to display the content stored in the item's details attribute. This enables users to quickly determine the information stored in an item without having to open the item in the data entry form, or in the web page style browser display. As those skilled in the art will appreciate, the tabbed methodology enables a tremendous amount of information to overlap in the same visual space, thus enabling the system to categorize related information in speedy, compartmentalized, and intuitive ways.

The embodiment leverages just such a popular paradigm to enable users to quickly view contents, files, details, search, and other common features, and functions, associated with a full featured, rich digital content management and file browser system.

Figure 49:
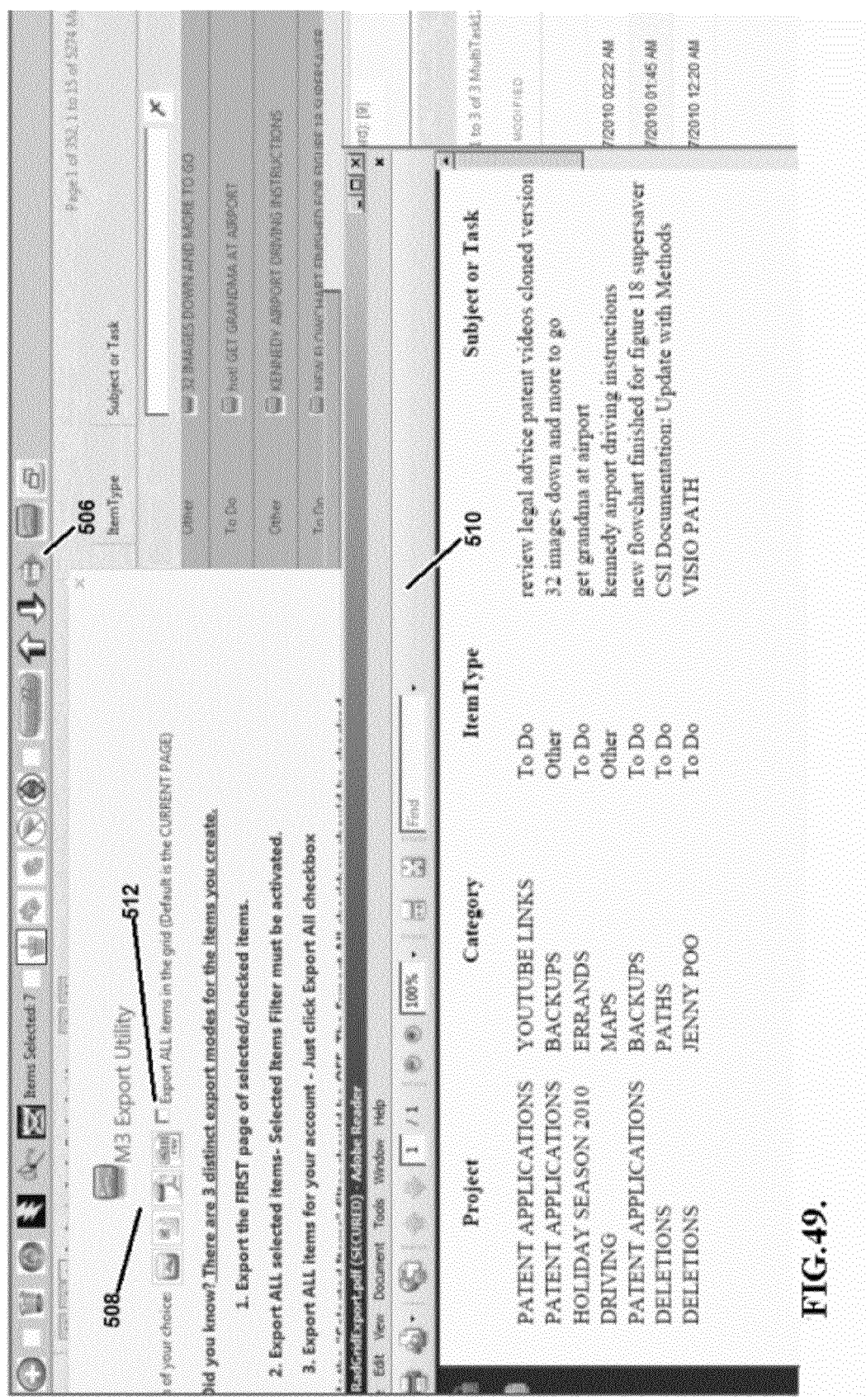
FIG. 49 is an illustrative diagram of the shell browser and view components export items to lists feature.

FIG. 49 is an illustrative diagram of the shell browser and view component's export feature. The export button of the items pane toolbar 506 opens the export window which enables a user to transform selected items, or all items in the system, via the global export function check box 512 into popular export file formats 508 by clicking one of those formats representative buttons. In this case, the user has created a system generated adobe PDF 510 document of selected items including, "get grandma at airport", and "Kennedy airport driving instructions." The task management features of the embodiment benefit by the user's ability to export lists of items, in the exact same order as they appear in the items pane 180, to other popular file formats where they can be printed, or otherwise further manipulated.

Those skilled in the art will appreciate that the system offers a separate comma separated values (CSV) export feature enabling programmers to manipulate items in other programming environments, thus providing one of many potential extensible interface to programmers interested in system extension.

Those skilled in the art will also appreciate that the embodiment provides a multitude of integrated grouping, sorting, selecting, relating, viewing, exporting, cloning, deleting, copying, moving, editing, embedding, searching, filtering and synchronizing features, enabling embodiments to be further customized via the addition of new toolbar type buttons capable of further transforming the selected, grouped, or otherwise viewed information. Therefore, without needing to change the underlying schema of the file and digital content processor's 86 type system, or the schema of the relational database 66, additional features could be added to the embodiment on a system wide scale. For example, a browser like "favorites" function could be added to the system to enable users to embed favorite web pages and favorite system items, in a table of the relational database 66 called "favorites." The "favorites" could be linked to the items table 278 by item identifier 256. Thus, a new spin-off, "favorites", could be integrated throughout the system, i.e. dropdowns, tabs, etc., and provide users with shortcuts to favorite items that can be found via partial text matching, as used elsewhere throughout the system.

Although specific examples of carrying out the invention have been described, those skilled in the art will appreciate that there are numerous other variations and permutations of the above described systems and techniques. As but one such variation, some or all of the user interface controls in the items pane region or treeview region may be selectable using a keyboard. For example, a user might press a tab key to highlight a particular control and then activate that control by pressing the "Enter" key. As another example, a particular control may have a corresponding key combination (e.g., "Alt+S").

In at least some embodiments, an application developer can modify aspects of how the categorizations modeled by the nodes, or folders of the treeview are created. For example, an application developer can enable a user to create root-level nodes in each of the treeview controls or may instead opt to create these directly from pre-existing items that are either created by one or more system users, external programs, or imported into the system from external sources. For example, a retail business may obtain inventory from a distributor and may opt to automatically create the various categories and representative folders in the treeviews directly from the imported data files. Further, an application developer could employ a mix of machines, methods and means allowing item categorizations to be created by system users, business personnel, parsed from external data sources, imported data feeds, or any combination thereof that is deemed advantageous to provide any desired outcome.

Embodiments of the invention also include a computer-readable medium having instruction recorded thereon which, when executed by a processor, perform steps of a method and/or that implement a software architecture.

While the preferred embodiment of the invention has been illustrated and described, it will be appreciated that various changes can be made therein without departing from the spirit and scope of the invention. For example, it will be appreciated that the locations of the various user interface features that are shown herein are illustrative and may be altered, and that different placements of the various user interface features will still fall within the sprit and scope of the invention. Furthermore, the different aspects of the invention described herein may be formed in various combinations, also without departing from the sprit and scope of the invention. In addition, the various steps in the described processes may be rearranged, modified, and/or deleted as desired to implement a selected subset of features described herein. Also, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

Therefore, since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

GLOSSARY OF ELEMENTS 46 magnetic disk
48 optical disk
50 keyboard
52 mouse
54 operating system
56 application programs
57 random access memory
58 other program modules
59 basic input/output system
60 program data
61 read-only memory
62 personal computer
63 system memory
64 monitor
65 serial port interface
66 relational database
67 speakers
68 cross-referencing component
69 audio adapter
70 query builder component
71 video adapter
72 rowset parser component
73 system bus
74 enumerator component
75 Processing unit
76 type factory component
77 Modem
78 databinding component
79 local area network
80 filter component
81 wide area network
82 request broker component
83 network interface
84 shell browser and view component
85 optical drive interface
86 file and digital content processor
87 magnetic disk drive interface
88 input/output component
89 hard disk drive
90 file server
91 hard disk
92 file broker component
94 file and digital content management system
96 file and digital content processor gets a query from the user
98 file and digital content processor passes the query to the relational database
102 Relational database provides results back to the file and digital content processor
106 routine by which a user provides a query that draws back selected items
  file and digital content processor provides results to the user as treeview folders
108 and subfolders, items, and files
110 file and digital content processor gets a file related request from user
112 file and digital content processor reads from and/or writes to the file server
  file and digital content processor passes a query to the relational database to
114 reflect the changes resultant from the file related operation
  file and digital content processor provides results to the user as treeview folders
116 and subfolders, items and files
  and then returns the transformed results to the user as treeview folders and
118 subfolders, items and files
  user selects a folder or subfolder and a query is passed to the file and digital
120 content processor
  file and digital content processor constructs requisite db query objects and
122 passes to the relational database
  Relational database generates the results of the queries and passes these back to the file and digital content processor as database rows and columns
124 on a table by table basis
  file and digital content processor takes results and converts them from rows and columns of data into strongly typed enumerator structures that are used by the databinding component to populate the screen with the resulting treeview
126 folders and subfolders, items and files for the user to interact upon
128 user decides to select a different folder or subfolder
130 new query generated
  and displayed on the screen in accordance with the user selection of a folder
132 or subfolder from one of the treeview controls
134 my documents
136 client 1
138 client 2
140 client 3
142 client 1 contracts
144 client 2 contracts
146 client 3 contracts
148 client 1 2001 contracts
150 client 2 2001 contracts
152 client 3 2001 contracts
154 client 1 2002 contracts
156 client 3 2002 contracts
158 client 2 2002 contracts
160 client 1 project
162 client 2 project
164 client 3 project
166 client 1 contracts subfolder
168 client 2 contracts subfolder
170 client 3 contracts subfolder
172 "Contracts" category folder 174 client 1 project subfolder
176 client 2 project subfolder
178 client 3 project subfolder
180 items pane
182 files pane
184 project column
186 category column
188 item name column header
190 filename column
192 explorer mode toggle checkbox
194 item specific attachments link
196 projects treeview control
198 categories treeview control
200 all items folder
202 Clients folder
204 Contracts subfolder
206 Year subfolder
207 Category 1 Treeview Control
208 Contracts folder
209 Category 2 Treeview Control
210 Year folder
211 root-level category folder "A"
212 a treeview diagram of a virtual folder structure
213 root-level category folder "B"
214 active category filter
215 system generated Category 2 subfolder B
216 item count display
217 system generated Category 1 subfolder A
218 attachments count display
219 category 1 value column header
220 project treeview text filter
221 category 2 value column header
222 remove project filter button
223 my first item
224 remove category filter button
225 item's category 1 attribute value A (*first half of category pair)
227 item's category 2 attribute value B (*second half of category pair)
233 "Q1 Fiscal" folder
235 february folder
237 Fiscal Quarters folder
238 fiscal reports category folder
239 "Months" folder
240 fiscal reports category subfolder
242 active project filter
244 associated item
246 monthly file end report
248 January 2001 Q1
250 schematic diagram
252 category identifier(*identical element used in categories type and items type)
254 project identifier(*identical element used in projects type and items type)
256 item identifier(*identical element used in items type and files type)
258 user identifier(*identical element used in categories type and projects type)
260 projects type
262 categories type
264 items type
266 files type
268 schematic diagram of the tables of the relational database
270 projectid column(*identical element appears multiple times)
272 categoryid column(*identical element appears multiple times)
274 projects table
276 categories table
278 items table
280 files table
282 itemid column(*identical element appears multiple times)
284 userid column(*identical element appears multiple times)
286 attachmentid column
288 physical treeview diagram of file server management methodology
290 user identifier as folder name(*identical element appears multiple times)
292 item identifier as folder name(*identical element appears multiple times)
294 physical files listing
298 DRAWINGS subfolder
300 FILTER LOGIC folder
302 FILTER LOGIC subfolder
304 DRAWINGS folder
306 view component's data entry form
  user opens the data entry form to create a new item or view or edit an existing item
308 selected from the items pane
310 user saves the item
312 data entry form is updated to show date and time of save to the relational database
314 user decides to add and/or delete associated files
316 files are then copied to or deleted from directory
318 add another item, or edit, or delete the existing item
322 the item subject field
324 cross reference information section
326 to do/task info section
328 save button
330 add another item button
332 resync button
334 form's tabbed control
335 Item Info tab
336 item type identifier
336 item type identifier
337 Details Editor tab
339 Attachments tab
341 Add Video tab
343 MiniBrowser tab
350 html embedding feature
  illustrative diagram of a google maps web page with driving instructions to
352 JFK Airport in New York City
354 design mode
356 html mode
358 google map as depicted
364 view larger map
370 web url for the item
374 links to popular email systems
386 automatic project-category filter feature
392 upload control
394 windows folder with files for upload
398 upload button
402 select file checkbox
404 download button
406 preview button
408 delete button
410 compressed download button
412 upload successful message
416 url address textbox 418 minibrowser component window
420 url embedding button
422 minibrowser tab
424 minibrowse button
432 embed video button
434 object tag source code for video
438 add video tab
440 add object tag text entry area
442 video embedding button
448 embedded video
456 supersave me button
457 view mode "Item Info" tab
462 autopopulate button
466 file transfer button
468 selected files checkbox
470 OK button
472 selected items checkbox column
476 selected items count label
480 selected attachments or files count label
482 selected items filter checkbox
484 selected files checkbox filter
488 search tab
490 search text
492 partial text match item links
494 selected item filtered by user selected search result
496 filter on selected item project-category pair
498 search results listing
500 visual indicator rich digital content search mode
506 export button of the items pane toolbar
508 popular export file formats
510 generated adobe PDF
512 global export function check box
514 a block the user selects a folder from the projects treeview control
516 block the user selects a folder from the categories treeview control
  decision block the system determines whether the selected folder is a root
518 level project folder or a category subfolder
520 determines whether the selected folder is a root level category folder or a project subfolder
522 block set category filter
524 block set project filter
526 the categories treeview subfolder representative of the project filter to be applied
  set the category filter to the category identifier value represented by the project subfolder's
528 direct root level parent in the treeview control structure
530 that it displays and highlights the same project as that of the selected subfolder
532 category filter to be applied to all screen transformations
534 set the project filter to the project identifier
  block the system transforms the categories treeview control such that it displays
536 and highlights the same category
  decision block the system determines whether its dual explorer mode is set to its default of item
538 explorer mode
  block the items pane is transformed to display all items corresponding to the
540 various use-case scenarios
  any available project, and/or category, filter(s), that are either in the immediate request generated by a treeview control use-case, or resulting from a current request combined with
542 previous filters stored in the filter component
544 network clients
546 the network
548 networked application servers
550 networked file servers
552 networked relational database servers
554 Email/Share tab
556 digital content item detail display

What is claimed is:

1. A digital content management system shell browser defined by computer-executable instructions stored on one or more computer-readable storage media, said digital content management system shell browser navigable by a user to manage a plurality of data items, said digital content management system shell browser comprising:
   a. an items pane control listing a plurality of data items selectable by the user, wherein every data item comprises a pair of distinct classificatory categories in addition to digital content, and
   b. wherein said plurality of data items are stored in, and retrieved from, a computer system database, or, from one, or more, networked database servers;
   c. wherein said pair of distinct classificatory categories represents two potential values for filtering said data items;
   d. a first treeview control navigable by the user to identify a primary, and discrete, set of root-level categories selectable by the user, and
      1. wherein said root-level categories correspond to exactly one, of the two, of said data items' said classificatory categories, forming exactly one half, of said pair, of distinct classificatory categories, and
      2. wherein said root-level categories act as a filter upon said data items by filtering on one of said data items' classificatory categories, and
      3. wherein said root-level categories are expandable, selectable, and navigable by the user to identify a potential, nested level of different categories, and
      4. wherein said different categories act as a secondary, and additional filter upon said data items in conjunction with the containing root-level category value thereof, and
      5. wherein said nested level of different categories represents one, or more, pre-existing category-pairs of said data items' distinct classificatory categories;
   e. a second treeview control navigable by the user to identify a secondary, and discrete, set of root-level categories selectable by the user, and
      1. wherein said second treeview control's root-level categories correspond to exactly one, of the two, of said data items' said classificatory categories forming exactly one half, of said pair, of distinct classificatory categories,
      2. and wherein said second treeview control's root-level categories represent the exact, other half of said data items' category-pair, where the first half is represented by, said first treeview control's, said root-level categories, and
      3. wherein said secondary set of root-level categories act as a filter upon said data items by filtering on one of said data items' classificatory categories, and
      4. wherein said secondary, set of root-level categories are expandable, selectable, and navigable by the user to identify a potential, nested level of different categories, and 5. wherein said different categories act as a secondary, and additional, filter upon said data items in conjunction with the containing, root-level, category value thereof; and
6. wherein said nested level of different categories represents one, or more, pre-existing category-pairs of said data items' distinct classificatory categories; and
f. wherein the first treeview control's root-level categories nested, secondary categories are comprised by, and map directly, to the second treeview control's, root-level, categories, and;
g. wherein the second treeview control's, root-level categories, nested, secondary categories are comprised by, and map directly to, the first treeview control's root-level categories, and;
h. wherein the first treeview control's root-level categories nested, secondary categories act as a synchronizing filter upon the second treeview control to dynamically display the corresponding, identical, root-level category value to display any, and all, potential, nested, secondary categories, and;
i. wherein the second treeview control's, root-level, categories nested, secondary categories act as a synchronizing filter upon the first treeview control to dynamically display the corresponding identical, root-level, category value to display any, and all, potential, nested, secondary categories, whereby said digital content management system shell browser empowers a user to easily locate, organize, and correlate said data items, and said first treeview control's, and said second treeview control's, respective classificatory category value pairings as existent within said data items.

2. The digital content management system shell browser of claim 1, further including a rich digital content item detail display feature, enabling a user to display a selected data item's digital content.

3. The digital content management system shell browser of claim 1, further including a filter, upon on a selected data item's category-pair, button, which, when clicked by a user acts as a synchronizing filter upon said first treeview control, and said second treeview control, to dynamically display their respective, corresponding, identical, root-level category values, and to further display any, and all, said potential, nested, secondary categories.

4. The digital content management system shell browser of claim 1, further including a search tab comprising a partial text search entry area whereby text entered by a user will initiate a search within said data items, presenting a list of any, and all, data items containing said text.

5. The digital content management system shell browser of claim 1, further including an items pane toolbar comprising an export button for said data items allowing a user to export a plurality of one or more of the said data items to be exported to popular computer file formats.

6. One or more non-transitory computer-readable storage media storing computer-executable instructions providing a user-navigable digital content management system shell browser executable within an operating system of a data processing device said digital content management system shell browser exposing a user interface, or display, comprising:

a. an items pane control presenting a sequential listing of a plurality of data items selectable by the user, wherein every data item comprises a pair of distinct classificatory categories, and a unique item identifier, and
b. wherein said pair of distinct classificatory categories represents two potential values for filtering said data items; and
c. a files pane presenting a sequential list of a plurality of computer files and metadata values, and
d. wherein said computer files are related to said data items according to said data items' unique item identifier;
e. a data entry form enabling a user to enter rich digital content to create, and/or edit, said data items;
f. a web-browser viewable page displaying a read-only version of said data items' digital content, and associated computer files;
g. a first treeview control presenting a user-navigable, primary, and discrete, set of root-level categories selectable by the user,
  1. wherein said root-level categories correspond to exactly one, of the two, of said data items said classificatory categories, forming exactly one half of said pair of distinct categories, and
  2. wherein said root-level categories represent a filter upon said data items by filtering on one of said data items' two classificatory categories, and
  3. wherein said presented root-level categories are expandable, selectable, and user-navigable, further presenting a potential, nested level of different categories, and
  4. wherein said different categories present a secondary, and additional, filter, upon said data items in addition to the containing root-level category value thereof; and
  5. wherein said nested level of different categories represents one, or more, pre-existing category-pairs of said data items' distinct classificatory categories;
h. a second treeview control presenting a user-navigable secondary, and discrete, set of user-selectable root-level categories, and
  1. wherein said second treeview control's root-level categories correspond to exactly one, of the two, of said data items' said classificatory categories forming exactly one half, of said pair, of distinct classificatory categories,
  2. wherein said second treeview control's root-level categories correspond to exactly one, of the two, of said data items' said classificatory categories, representing exactly one half, of said pair, of distinct categories, and
  3. wherein said second treeview control's root-level categories represent the exact, second half, of said data items' category-pair, where the first half is represented by said first treeview control's said root-level categories, and
  4. wherein said secondary set of root-level categories represent a filter upon said data items by presenting a filtering mechanism on one of said data items' classificatory categories, and
  5. wherein said secondary set of root-level categories present an expandable, selectable, and user-navigable nested level of different categories, and
  6. wherein said different categories present a secondary, and additional, filter upon said data items, in conjunction with, the containing root-level category value thereof;
i. wherein the first treeview control's root-level categories nested, secondary categories are comprised by, and directly reference, the second treeview control's root-level categories, and;

j. wherein the second treeview control's, root-level categories, nested, secondary categories are comprised by, and map directly to, the first treeview control's root-level categories, and;

k. wherein the first treeview control's root-level categories nested, secondary categories transform the second treeview control to present, or synchronize, the corresponding, identical, root-level category value thereby displaying any, and all, potential, nested, secondary categories, and;

l. wherein the second treeview control's, root-level, categories nested, secondary categories transform the first treeview control to present, or synchronize, the corresponding identical, root-level, category value thereby displaying any, and all, potential, nested, secondary categories, whereby said user interface enables a user to easily locate and correlate said data items, and said first treeview control's, and said second treeview control's, respective classificatory category pairs existent within said digital content management system's stored data items.

7. The computer readable media of claim 6, wherein the digital content management system shell browser further comprises an explorer mode toggle control selectably changeable by the user to direct said first treeview control's, and said second treeview control's, respective classificatory categories to filter upon said items pane, or, said files pane accordingly.

8. The computer readable media of claim 6, wherein the digital content management system shell browser's data entry form further comprises a details editor tab exposing functionality for a user to add, and/or edit, rich digital content, and/or html.

9. The computer readable media of claim 6, wherein the digital content management system shell browser's data entry form further comprises an email/share tab exposing functionality for a user to generate a URL link for said data item that points to said web-browser viewable page displaying said data item, and any, and all, associated computer files.

10. The computer readable media of claim 6, wherein the digital content management system shell browser's data entry form further comprises an attachments tab exposing functionality for a user to add, rename, or delete, computer files associated with said data items.

11. The computer readable media of claim 6, wherein the digital content management system shell browser's data entry form further comprises an add video tab exposing functionality for a user to embed video in said data items.

12. The computer readable media of claim 6, wherein the digital content management system shell browser's data entry form further comprises a minibrowser tab exposing functionality for a user to embed web pages in said data items.

13. The computer readable media of claim 6, wherein the digital content management system shell browser's data entry form further comprises an item info tab exposing functionality for a user to add, and/or, edit metadata values for said data items comprising an item type identifier enabling a user to label said data items as tasks.

14. The computer readable media of claim 6, wherein the digital content management system shell browser's data entry form further comprises an item info tab exposing functionality for a user to add, and/or, edit metadata values for said data items comprising an item type identifier enabling a user to label said data items as tasks.

15. The computer readable media of claim 6, wherein the digital content management system shell browser's web-browser viewable page further comprises a supersave me button exposing functionality for a user to clone said data items, and said associated computer files.

16. The computer readable media of claim 6, wherein the digital content management system shell browser's said items pane further comprises a selected items checkbox column enabling a user to select one or more of the plurality of said data items.

17. The computer readable media of claim 6, wherein the digital content management system shell browser's said files pane further comprises a selected files checkbox column enabling a user to select one or more of the plurality of said computer files.

18. The computer readable media of claim 6, wherein the digital content management system shell browser's said items pane further comprises a selected items filter checkbox selectable by a user, and wherein when the user selects the checkbox said items pane filters said data items to display all previously selected data items from one or more of the plurality of data items.

19. The computer readable media of claim 6, wherein the digital content management system shell browser's said files pane further comprises a selected files checkbox filter selectable by a user, and wherein when the user selects the checkbox said files pane filters said computer files to display all previously selected computer files from one or more of the plurality of said computer files.

* * * * *